(12) United States Patent
Rozsa et al.

(10) Patent No.: US 12,339,431 B2
(45) Date of Patent: Jun. 24, 2025

(54) METHOD FOR CORRECTING MOTION ARTIFACTS OF IN VIVO FLUORESCENCE MEASUREMENTS

(71) Applicant: Femtonics Kft., Budapest (HU)

(72) Inventors: Balazs Rozsa, Budapest (HU); Gergely Katona, Budapest (HU); Pal Maak, Budapest (HU); Mate Veress, Budapest (HU); Andras Feher, Szekszard (HU); Gergely Szalay, Budapest (HU); Peter Matyas, Budapest (HU)

(73) Assignee: Femtonics Kft., Budapest (HU)

( * ) Notice: Subject to any disclaimer, the term of this patent is extended or adjusted under 35 U.S.C. 154(b) by 710 days.

(21) Appl. No.: 17/482,678

(22) Filed: Sep. 23, 2021

(65) Prior Publication Data
US 2022/0011558 A1    Jan. 13, 2022

Related U.S. Application Data

(63) Continuation-in-part of application No. 16/290,238, filed on Mar. 1, 2019, now Pat. No. 11,156,819, (Continued)

(30) Foreign Application Priority Data

Sep. 2, 2016    (HU) .................................. P1600519

(51) Int. Cl.
*G02B 21/00* (2006.01)
*G01N 21/64* (2006.01)
*G06T 5/50* (2006.01)

(52) U.S. Cl.
CPC ....... *G02B 21/008* (2013.01); *G01N 21/6458* (2013.01); *G06T 5/50* (2013.01);
(Continued)

(58) Field of Classification Search
CPC ............ G02B 21/0048; G02B 21/0036; G02B 21/0044; G02B 21/0076; G02B 21/00;
(Continued)

(56) References Cited

U.S. PATENT DOCUMENTS

| 6,215,551 B1 * | 4/2001 | Nikoonahad | ........ G01N 21/956 356/237.2 |
| 7,084,967 B2 * | 8/2006 | Nikoonahad | .......... G01N 21/94 356/237.2 |

(Continued)

OTHER PUBLICATIONS

Katona, G., Szalay, G., Maák, P. et al. Fast two-photon in vivo imaging with three-dimensional random-access scanning in large tissue volumes. Nat Methods 9, 201-208 (2012). https://doi.org/10.1038/nmeth.1851.

(Continued)

*Primary Examiner* — Arnel C Lavarias
(74) *Attorney, Agent, or Firm* — Olson & Cepuritis, Ltd.

(57) ABSTRACT

A method for correcting motion artifacts of in vivo fluorescence measurements using a 3D laser scanning microscope containing two pairs of orthogonally arranged acousto-optic deflectors, the method including: selecting a region of interest; selecting a plurality of guiding points along the region of interest; extending the guiding points to objects selected from scanning lines and/or surface elements and/or volume elements which, together, substantially cover the region of interest; repeatedly scanning the objects by generating continuous drifts to cover the objects; projecting the obtained scanning data to frames and obtaining a time series of the frames; correcting motion artifacts by shifting the data of the successive frames with respect to each other so as to maximize fluorescence cross correlation between the data of the frames.

18 Claims, 28 Drawing Sheets

Related U.S. Application Data which is a continuation-in-part of application No. PCT/HU2017/050035, filed on Aug. 31, 2017.

(52) U.S. Cl.
CPC .............. *G06T 2207/10056* (2013.01); *G06T 2207/10144* (2013.01); *G06T 2207/20216* (2013.01)

(58) Field of Classification Search
CPC ............ G02B 21/0004; G02B 21/0012; G02B 21/002; G02B 21/0024; G02B 21/0032; G02B 21/0052; G02B 21/006; G02B 21/008; G02B 21/0084; G02B 21/06; G02B 21/36; G02B 21/361; G02B 21/365; G02B 21/367; G02F 1/33; G06K 9/3233; G01N 21/6458; G06T 5/50; G06T 2207/10056; G06T 2207/10144; G06T 2207/20216
USPC ........ 359/368, 362, 363, 369, 385, 388, 390
See application file for complete search history.

(56) References Cited

U.S. PATENT DOCUMENTS 10,168,598 B2 * 1/2019 Rozsa .................. G02B 26/101
11,156,819 B2 * 10/2021 Rozsa ................ G02B 21/0036

OTHER PUBLICATIONS

Greenberg DS, Kerr JN. Automated correction of fast motion artifacts for two-photon imaging of awake animals. J Neurosci Methods. Jan. 15, 2009;176(1):1-15. doi: 10.1016/j.jneumeth.2008.08.020. Epub Aug. 26, 2008. PMID: 18789968.

Goldey GJ, Roumis DK, Glickfeld LL, Kerlin AM, Reid RC, Bonin V, Schafer DP, Andermann ML. Removable cranial windows for long-term imaging in awake mice. Nat Protoc. Nov. 2014;9(11):2515-2538. doi: 10.1038/nprot.2014.165. Epub Oct. 2, 2014. PMID: 25275789; PMCID: PMC4442707.

Chen, TW., Wardill, T., Sun, Y et al. Ultrasensitive fluorescent proteins for imaging neuronal activity. Nature 499, 295-300 (2013). https://doi.org/10.1038/nature12354.

* cited by examiner

*somatic measurements*

*spine measurements*

*motion correction with subpixel resolution* brain movement

*fluorescence along 3D lines*

METHOD FOR CORRECTING MOTION ARTIFACTS OF IN VIVO FLUORESCENCE MEASUREMENTS

CROSS-REFERENCE TO RELATED APPLICATIONS

This application is a continuation-in-part of U.S. Ser. No. 16/290,238, filed on Mar. 1, 2019, which is a continuation-in-part of PCT/HU2017/050035, filed on Aug. 31, 2017, which claims priority of Hungarian Patent Application No. P1600519, filed on Sep. 2, 2016, each of which is incorporated herein by reference.

TECHNICAL FIELD

The present invention relates to a method for scanning along a substantially straight line (3D line) lying at an arbitrary direction in a 3D space with a given speed using a 3D laser scanning microscope.

The invention further relates to a method for scanning a region of interest with a 3D laser scanning microscope having acousto-optic deflectors for focusing a laser beam within a 3D space

BACKGROUND ART

Neuronal diversity, layer specificity of information processing, area wise specialization of neural mechanisms, internally generated patterns, and dynamic network properties all show that understanding neural computation requires fast read out of information flow and processing, not only from a single plane or point, but at the level of large neuronal populations situated in large 3D volumes. Moreover, coding and computation within neuronal networks are formed not only by the somatic integration domains, but also by highly non-linear dendritic integration centers which, in most cases, remain hidden from somatic recordings. Therefore, it would be desirable to simultaneously read out neural activity at both the population and single cell levels. Moreover, it has recently been shown that neuronal signaling could be completely different in awake and behaving animals. Therefore novel methods are needed which can simultaneously record activity patterns of neuronal, dendritic, spinal, and axon assemblies with high spatial and temporal resolution in large scanning volumes in the brain of behaving animals.

Neural activity has been detected in the prior art by using fluorescent dyes. When a cell is active (having an action potential), this does not only generate an electric signal but it also induces a chemical change. For example, the quantity of $Ca^{2+}$ present in the neural cells increases which can be detected by fluorescent dyes. Such dyes may include genetically encoded calcium indicators (GECI). There are other known fluorescent dyes as well which are not used to indicate the increase of $Ca^{2+}$ quantity, but instead these dyes (GEVI, genetically encoded voltage indicators) indicate the electric potential change of the cells. In the following, only the use of GECIs will be described in more detail, however a skilled person will appreciate that any such teachings are similarly applicable to GEVIs as well.

Several new optical methods have recently been developed for the fast readout of neuronal network activity in 3D. Among the available 3D scanning solutions for multiphoton microscopy, 3D AO scanning is capable of performing 3D random-access point scanning (Katona G, Szalay G, Maak P, Kaszas A, Veress M, Hillier D, Chiovini B, Vizi E S, Roska B, Rozsa B (2012); Fast two-photon in vivo imaging with three-dimensional random-access scanning in large tissue volumes. Nature methods 9:201-208) to increase the measurement speed and signal collection efficiency by several orders of magnitude in comparison to classical raster scanning. This is because the pre-selected regions of interest (ROI) can be precisely and rapidly targeted without wasting measurement time for unnecessary background volumes. More quantitatively, 3D AO scanning increases the product of the measurement speed and the square of the signal-to-noise ratio with the ratio of the total image volume to the volume covered by the pre-selected scanning points. This ratio can be very large, about $10^6$-$10^8$ per ROI, compared to traditional raster scanning of the same sample volume.

Despite the evident benefits of 3D random-access AO microscopy, the method faces two major technical limitations: i) fluorescence data are lost or contaminated with large amplitude movement artifacts during in vivo recordings; and ii) sampling rate is limited by the large optical aperture size of AO deflectors, which must be filled by an acoustic wave to address a given scanning point. The first technical limitation occurs because the actual location of the recorded ROIs is continuously changing during in vivo measurements due to tissue movement caused by heartbeats, blood flow in nearby vessels, respiration, and physical motion. This results in fluorescence artifacts because of the spatial inhomogeneity in the baseline fluorescence signal of all kinds of fluorescent labelling. Moreover, there is also a spatial inhomogeneity in relative fluorescence changes within recorded compartments; therefore, measurement locations within a somata or dendritic compartment are not equivalent. In addition, the amplitudes of motion-induced transients can even be larger than the ones induced by one or a few action potentials detected by GECIs. Moreover, the kinetics of $Ca^{2+}$ transients and motion artifacts could also be very similar. Therefore, it is really difficult to separate post-hoc the genuine fluorescence changes associated with neural activity from the artifacts caused by brain movement. The second technical problem with 3D point-by-point scanning is the relatively long switching time, which limits either the measurement speed or the number of ROIs. This is because to achieve large scanning volumes with a high spatial resolution, large AO deflector apertures are needed. However, to fill these large apertures with an acoustic signal takes considerable time. Therefore, the resulting long-duration AO switching time does not allow volume or surface elements to be generated from single points in an appropriate time period.

The robust performance of 3D point-by-point scanning performed with AO microscopes has been demonstrated in earlier works in slice preparations or in anesthetized animals. In these studies, 3D scanning was achieved by using two groups of x and y deflectors. During focusing, the second x (and y) deflector's driver function was supplemented with counter propagating, acoustic waves with a linearly increasing (chirped) frequency programmed to fully compensate for the lateral drift of the focal spot—this drift would otherwise be caused by the continuously increasing mean acoustic frequency in the chirped wave. In this way, the point scanning method yields high pointing stability but requires relatively long switching times, because it is necessary to fill the large AO deflector apertures each time when addressing a new point in 3D.

An alternative continuous trajectory scanning method (Katona G, Szalay G, Maak P, Kaszas A, Veress M, Hillier D, Chiovini B, Vizi E S, Roska B, Rozsa B (2012); Fast two-photon in vivo imaging with three-dimensional random-access scanning in large tissue volumes. Nature Methods 9:201-208 allows shorter pixel dwell times, but in this case, the fast lateral scans are restricted to two dimensions; 3D trajectory scans, however, still need to be interrupted by time-consuming jumps when moving along the z axis. In other words, scanning along the z axis still suffers from the same limitation as during point-by-point scanning.

SUMMARY OF INVENTION

It is an objective of the present invention to overcome the problems associated with the prior art. In particular, it is an objective of the invention to correct motion artifacts arising in in vivo fluorescence measurements. It is a further object of the present invention to generalize the previous methods by deriving a one-to-one relationship between the focal spot coordinates and speed, and the chirp parameters of the four AO deflectors to allow fast scanning drifts with the focal spot not only in the horizontal plane, but also along any arbitrary scanning line, starting at any point in the scanning volume (3D drift AO scanning).

According to a first aspect these objectives are achieved by a method for correcting motion artifacts of in vivo fluorescence measurements of a live specimen using a 3D laser scanning microscope having an optical axis (Z) and X, Y axis that are perpendicular to the optical axis and to each other and having a first pair of acousto-optic deflectors deflecting a laser beam in an x-z plane defined by the X and Z axis and a second pair of acousto-optic deflectors deflecting the laser beam in an y-z plane defined by the Y and Z axis, comprising:

selecting within the specimen a region of interest which lies in more than one x-y planes perpendicular to the Z axis, selecting a plurality of guiding points along the region of interest, extending the guiding points to surface elements, wherein each surface element consists of a plurality of scanning lines and the surface elements, together, substantially cover the region of interest, scanning each scanning line by focusing the laser beam at one end of the given scanning line and providing chirp signals for the acoustic frequencies in the deflectors for continuously moving the focus spot along the given scanning line, thereby obtaining 3-dimensional scanning data of the surface elements, projecting the 3-dimensional scanning data of the surface elements to 2-dimensional rectangular frames, repeating the measurement to obtain a 2-dimensional time series from the successive frames, correcting motion artifacts by shifting the data of the successive frames with respect to each other so as to maximize fluorescence cross correlation between the data of the frames.

In the context of the present invention a scanning line, also referred to as 3D line is a line arbitrarily spaced in 3D, hence the term "3D" in connection with a scanning line refers to an arbitrary position in 3D even if the scanning line is straight meaning that in a mathematical sense the straight scanning line is a 1-dimensional object.

Preferably a direction of average motion of the specimen is measure and taken into account by selecting a fluorescent object on a dark background within the specimen, repeatedly scanning a 3-dimensional volume containing the fluorescent object to obtain a time series of the 3-dimensional volume, determining a 3-dimensional trajectory of the fluorescent object from the time series of the 3-dimensional volume, determining an average motion direction of the fluorescent object from the 3-dimensional trajectory, extending the guiding points to surface elements which extend in the average motion direction of the fluorescent object.

According to a preferred embodiment the 3-dimensional volume containing the fluorescent object consists of three perpendicular imaging planes that are centered on the fluorescent object and scanning each imaging plane by providing chirp signals for the acoustic frequencies in the deflectors for focusing the laser beam to a focus spot and continuously moving the focus spot along parallel lines lying within the given imaging plane, so as to scan the entire imaging plane.

A preferred embodiment is ribbon scanning by transversal scanning lines which further comprises fitting a 3-dimensional scanning trajectory on the guiding points, and wherein the step of extending the guiding points to surface elements is performed by extending the guiding points to scanning lines which are transversal to the 3-dimensional scanning trajectory and which, together, form a plurality of surface elements that define a substantially continuous surface along the 3-dimensional scanning trajectory.

Another preferred embodiment is ribbon scanning by parallel scanning lines which further comprises fitting a 3-dimensional scanning trajectory on the guiding points, and wherein the step of extending the guiding points to surface elements is performed by extending each guiding point to a plurality of scanning lines which are parallel to a portion of the 3-dimensional scanning trajectory containing the given guiding point and which plurality of scanning lines, together, form one of the surface elements, and the plurality of surface elements, together, define a substantially continuous surface along the 3-dimensional scanning trajectory.

Further preferred embodiments are snake scanning and cube scanning by extending each surface element to a volume element such that the volume element consists of the given surface element and a plurality of auxiliary surface elements which are substantially parallel with the given surface element and each of which consists of a plurality of auxiliary scanning lines, additionally scanning each auxiliary scanning line by focusing the laser beam at one end of the given auxiliary scanning line and providing chirp signals for the acoustic frequencies in the deflectors for continuously moving the focus spot along the given auxiliary scanning line, thereby obtaining 3-dimensional scanning data of the volume elements, projecting the 3-dimensional scanning data of the volume elements to 3-dimensional cuboid frames, repeating the measurement to obtain a 3-dimensional time series from the successive cuboid frames, correcting motion artifacts by shifting the successive cuboid frames with respect to each other so as to maximize fluorescence cross correlation between the cuboid frames.

According to a further preferred embodiment the frames contain separate rectangular regions corresponding to the 3-dimensional scanning data of the separate surface elements and correcting motion artifacts by shifting each rectangular region of each frame with respect to the corresponding rectangular regions of the other frames so as to maximize fluorescence cross correlation between the corresponding rectangular regions of the frames.

According to a preferred embodiment fluorescence cross correlation is maximized between the data of a selected reference frame and the data of all other frames.

According to another preferred embodiment fluorescence cross correlation is maximized between the data of successive frames.

According to a second aspect the invention further relates to a method for correcting motion artifacts of in vivo fluorescence measurements of a live specimen using a 3D laser scanning microscope having an optical axis (Z) and X, Y axis that are perpendicular to the optical axis and to each other and having a first pair of acousto-optic deflectors deflecting a laser beam in an x-z plane defined by the X and Z axis and a second pair of acousto-optic deflectors deflecting the laser beam in an y-z plane defined by the Y and Z axis,

- selecting a fluorescent object on a dark background within the sample,
- providing three perpendicular imaging planes that are centered on the fluorescent object,
- scanning each imaging plane by providing chirp signals for the acoustic frequencies in the deflectors for focusing the laser beam to a focus spot and continuously moving the focus spot along parallel lines lying within the given imaging plane, so as to scan the entire imaging plane,
- determining a 3-dimensional trajectory of the fluorescent object during the predetermined period of time
- determining an average motion direction of the fluorescent object from the 3-dimensional trajectory,
- selecting within the specimen a plurality of points of interest,
- extending each point of interest to a scanning line traversing the given point of interest and being parallel to the average motion direction of the fluorescent object,
- scanning each scanning line by focusing the laser beam at one end of the given scanning line and providing chirp signals for the acoustic frequencies in the deflectors for continuously moving the focus spot along the given scanning line, thereby obtaining scanning data of each scanning line corresponding to one of the plurality of points of interest,
- projecting the scanning data of each scanning line to 1-dimensional frames,
- repeating the measurement to obtain a 1-dimensional time series from the successive frames for each scanning line corresponding to one of the plurality of points of interest,
- correcting motion artifacts by shifting the data of the successive frames with respect to each other so as to maximize fluorescence cross correlation between the data of the frames.

Preferably both aspects of the invention further comprise scanning each scanning line with a given scanning speed by
- determining coordinates $x_0(0)$, $y_0(0)$, $z_0(0)$ of one end of the scanning line serving as a starting point,
- determining scanning speed vector components $v_{x0}$, $v_{y0}$, $v_{zx0}$ ($=v_{zy0}$) such that a magnitude of the scanning speed vector corresponds to the given scanning speed and the directions of the scanning speed vector corresponds to the direction of the scanning line,
- providing non-linear chirp signals in the x axis deflectors and providing non-linear chirp signals in the y axis deflectors such as to move a focus spot from the starting point at a speed defined by the speed vector components $v_{x0}$, $v_{y0}$, $v_{zx0}$.

It is further preferred to provide non-linear chirp signals in the x axis deflectors according to the function:

$$f_{ix}(x, t) = f_{ix}(0, 0) + \left(b_{xi} * \left(t - \frac{D}{2*v_a} - \frac{x_i}{v_a}\right) + c_{xi}\right) * \left(t - \frac{D}{2*v_a} - \frac{x_i}{v_a}\right)$$

wherein
i=1 or 2 indicates the first and second x axis deflector respectively, D is the diameter of the AO deflector; and $v_a$ is the propagation speed of the acoustic wave within the deflector and $$\Delta f_{0x} = f_{1x}(0,0) - f_{2x}(0,0)) \neq 0$$

and to provide non-linear chirp signals in the y axis deflectors according to the function:

$$f_{iy}(y, t) = f_{iy}(0, 0) + \left(b_{yi} * \left(t - \frac{D}{2*v_a} - \frac{y_i}{v_a}\right) + c_{yi}\right) * \left(t - \frac{D}{2*v_a} - \frac{y_i}{v_a}\right)$$

wherein
i=1 or 2 indicates the first and second x axis deflector respectively, and $$\Delta f_{0y} = f_{1y}(0,0) - f_{2y}(0,0)) \neq 0$$

wherein $\Delta f_{0x}$, $b_{x1}$, $b_{x2}$, $c_{x1}$, $c_{x2}$, $\Delta f_{0y}$, $b_{y1}$, $b_{y2}$, $c_{y1}$, and $c_{y2}$ are expressed as a function of the initial location ($x_0(0)$, $y_0(0)$, $z_0(0)$) and vector speed ($v_{x0}$, $v_{y0}$, $v_{zx0}=v_{zy0}$) of the focal spot.

The equation of the scanning line can be described by a set of linear equations whose parameters of the line path are selected according to the general formula, in 3D:

$$x_0 = x_0(0) + s * v_{x0}$$

$$y_0 = y_0(0) + s * v_{y0}$$

$$z_0 = z_0(0) + s * v_{z0}$$

Since the deflectors are deflecting in the x-z and y-z planes, these equations can be transformed into the equations describing the line projections onto the x-z and y-z planes:

$$z_0 = m * x_0 + n = z_0(0) + \frac{v_{zx0}}{v_{x0}} * x_0 - \frac{v_{zx0}}{v_{x0}} * x_0(0)$$

$$z_0 = k * x_0 + l = z_0(0) + \frac{v_{zy0}}{v_{y0}} * y_0 - \frac{v_{zy0}}{v_{y0}} * y_0(0)$$

With these we imply that the initial velocity values $v_{zx0} = v_{zy0} = v_{z0}$, and the parameters m, n, k, l are determined by the initial velocity values $v_{x0}$, $v_{y0}$, $v_{z0}$ along the x, y, z axis:

$$m = \frac{v_{zx0}}{v_{x0}}$$

$$k = \frac{v_{zx0}}{v_{x0}}$$

$$n = z_0(0) - \frac{v_{zx0}}{v_{x0}} * x_0(0)$$

$$l = z_0(0) - \frac{v_{zx0}}{v_{x0}} * y_0(0)$$

Preferably, the parameters $\Delta f_{0x}$, $b_{x1}$, $b_{x2}$, $c_{x1}$, $c_{x2}$, $\Delta f_{0y}$, $b_{y1}$, $b_{y2}$, $c_{y1}$, and $c_{y2}$ are expressed as $$\Delta f_{0x} = \frac{x_0(0) * F_2}{K * F_{obj} * F_1}$$

$$b_{x1} = \frac{v_{zx0} * v_a}{4 * K} * \left( \frac{M + \frac{v_{zx0}}{v_{x0}} * \frac{x_0(0) * F_2}{F_{obj} * F_1}}{z_0(0) - \frac{v_{zx0}}{v_{x0}} * x_0(0)} \right)^2$$

$$b_{x2} = \frac{v_{zx0} * v_a}{4 * K} * \left( \frac{M + \frac{v_{zx0}}{v_{x0}} * \frac{x_0(0) * F_2}{F_{obj} * F_1}}{z_0(0) - \frac{v_{zx0}}{v_{x0}} * x_0(0)} \right)^2$$

$$c_{x1} = \frac{M * v_a}{2 * K} * \left( \frac{M + \frac{v_{zx0}}{v_{x0}} * \frac{x_0(0) * F_2}{F_{obj} * F_1}}{z_0(0) - \frac{v_{zx0}}{v_{x0}} * x_0(0)} - \frac{M}{F_{obj}} \right) +$$

$$\frac{v_{x0}}{2 * K * M} * \left( z_0(0) - \frac{v_{zx0}}{v_{x0}} * x_0(0) \right) * \left( \frac{M + \frac{v_{zx0}}{v_{x0}} * \frac{x_0(0) * F_2}{F_{obj} * F_1}}{z_0(0) - \frac{v_{zx0}}{v_{x0}} * x_0(0)} \right)^2$$

$$c_{x2} = \frac{M * v_a}{2 * K} * \left( \frac{M + \frac{v_{zx0}}{v_{x0}} * \frac{x_0(0) * F_2}{F_{obj} * F_1}}{z_0(0) - \frac{v_{zx0}}{v_{x0}} * x_0(0)} - \frac{M}{F_{obj}} \right) +$$

$$\frac{v_{x0} * \left( z_0(0) - \frac{v_{zx0}}{v_{x0}} * x_0(0) \right)}{2 * K * M} * \left( \frac{M + \frac{v_{zx0}}{v_{x0}} * \frac{x_0(0) * F_2}{F_{obj} * F_1}}{z_0(0) - \frac{v_{zx0}}{v_{x0}} * x_0(0)} \right)^2$$

$$\Delta f_{0y} = \frac{y_0(0) * F_2}{K * F_{obj} * F_1}$$

$$b_{y1} = \frac{v_{zy0} * v_a}{4 * K} * \left( \frac{M + \frac{v_{zy0}}{v_{y0}} * \frac{y_0(0) * F_2}{F_{obj} * F_1}}{z_0(0) - \frac{v_{zy0}}{v_{y0}} * y_0(0)} \right)^2$$

$$b_{y2} = \frac{v_{zy0} * v_a}{4 * K} * \left( \frac{M + \frac{v_{zy0}}{v_{y0}} * \frac{y_0(0) * F_2}{F_{obj} * F_1}}{z_0(0) - \frac{v_{zy0}}{v_{y0}} * y_0(0)} \right)^2$$

$$c_{y1} = \frac{M * v_a}{2 * K} * \left( \frac{M + \frac{v_{zy0}}{v_{y0}} * \frac{y_0(0) * F_2}{F_{obj} * F_1}}{z_0(0) - \frac{v_{zy0}}{v_{y0}} * y_0(0)} - \frac{M}{F_{obj}} \right) +$$

$$\frac{v_{y0} * \left( z_0(0) - \frac{v_{zy0}}{v_{y0}} * y_0(0) \right)}{2 * K * M} * \left( \frac{M + \frac{v_{zy0}}{v_{y0}} * \frac{y_0(0) * F_2}{F_{obj} * F_1}}{z_0(0) - \frac{v_{zy0}}{v_{y0}} * y_0(0)} \right)^2$$

$$c_{y2} = \frac{M * v_a}{2 * K} * \left( \frac{M + \frac{v_{zy0}}{v_{y0}} * \frac{y_0(0) * F_2}{F_{obj} * F_1}}{z_0(0) - \frac{v_{zy0}}{v_{y0}} * y_0(0)} - \frac{M}{F_{obj}} \right) +$$

-continued $$\frac{v_{y0} * \left( z_0(0) - \frac{v_{zy0}}{v_{y0}} * y_0(0) \right)}{2 * K * M} * \left( \frac{M + \frac{v_{zy0}}{v_{y0}} * \frac{y_0(0) * F_2}{F_{obj} * F_1}}{z_0(0) - \frac{v_{zy0}}{v_{y0}} * y_0(0)} \right)^2$$

wherein M is the magnification of the lens system and K is a proportionality factor between a relative angle deflection ($\alpha$) following a given acousto-optic deflector and the local acoustic frequency (f), according to the following equation:

$$\alpha = K * f$$

The scanning lines may be curved lines or substantially straight lines.

The present invention provides a novel method, herein referred to as 3D drift AO microscopy, in which, instead of keeping the same scanning position, the excitation spot is allowed to drift in any direction with any desired speed in 3D space while continuously recording fluorescence data with no limitation in sampling rate. To realize this, non-linear chirps are used in the AO deflectors with parabolic frequency profiles. The partial drift compensation realized with these parabolic frequency profiles allows the directed and continuous movement of the focal spot in arbitrary directions and with arbitrary velocities determined by the temporal shape of the chirped acoustic signals. During these fast 3D drifts of the focal spot the fluorescence signal collection is uninterrupted, lifting the pixel dwell time limitation of the previously used point scanning. In this way pre-selected individual scanning points can be extended to small scanning lines, surfaces, or volume elements lying in any arbitrary direction to cover not only the pre-selected ROIs but also the neighbouring background areas or volume elements.

The 3D lines may be for example of 5 to 20 µm length.

Preferably, the 3D lines are substantially perpendicular to the 3D trajectory.

Preferably, the method includes extending each scanning point of the 3D trajectory to a plurality of parallel substantially straight lines of 5 to 20 µm length defining surfaces that are substantially transversal to the 3D trajectory at the given scanning points.

Preferably, the method includes extending each scanning point of the 3D trajectory to a plurality of parallel substantially straight lines of 5 to 20 µm length which straight lines, together, define a substantially continuous volume such that the 3D trajectory is located inside this volume.

Preferably, the method includes extending each scanning point of the 3D trajectory to a plurality of parallel substantially straight lines of 5 to 20 µm length defining cuboides that are substantially centred on the 3D trajectory at the given scanning points.

Although there are several ways to extend single scanning points to surface and volume elements, the combinations of 3D lines, surfaces and volumes are almost unlimited, the inventors have found six new scanning methods that are particularly advantageous: 3D ribbon scanning; chessboard scanning; multi-layer, multi-frame imaging; snake scanning; multi-cube scanning; and multi-3D line scanning. Each of them is optimal for a different neurobiological aim.

Volume or area scanning used in these methods allows motion artifact correction on a fine spatial scale and, hence, the in vivo measurement of fine structures in behaving animals. Therefore, fluorescence information can be preserved from the pre-selected ROIs during 3D measurements even in the brain of behaving animals, while maintaining the 10-1000 Hz sampling rate necessary to resolve neural activity at the individual ROIs. It can be demonstrated that these scanning methods can decrease the amplitude of motion artifacts by over an order of magnitude and therefore enable the fast functional measurement of neuronal somata and fine neuronal processes, such as dendritic spines and dendrites, even in moving, behaving animals in a z-scanning range of more than 650 μm in 3D.

Further advantageous embodiments of the invention are defined in the attached dependent claims.

BRIEF DESCRIPTION OF DRAWINGS

Further details of the invention will be apparent from the accompanying Figs. and exemplary embodiments.

DESCRIPTION OF EMBODIMENTS

Figure 1A:
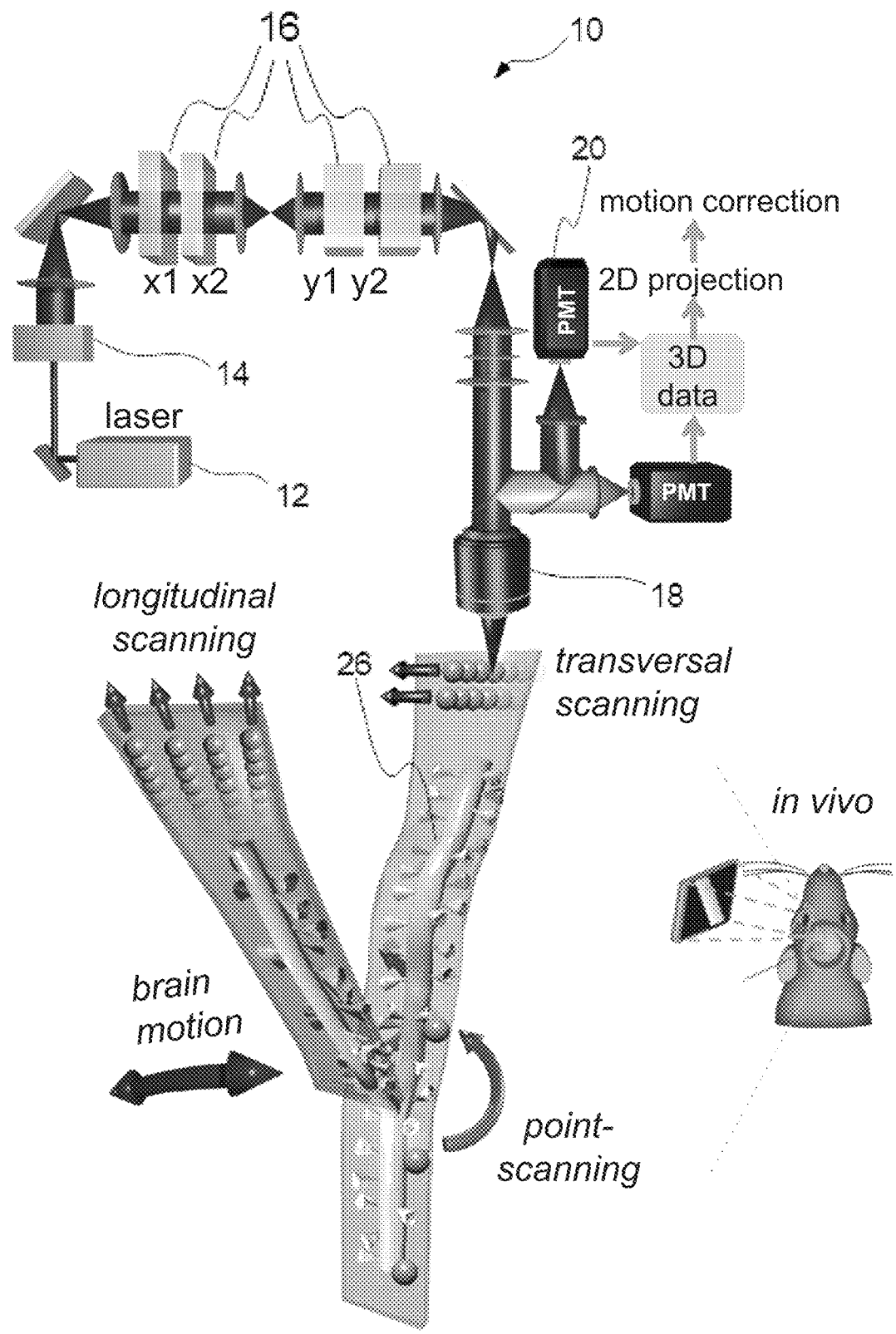
FIG. 1A is a schematic illustration of longitudinal and transversal scanning with a laser scanning acousto-optic microscope.

An exemplary laser scanning acousto-optic (AO) microscope 10 is illustrated in FIG. 1A which can be used to perform the method according to the invention. The AO microscope 10 comprises a laser source 12 providing a laser beam 14, acousto-optic deflectors 16 and an objective 18 for focusing the laser beam 14 on a sample, and one or more detectors 20 for detecting back scattered light and/or fluorescent light emitted by the sample. Other arrangement of the AO deflectors 16 is also possible as known in the art. Further optical elements (e.g. mirrors, beam splitters, Faraday isolator, dispersion compensation module, laser beam stabilisation module, beam expander, angular dispersion compensation module, etc.) may be provided for guiding the laser beam 14 to the AO deflectors 16 and the objective 18, and for guiding the back scattered and/or the emitted fluorescent light to the detectors 20 as is known in the art (see e.g. Katona et al. "Fast two-photon in vivo imaging with three-dimensional random-access scanning in large tissue volumes", Nature methods 9:201-208; 2012). Naturally, a laser scanning microscope 10 with a different structure may also be used.

The laser source 12 used for two-photon excitation may be a femtosecond pulse laser, e.g. a mode-locked Ti:S laser, which produces the laser beam 14. In such a case the laser beam 14 consists of discrete laser pulses, which pulses have femtosecond pulse width and a repetition frequency in the MHz range.

Preferably a Faraday isolator is located in the optical path of the laser beam 14, which prevents the reflection of the laser beam, thereby aiding smoother output performance. After passing through the Faraday isolator, the laser beam 14 preferably passes into a dispersion compensation module, in which a pre-dispersion compensation is performed with prisms in a known way. After this, the laser beam 14 preferably passes through a beam stabilisation module, and a beam expander before reaching the AO deflectors 16.

The laser beam 14 deflected by the AO deflectors 16 preferably passes through an angular dispersion compensation module for compensating angular dispersion of the beam 14 as is known in the art. The objective 18 focuses the laser beam 14 onto a sample 26 placed after the objective 18. Preferably, a beam splitter is placed between the angular dispersion compensation module and the objective 18, which transmits a part of the laser beam 14 reflected from a sample 26 and or emitted by the sample 26 and collected by the objective 18 to the photomultiplier (PMT) detectors 20, as is known in the art.

According to the inventive method scanning points are extended to 3D lines and/or surfaces and/or volume elements in order to substantially increase the signal to noise ratio, which allows for performing measurements in vivo, e.g. in a moving brain.

The 3D drift AO scanning according to the invention allows not only for scanning individual points, but also for scanning along any segments of any 3D lines situated in any location in the entire scanning volume. Therefore, any folded surface (or volume) elements can be generated, for example from transversal or longitudinal lines as illustrated in FIG. 1A. In this way, fluorescence information can be continuously collected when scanning the entire 3D line in the same short period of time (≈20 μs) as required for scanning a single point in the point-by-point scanning mode. Data acquisition rate is limited only by the maximal sampling rate of the PMT detectors 20.

It is therefore possible to generate folded surface elements with the 3D drift AO scanning technology in 3D, and fit them to any arbitrary scanning trajectory, e.g. long, tortuous dendrite segments and branch points in an orientation which minimizes fluorescence loss during brain motion. This technique is referred to as 3D ribbon scanning (see FIG. 2C).

To achieve 3D ribbon scanning, the first step is to select guiding points along a region of interest (e.g. a dendritic segment or any other cellular structure).

The second step is to fit a 3D trajectory to these guiding points using e.g. piecewise cubic Hermite interpolation. Two preferred strategies to form ribbons along the selected 3D trajectory are to generate drifts (short scans during which the focus spot moves continuously) either parallel to the trajectory (longitudinal drifts), or orthogonal to the trajectory (transverse drifts) as illustrated in FIG. 1A. In both cases, it is preferred to maximize how parallel these surface elements lie to the plane of motion (e.g. brain motion) or to the nominal focal plane of the objective. The basic idea behind the former case is that if the surface element lies parallel to the motion, then any point of interest lying in this surface element will remain within the surface element despite of the motion and thus remains detectable. The basic idea behind the latter is that the point spread function is elongated along the z axis: fluorescence measurements are therefore less sensitive to motion along the z axis. Therefore, it is also possible to follow this second strategy and generate multiple x-y frames for neuronal network and neuropil measurements (see below).

In the following, the implementation and efficiency of the different scanning strategies will be demonstrated which can be performed by the 3D drift AO scanning method according to the present invention.

EXAMPLE 1

3D Ribbon Scanning to Compensate In Vivo Motion Artifacts

Figure 1B:
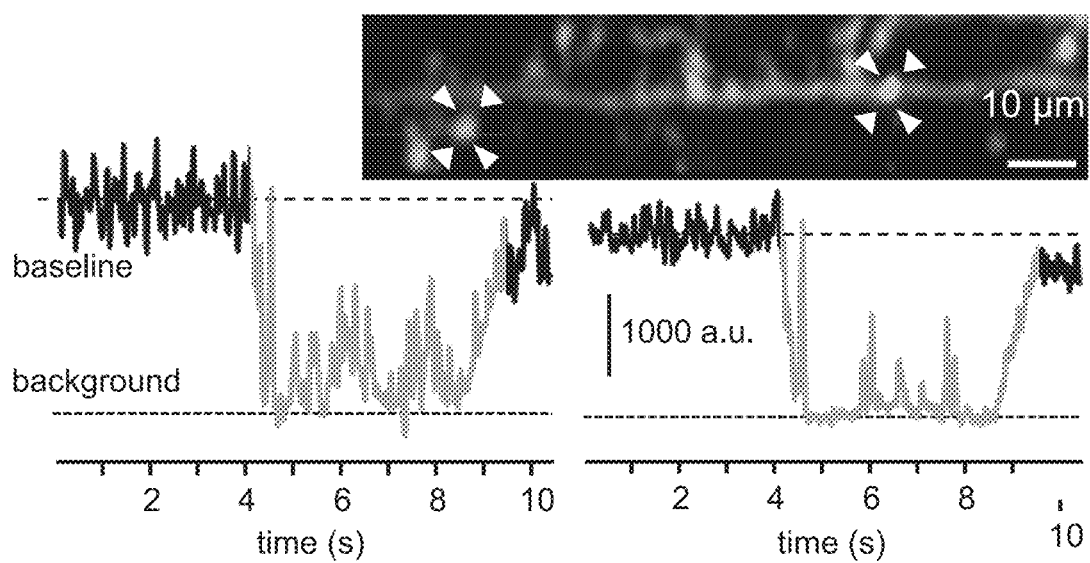
FIG. 1B are diagrams showing exemplified dendritic and spine transients which were recorded using 3D random-access point scanning during motion (light) and rest (dark) from one dendritic and one spine ROI indicated with white triangles in the inset.
Figure 1C:
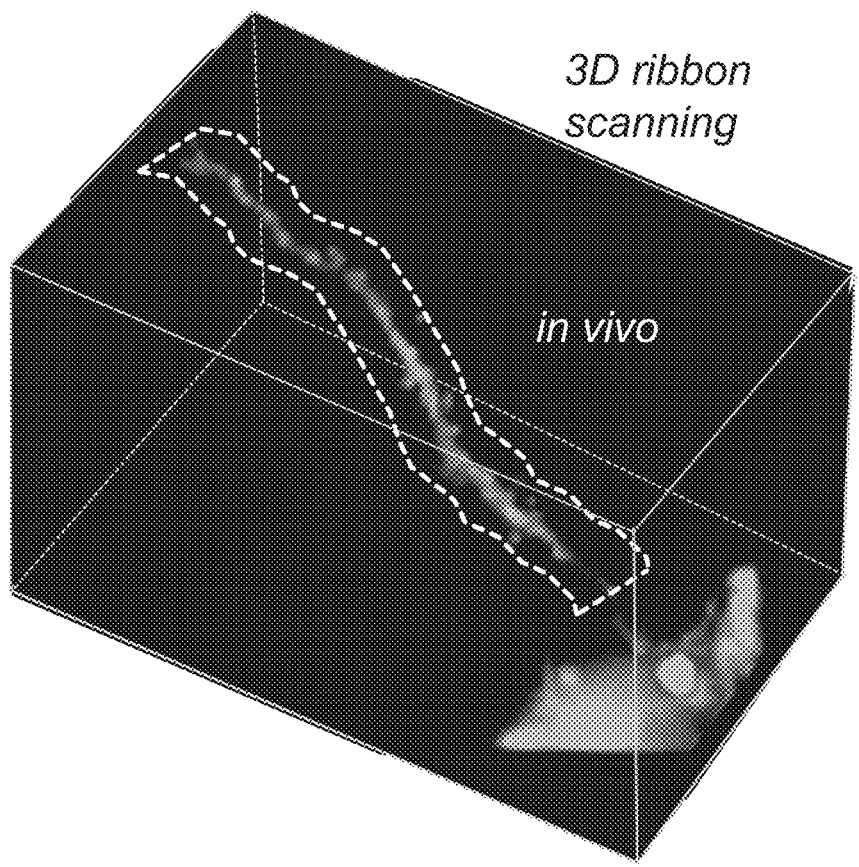
FIG. 1C is a 3D image of a dendritic segment of a selected GCaMP6f-labelled neuron and a selected ribbon around the dendritic segment shown with dashed line.
Figure 1D:
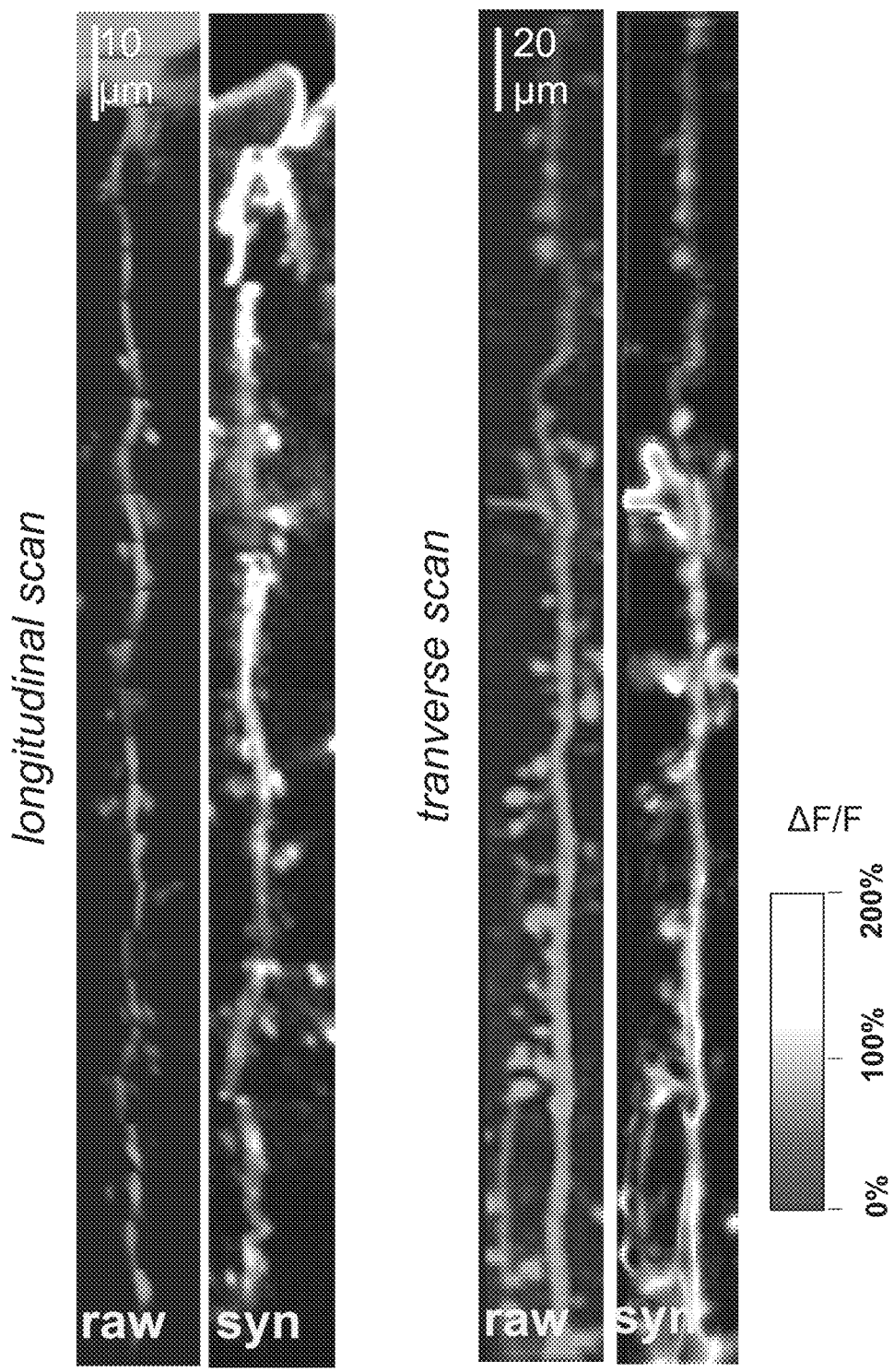
FIG. 1D illustrates colour coded diagrams showing average $Ca^{2+}$ responses along the ribbon of FIG. 1C during spontaneous activity using the longitudinal (left) and the transversal (right) scanning modes.

To demonstrate 3D ribbon scanning we labelled a small portion of pyramidal neurons in the V1 region of the visual cortex with a $Ca^{2+}$ sensor, GCaMP6f, using an AAV vector for delivery. Then, we recorded a z-stack, i.e. we scanned the current field of view at different z levels (at different depths along the z axis, which is the optical axis) so as to obtain the images of a plurality of planes that are equally spaced from each other along the z axis. Then, according to the z-stack taken in advance, we selected guiding points and fitted the 3D trajectory which covered a spiny dendritic segment of a labelled pyramidal cell (FIG. 1C). FIG. 1C shows a 3D image of a dendritic segment of a selected GCaMP6f-labelled neuron. Cre-dependent GCaMP6f-expressing AAV vectors were used to induce sparse labelling. A 3D ribbon (indicated with dashed lines) was selected for fast 3D drift AO scanning within the cuboid We used transversal drifts to scan along the selected 3D ribbons to measure the selected 140 μm dendritic segment and spines with 70.1 Hz, i.e. the selected dendritic segment and spines were scanned approximately 70 times within one second (FIG. 1D). Raw fluorescence data (raw) were measured along the selected 3D ribbon and were projected into 2D along the longitudinal and traversal axis of the ribbon following elimination of motion artifacts. Average $Ca^{2+}$ responses along the ribbon during spontaneous activity (syn.) were colour coded. In case of a relatively straight ROI, such as in FIG. 1C, using longitudinal drifts allowed a much faster measurement (in range of from 139.3 Hz to 417.9 Hz) of the same dendritic segment because fewer (but longer) 3D lines was required to cover the same ROI. In the next step, 3D recorded data were projected into 2D as a function of longitudinal and perpendicular distances along the surface of the ribbon, e.g. longitudinal distance corresponding to the distance along the 3D trajectory and perpendicular distance corresponding to the distance measures perpendicular to the 3D trajectory. Note that, in this way, the dendritic segment was straightened to a frame (FIG. 1D) to record its activity in 2D movies (time series) wherein the frames of the 2D movie correspond to the individual frames obtained at different times as the selected 3D ribbon was repeatedly scanned with 70.1 Hz. This projection also allowed the use of an adapted version of prior art methods developed for motion artifact elimination in 2D scanning (see Greenberg D S, Kerr J N (2009) Automated correction of fast motion artifacts for two-photon imaging of awake animals. Journal of neuroscience methods 176:1-15.).

The need to extend single scanning points to surface or volume elements in order to preserve the surrounding fluorescence information for motion artifact elimination is also indicated by the fact that fluorescence information could be completely lost during motion in behaving animals when using the point scanning method. FIG. 1B illustrates exemplified dendritic and spine transients which were recorded using 3D random-access point scanning during motion (light) and rest (dark) from one dendritic and one spine region of interest (ROI) indicated with white triangles in the inset. Note that fluorescence information can reach the background level in a running period as the examined fluorescent point moves out of focus due to the motion, indicating that single points are not sufficient to monitor activity in moving, behaving animals.

FIGS. 2A-2H demonstrate the quantitative analysis of the motion artifact elimination capability of 3D drift AO scanning.

Figure 2A:
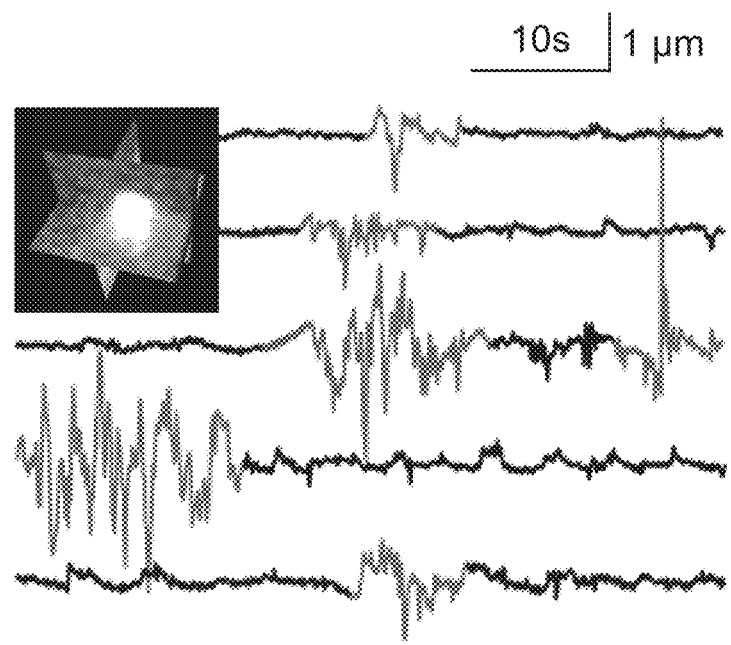
FIG. 2A is a diagram of brain motion recordings.
Figure 2B:
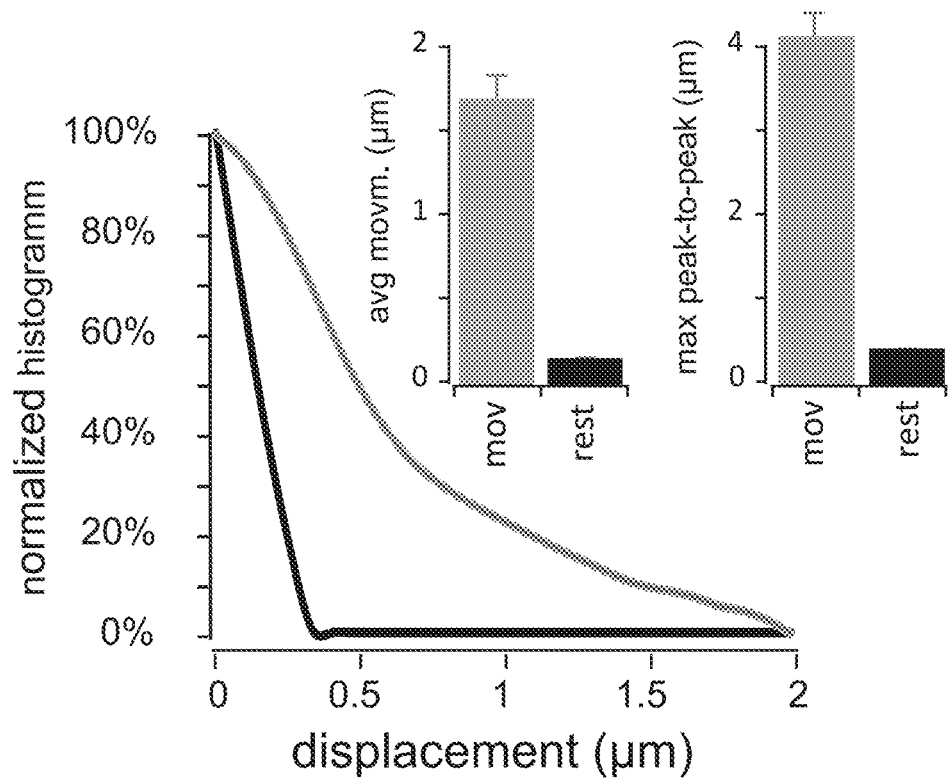
FIG. 2B shows a normalized amplitude histogram of the recorded brain motion. Inset shows average and average peak-to-peak displacements in the resting and running periods.

In order to quantify motion-induced errors and the efficiency of motion artifact correction during ribbon scanning, we first measured brain movement by rapidly scanning a bright, compact fluorescent object which was surrounded by a darker background region. The brain naturally contains many such fluorescent objects, even auto-fluorescent objects which are surrounded by a darker region, i.e. a region showing no fluorescence, therefore it is easy to find such a bright, compact fluorescent object within the brain for the purpose of measuring brain movement. To do this, we centred a small scanning volume, a cube, on the fluorescent object, and displacement was calculated from the x-y, x-z, and y-z projections while an examined head-restrained mouse was running in a linear virtual maze that was projected in front of the eyes of the mouse by a virtual reality system. We separated resting and moving periods according to the simultaneously recorded locomotion information (FIGS. 2A and 2B). In the case of FIG. 2A brain motion was recorded at 12.8 Hz by volume imaging a bright, compact fluorescent object which was surrounded by a darker region. FIG. 2A shows exemplified transient of brain displacement projected on the x axis from a 225 s measurement period when the mouse was running (light) or resting (dark) in the linear virtual maze. Movement periods of the head-restrained mouse were detected by using the optical encoder of the virtual reality system.

Displacement data were separated into two intervals according to the recorded locomotion information (running in light colour and resting in dark colour) and a normalized amplitude histogram of brain motion was calculated for the two periods (see FIG. 2B). Inset shows average and maximum peak-to-peak displacements in the resting and running periods.

Figure 2C:
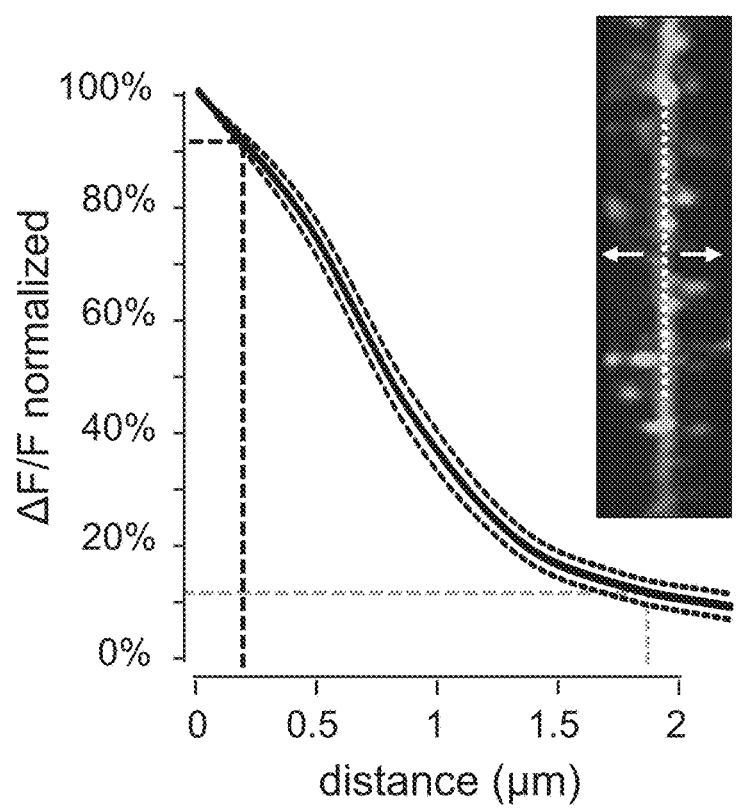
FIG. 2C shows the normalized change in relative fluorescence amplitude as a function of distance. Inset shows dendritic segment example.

FIG. 2C shows the normalized change in relative fluorescence amplitude as a function of distance from the centre of GCaMP6f-labelled dendritic segments ($\Delta F/F(x)$, mean±SEM, n=3). Dark and light dashed lines indicate average peak-to-peak displacement values calculated for the resting (dark) and running (light) periods, respectively. Note the >80% drop in $\Delta F/F$ amplitude for the average displacement value during running. The inset shows a dendritic segment example. $\Delta F/F$ was averaged along a dashed line and then the line was shifted and averaging was repeated to calculate $\Delta F/F(x)$.

Brain motion can induce fluorescent artifacts, because there is a spatial inhomogeneity in the baseline fluorescence and also in the relative fluorescence signals (FIG. 2C). The amplitude of motion-generated fluorescence transients can be calculated by substituting the average peak-to-peak motion error into the histogram of the relative fluorescence change (FIG. 2C). The average $\Delta F/F(x)$ histogram was relatively sharp for dendrites (n=3 repeats, 100 μm long dendritic segments, FIG. 2C), therefore the average motion amplitude during running corresponds to a relatively large (80.1±3.1%, average of 150 cross section) drop in the fluorescence amplitude, which is about 34.4±15.6-fold higher than the average amplitude of a single AP-induced $Ca^{2+}$ response. These data indicate the need for motion artifact compensation.

Figure 2D:
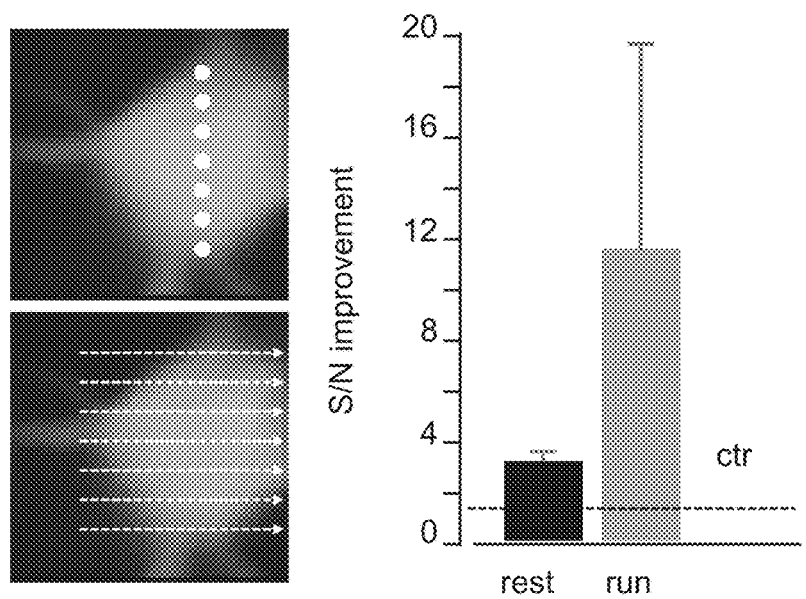
FIG. 2D is an image of a soma of a GCaMP6f-labelled neuron (left), and normalized increase in signal-to-noise ratio (right).

On the left of FIG. 2D an image of a soma of a GCaMP6f-labelled neuron can be seen. Points and dashed arrows indicate scanning points and scanning lines, respectively. On the right, FIG. 2D shows normalized increase in signal-to-noise ratio calculated for resting (dark) and running (light) periods in awake animals when scanning points were extended to scanning lines in somatic recordings, as shown on the left. Signal-to-noise ratio obtained with point-by-point scanning during rest is indicated with dashed line labelled "ctr" serving as control.

Figure 2E:
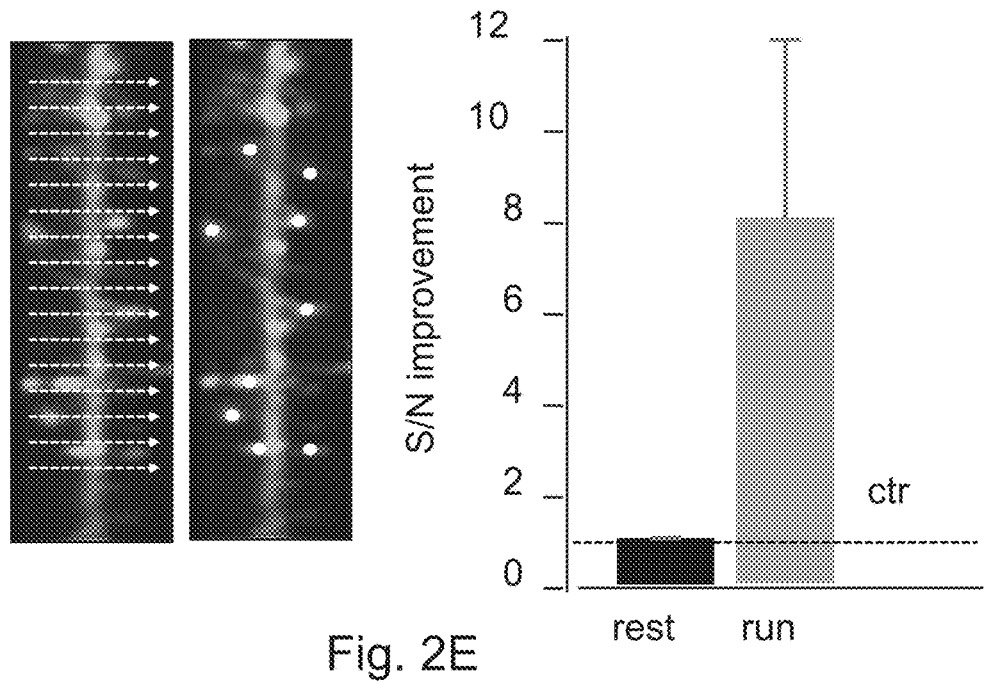
FIG. 2E corresponds to FIG. 2D, but for dendritic recordings.

FIG. 2E demonstrates similar calculations as in FIG. 2D, but for dendritic recordings. Signal-to-noise ratio of point-by-point scanning (ctr) of dendritic spines during rest was compared to 3D ribbon-scanning during resting (dark) and running (light) periods. Note the more than 10-fold improvement when using 3D ribbon scanning.

Figure 2F:
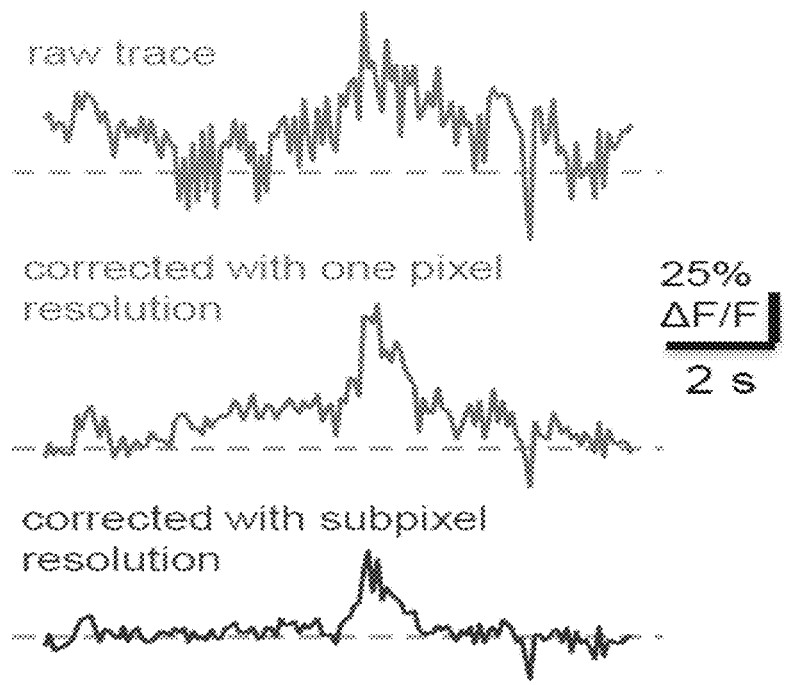
FIG. 2F shows the diagrams of brain motion recordings before and after motion correction.

Next, we analyzed the efficiency of our methods for motion correction during in vivo measurements. As before, we labelled neurons and their processes with a GCaMP6f sensor, used 3D ribbon scanning, and projected the recorded fluorescence data to movie frames. We got the best results when each frame of the video recorded along 3D ribbons was corrected by shifting the frames at subpixel resolution to maximize the fluorescence cross correlation between the successive frames (FIG. 2F). On the left of FIG. 2F exemplified individual $Ca^{2+}$ transient can be seen from a single dendritic spine derived from a movie which was recorded with 3D ribbon scanning along a 49.2 μm spiny dendritic segment in a behaving mouse (raw trace). When $Ca^{2+}$ transients were derived following motion-artifact correction performed at pixel and sub-pixel resolution (in the range of sub-micrometers), the motion-induced artifacts were eliminated and signal-to-noise ratio was improved.

Figure 2G:
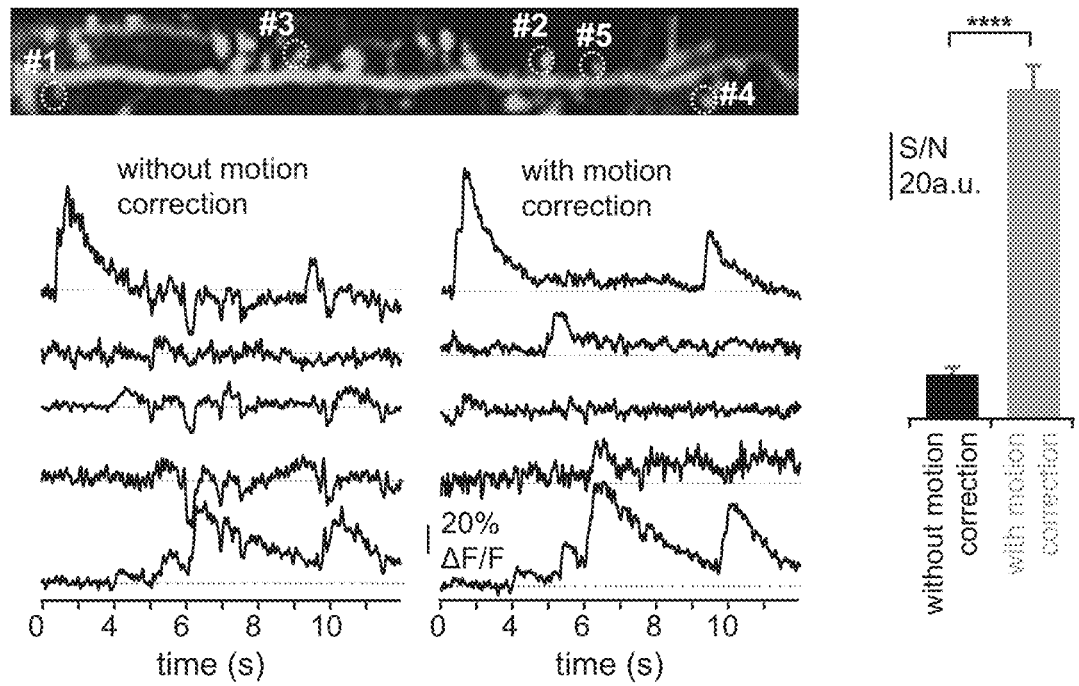
FIG. 2G shows further examples for motion-artifact correction.

Ribbon scanning and the successive frame shifts at subpixel resolution in running animals increased signal-to-noise ratio by 7.56±3.14-fold (p>0.000015, n=10) as compared to 3D random-access point scanning (FIG. 2G). FIG. 2G shows further examples for motion-artifact correction. At the top, a single frame can be seen from the movie recorded with 3D ribbon scanning from an awake mouse. At the bottom, exemplified $Ca^{2+}$ transients can be seen that are derived from the recorded movie frames from the numbered regions, the $Ca^{2+}$ transients from top to bottom correspond to the regions #1 to #5. As can be seen the signal-to-noise ratio of the transients improved when they were derived following motion-artifact correction with subpixel resolution. On the right, signal-to-noise ratio can be seen of spine $Ca^{2+}$ transients calculated (100 transients, n=5/5 spines/mice). Transients are shown without and with motion correction at subpixel resolution.

Next, we investigated separately the effect of the post-hoc frame shifts on the signal-to-noise ratio following ribbon scanning. Low-amplitude spine $Ca^{2+}$ transients were barely visible when transients were derived from the raw video. For a precise analytical analysis we added the same 1, 2, 5, and 10 action-potential-induced average transients to the images of a spiny dendritic segment and a soma. Then we generated frame series by shifting each frame with the amplitude of brain motion recorded in advance (similarly to FIG. 2A). Finally, we recalculated $Ca^{2+}$ transients from the frame series with and without using the motion-correction algorithm, using ROIs at the same size to compare the signal-to-noise ratio of point-by-point scanning and the motion-corrected 3D ribbon scanning on the same area. Our data indicate that 3D ribbon scanning, which, in contrast to point-by-point scanning, allows motion correction, can largely improve the signal-to-noise ratio in the case of small, 1-5 AP-associated signals recorded most frequently during in vivo measurements (11.33±7.92-fold, p>0.025, n=4 somata; n=100 repeats for 1 AP), but the method also significantly improved the signal-to-noise ratio of burst-associated and dendritic responses.

Figure 2H:
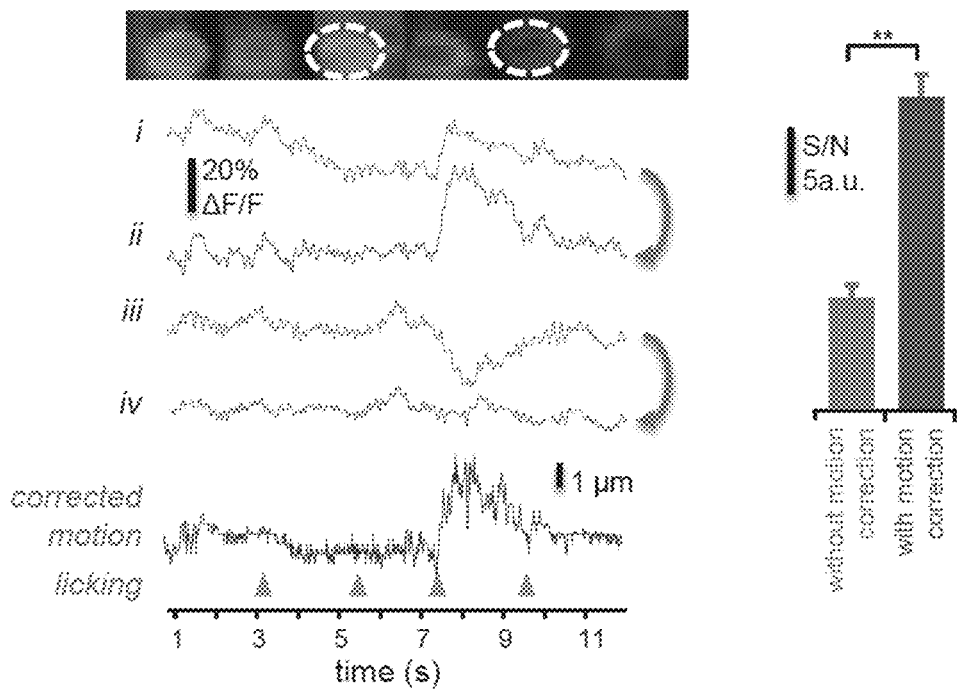
FIG. 2H shows somatic transients with and without motion correction.

Finally, we quantified the efficiency of our method in a "classical" behaviour experimental protocol. We simultaneously recorded multiple somata of vasopressin-expressing interneurons (VIP) during conditioned and unconditioned stimuli. Reward induced large responses in GCamP6f-labelled neurons whose $Ca^{2+}$ signals temporally overlapped with the behaviour induced motion and therefore $Ca^{2+}$ transients were associated with large motion artefacts, even transients with negative amplitude could have been generated. However, our method effectively improved signal-to-noise ratio in these experiments (FIG. 2H). On the left of FIG. 2H simultaneous 3D imaging of VIP neuron somata can be seen during a classical behavior experiment where conditioned stimulus (water reward) and unconditioned stimulus (air puff, not shown) were given for two different sounds. Exemplified somatic transients are shown with (ii and iv) and without (i and iii) motion correction at subpixel resolution. Bottom diagram shows motion amplitude. Note that motion-induced and neuronal $Ca^{2+}$ transients overlap. Moreover, transients could have a negative amplitude without motion correction. On the right, signal-to-noise ratio of the transients are shown on the right with motion correction and on the left without motion correction (mean±SEM, n=3).

EXAMPLE 2

Recording of Spiny Dendritic Segments With Multiple 3D Ribbon Scanning

Figure 3A:
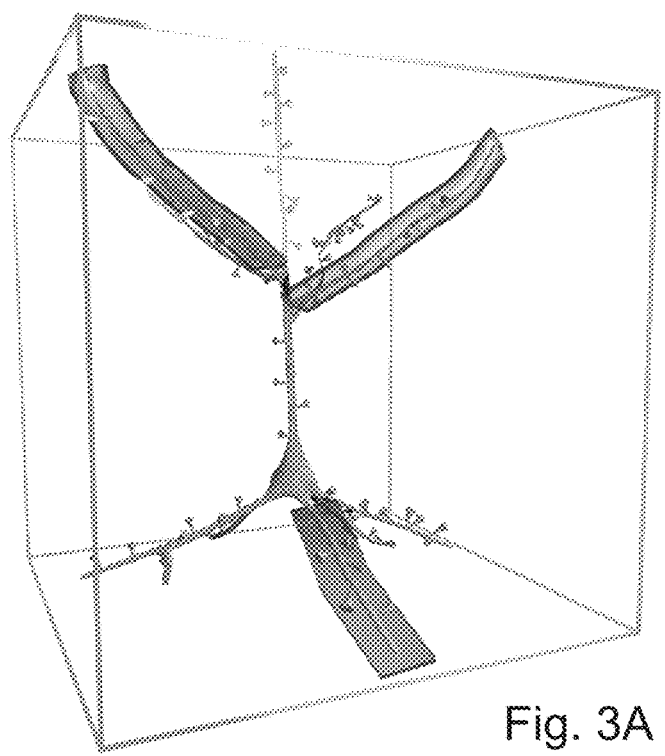
FIG. 3A is a schematic perspective view of multiple dendritic segments.

Recently it has been reported that for many cortical neurons, synaptic integration occurs not only at the axon initial segment but also within the apical and basal dendritic tree. Here, dendritic segments form non-linear computational subunits which also interact with each other, for example through local regenerative activities generated by non-linear voltage-gated ion channels. However, in many cases, the direct result of local dendritic computational events remains hidden in somatic recordings. Therefore, to understand computation in neuronal networks we also need novel methods for the simultaneous measurement of multiple spiny dendritic segments. Although previous studies have demonstrated the simultaneous recording of multiple dendritic segments under in vitro conditions, in vivo recording over large z-scanning ranges has remained an unsolved problem because the brain movement generated by heartbeat, breathing, or physical motion has inhibited the 3D measurement of these fine structures. Therefore, we implemented 3D ribbon scanning to simultaneously record the activity of multiple dendritic segments illustrated in FIG. 3A.

Figure 3B:
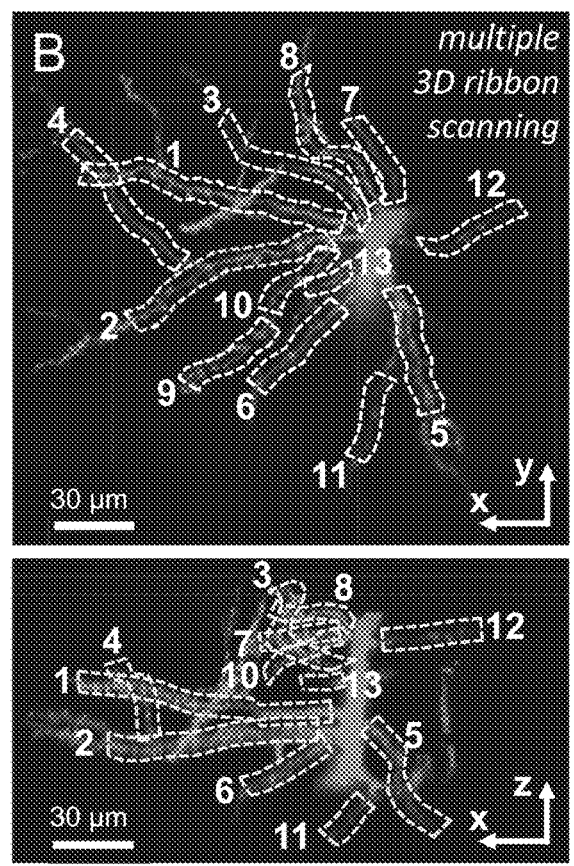
FIG. 3B shows numbered frames in the x-y and x-z plans indicating twelve 3D ribbons used to simultaneously record twelve spiny dendritic segments.

As in the 3D measurement of single dendritic segments, we took a z-stack in advance, selected guiding points in 3D along multiple dendritic segments, and fitted 3D trajectories and, finally, 3D ribbons to each of the selected dendritic segments (FIG. 3B). As above, the surface of the ribbons was set to be parallel to the average motion vector of the brain to minimize the effect of motion artifacts. We selected 12 dendritic segments from a GCaMP6f-labelled V1 pyramidal neuron for fast 3D ribbon scanning (FIG. 3B). FIG. 3B shows maximal intensity projection in the x-y and x-z plans of a GCaMP6f-labelled layer II/III pyramidal neuron. Numbered frames indicate the twelve 3D ribbons used to simultaneously record twelve spiny dendritic segments using 3D ribbon scanning. White frames indicate the same spiny dendritic segments but on the x-z projection.

Figure 3C:
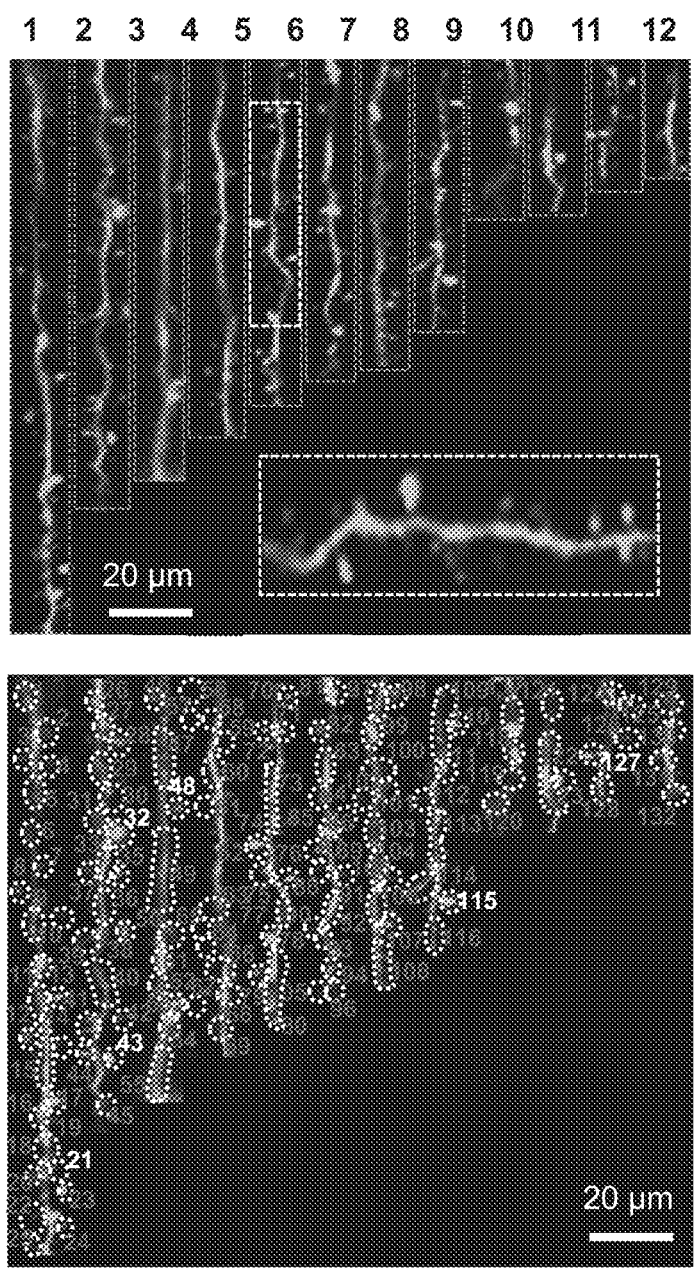
FIG. 3C shows the results of fluorescence recordings made simultaneously along the 12 dendritic regions shown in FIG. 3B.

In the next step, 3D data recorded along each ribbon were 2D projected as a function of distance perpendicular to the trajectory and along the trajectory of the given ribbon. Then, these 2D projections of the dendritic segments were ordered as a function of their length and were placed next to each other (FIG. 3C). At the top, fluorescence was recorded simultaneously along the 12 dendritic regions shown in FIG. 3B. Fluorescence data were projected into a 2D image as a function of the distance along the longitudinal and transverse directions of each ribbon, then all images were ordered next to each other. This transformation allowed the simultaneous recording, successive motion artifact elimination, and visualization of the activity of the 12 selected dendritic regions as a 2D movie. The top image is a single frame from the movie recorded at 18.4 Hz. The inset is an enlarged view of dendritic spines showing the preserved two-photon resolution. At the bottom, numbers indicate 132 ROIs: dendritic segments and spines selected from the video. Note that, in this way, all the dendritic segments are straightened and visualized in parallel. In this way we are able to transform and visualize 3D functional data in real-time as a standard video movie. The 2D projection used here allows fast motion artifact elimination and simplifies data storage, data visualization, and manual ROI selection.

Figure 3D:
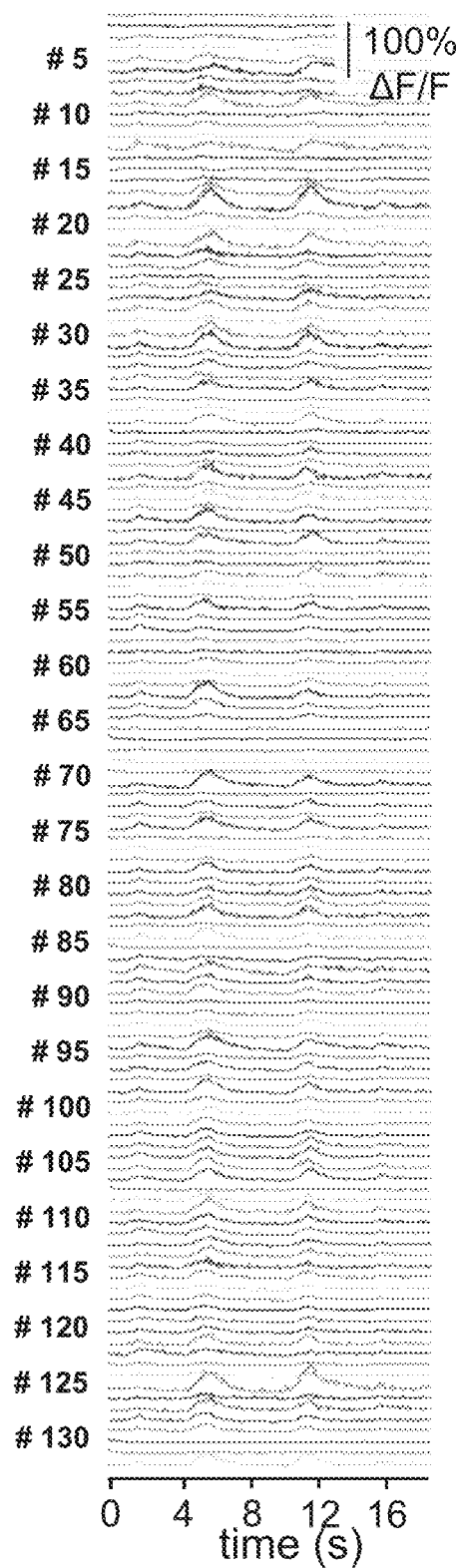
FIG. 3D shows $Ca^{2+}$ transients derived from the 132 numbered regions highlighted in FIG. 3C.
Figure 3E:
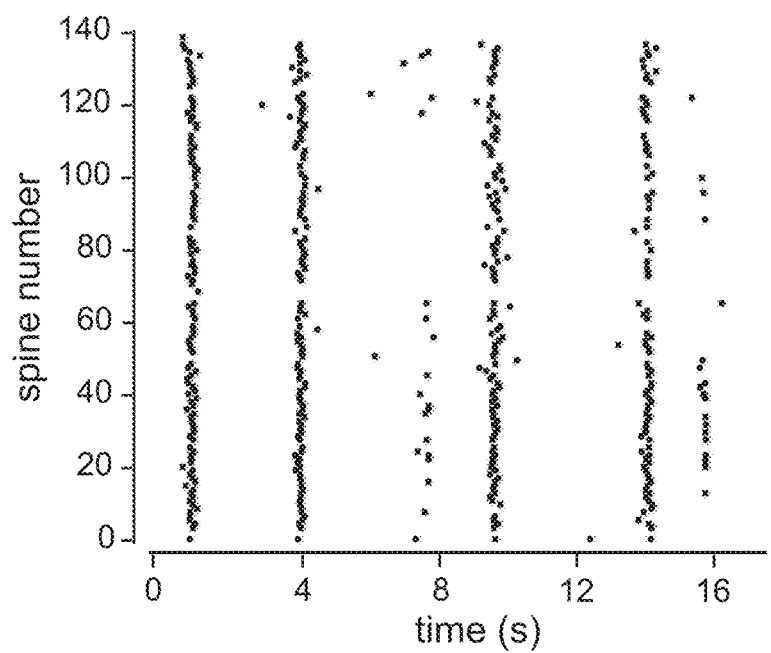
FIG. 3E shows raster plots of activity pattern of the dendritic spines indicated in FIG. 3C.
Figure 3G:
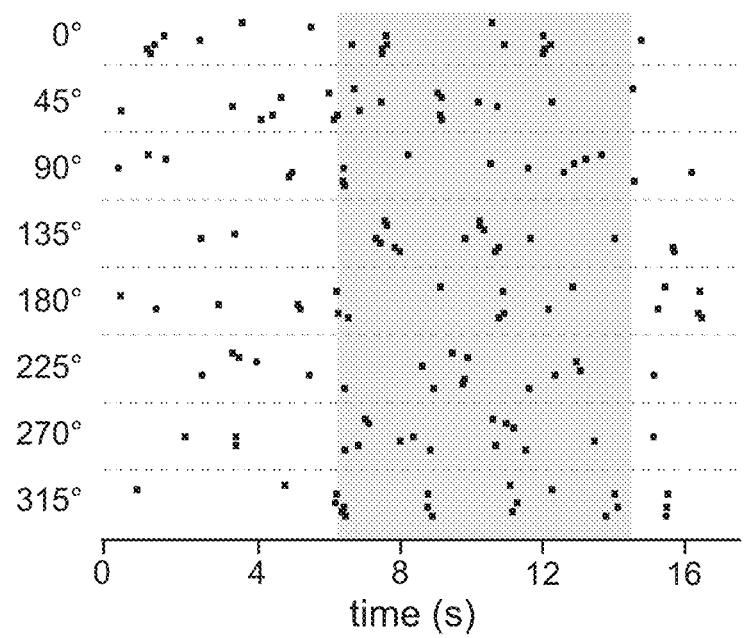
FIG. 3G shows raster plot of the activity pattern of the five dendritic spines from FIG. 3F.
Figure 3F:
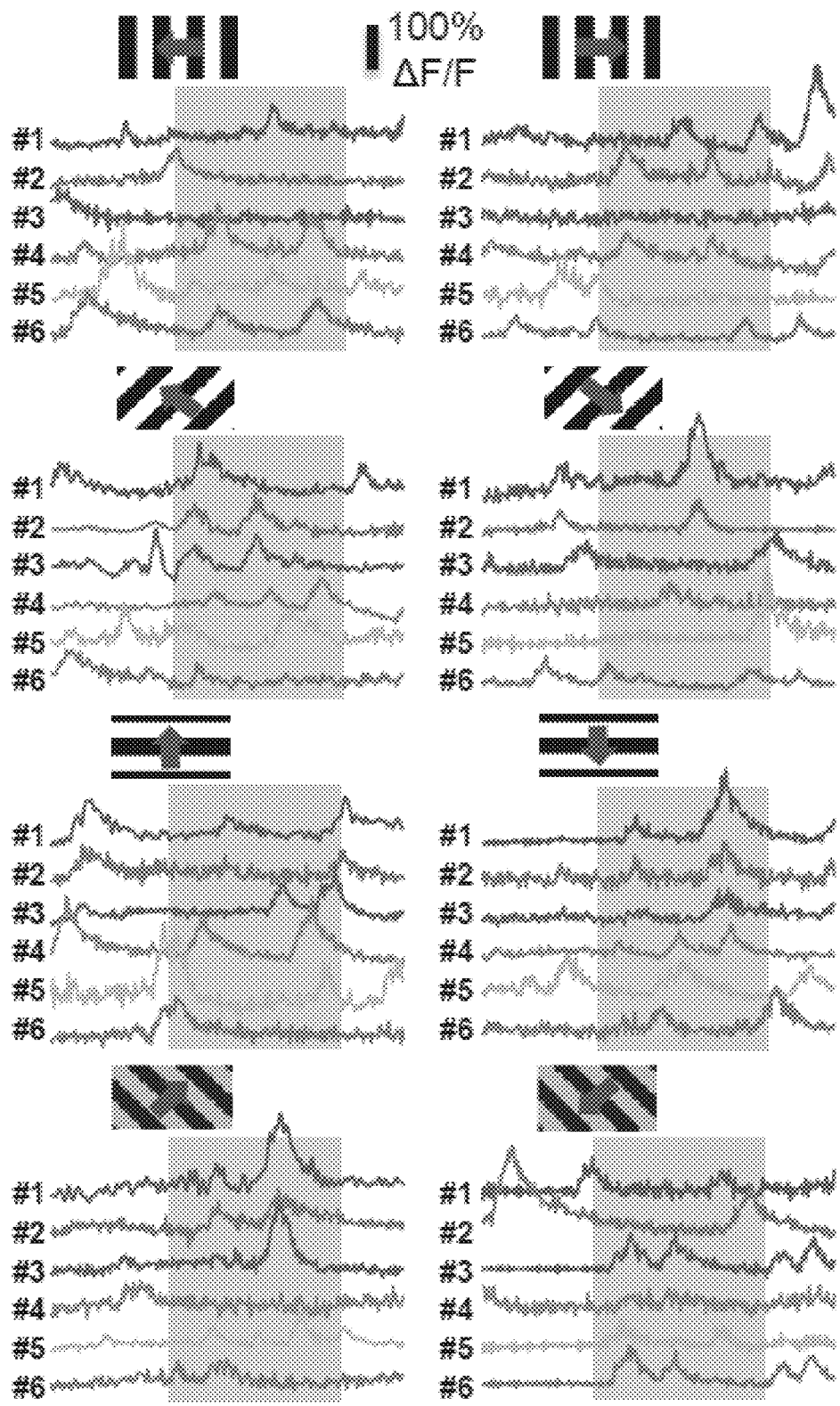
FIG. 3F shows $Ca^{2+}$ transients from the five exemplified dendritic spines indicated with numbers in FIG. 3C.

Since each ribbon can be oriented differently in the 3D space, the local coordinate system of measurements varies as a function of distance along a given ribbon, and also between ribbons covering different dendritic segments. Therefore, brain motion generates artifacts with different relative directions at each ribbon, so the 2D movement correction methods used previously cannot be used for the flattened 2D movie generated from ribbons. To solve this issue, we divided the recordings of each dendritic region into short segments. Then the displacement of each 3D ribbon segment was calculated by cross-correlation, using the brightest image as a reference. Knowing the original 3D orientation of each segment, the displacement vector for each ribbon segment could be calculated. Then we calculated the median of these displacement vectors to estimate the net displacement of the recorded dendritic tree. Next, we projected back the net displacement vector to each ribbon segment to calculate the required backshift for each image of each ribbon segment for motion elimination. Finally, we repeated the algorithm separately in each and every segment to let the algorithm correct for local inhomogeneity in displacement. This allowed, for example, the depth-, and vasculature-, and distance-dependent inhomogeneities in displacement to be eliminated. Following this 3D to 2D transformation and motion artifact elimination, we were able to apply previously developed 2D methods to our 3D $Ca^{2+}$ data to calculate regular $Ca^{2+}$ transients from, for example, over 130 spines and dendritic regions (FIGS. 3C and D). Using our methods, we detected spontaneous and visual stimulation-induced activities (FIGS. 3D and 3F). In FIG. 3F transients were induced by moving grating stimulation, the direction of movement of the grating stimulation is illustrated above each set of graphs. Note the variability in spatial and temporal timing of individual spines. Finally, we generated two raster plots from spine assembly patterns to demonstrate that both synchronous and asynchronous activities of dendritic spine assemblies can be recorded in behaving, moving animals (FIGS. 3E and 3G). In FIG. 3G time of moving grating stimulation in eight different directions is indicated with a grey bar.

EXAMPLE 3

Multi-Layer, Multi-Frame Imaging of Neuronal Networks: Chessboard Scanning

Figure 4A:
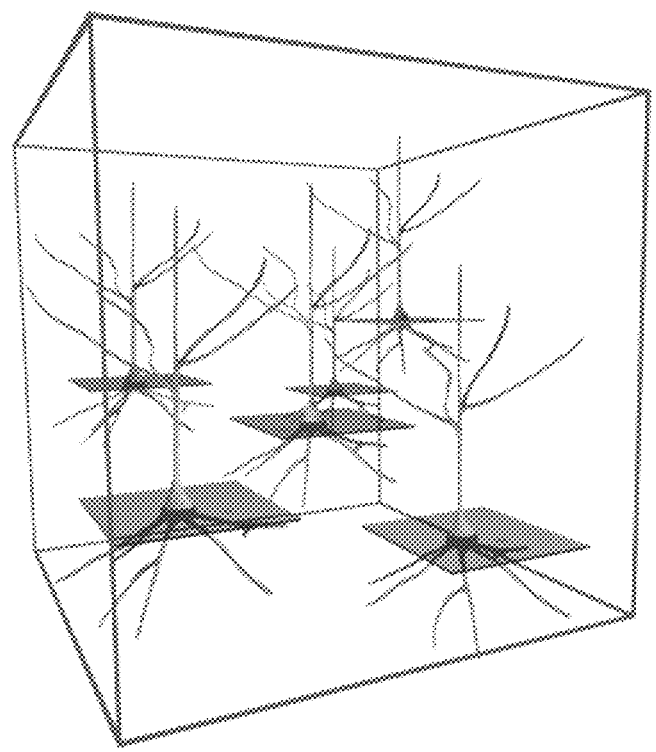
FIG. 4A shows a schematic perspective illustration of chessboard scanning.
Figure 4B:
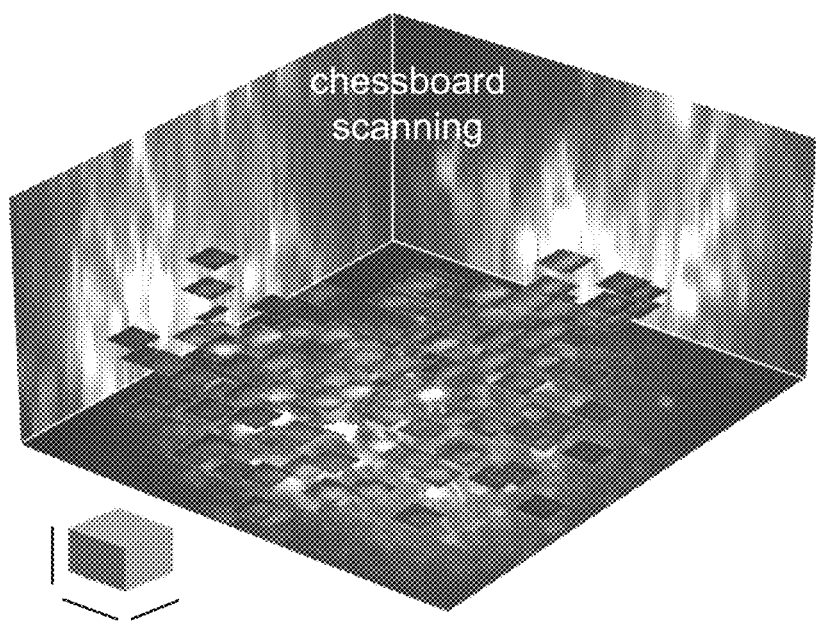
FIG. 4B is a schematic perspective view of the selected scanning regions.

To understand neuronal computation, it is also important to record not only assemblies of spines and dendrites, but also populations of somata. Random-access point scanning is a fast method which provides good signal-to-noise ratio for population imaging in in vitro measurements and in anesthetized mouse models; however, point scanning generates large motion artifacts during recording in awake, behaving animals for two reasons. First, the amplitude of motion artifacts is at the level of the diameter of the soma. Second, baseline and relative fluorescence is not homogeneous in space, especially when GECIs are used for labelling (FIG. 2C). Therefore, we need to detect fluorescence information not only from a single point from each soma, but also from surrounding neighbouring ROIs, in order to preserve somatic fluorescence information during movement. To achieve this, we extended each scanning point to small squares, and in other sets of measurements (see below), to small cubes. We can use the two main strategies described above to set the orientation of squares to be optimal for motion correction: namely, we can set the squares to be either parallel to the direction of motion, or to be parallel to the nominal focal plane of the objective (FIG. 4A): this second strategy will be demonstrated here. FIG. 4B is a schematic perspective view of the selected scanning regions. Neurons from a mouse in V1 region were labelled with GCaMP6f sensor. Neuronal somata and surrounding background areas (small horizontal frames) were selected according to a z-stack taken at the beginning of the measurements. Scalebars in FIG. 4B are 50 µm.

Figure 4C:
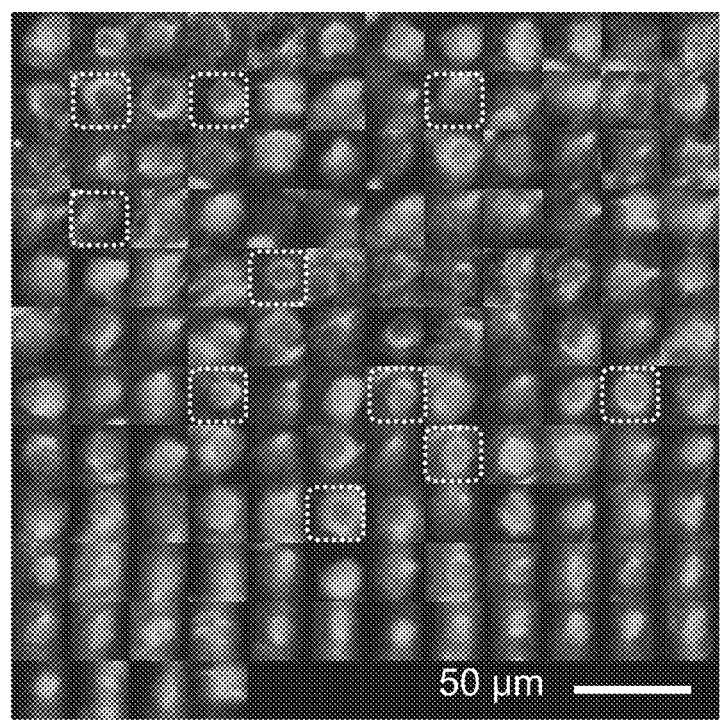
FIG. 4C shows a schematic image of 136 somata during visual stimulation.
Figure 4D:
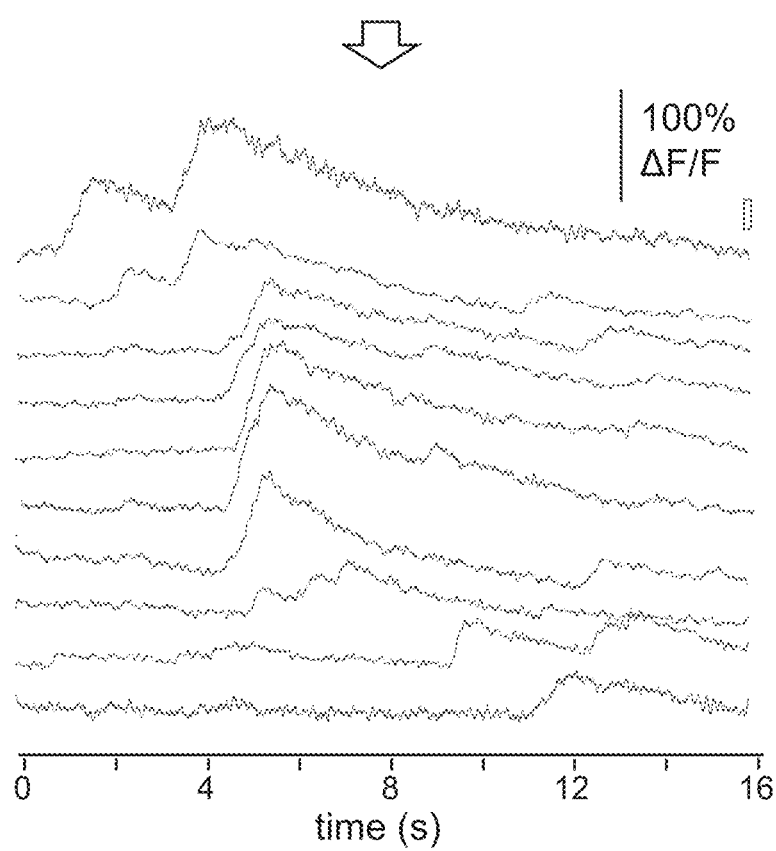
FIG. 4D shows representative somatic $Ca^{2+}$ responses derived from the colour-coded regions in FIG. 4C following motion-artifact compensation.
Figure 4E:
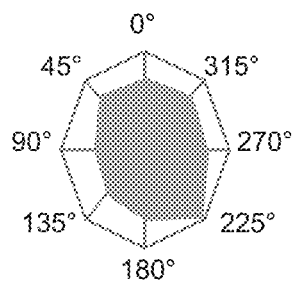
FIG. 4E shows raster plot of average $Ca^{2+}$ responses induced with moving grating stimulation into eight different directions from the colour coded neurons shown in FIG. 4C.
Figure 4E:
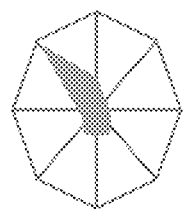
Figure 4E:
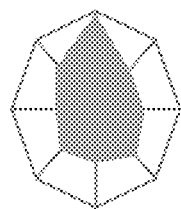
Figure 4E:
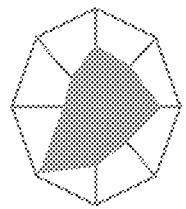
Figure 4E:
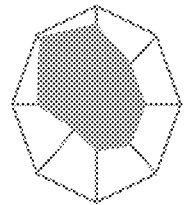
Figure 4E:
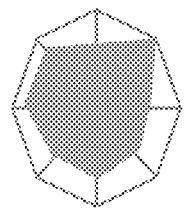

Similarly to 3D ribbon scanning, we can generate a 2D projection of the 3D data during multi-layer, multi-frame recording, even during image acquisition, by simply arranging all the squares, and hence each soma, into a "chessboard" pattern for better visualization and movie recording (this version of multi-layer, multi-frame imaging is called "chessboard" scanning). Similarly to the 3D ribbon scanning, here we calculated the average brain displacement vector as a function of time by cross-correlating the successive frames, and subtracted it from all frames by a corresponding shifting of the frames in order to correct motion artifacts. Note that it is also possible to shift each square of the chessboard separately in order to account for local inhomogeneity of brain motion similarly as explained in connection with multi-ribbon scanning. Finally, we could select sub-regions from the 2D projection and calculate the corresponding $Ca^{2+}$ transients as above (FIGS. 4C-D) and detect orientation and direction sensitive neurons with moving grating stimulation (FIG. 4E). In FIG. 4C selected frames are "transformed" into a 2D "chessboard", where the "squares" correspond to single somata. Therefore, the activity can be recorded as a 2D movie. The image shown in FIG. 4C is a single frame from the video recording of 136 somata during visual stimulation. FIG. 4D shows representative somatic $Ca^{2+}$ responses derived from the colour-coded regions in FIG. 4C following motion-artifact compensation. FIG. 4E shows raster plot of average $Ca^{2+}$ responses induced with moving grating stimulation into eight different directions from the colour coded neurons shown in FIG. 4C.

Multi-layer, multi-frame scanning combines the advantage of low phototoxicity of low-power temporal oversampling (LOTOS) with the special flexibility of the 3D scanning capability of AO microscopy by allowing simultaneous imaging along multiple small frames placed in arbitrary locations in the scanning volume with speeds greater than resonant scanning.

Multi-Layer, Multi-Frame Imaging of Long Neuronal Processes

Figure 4F:
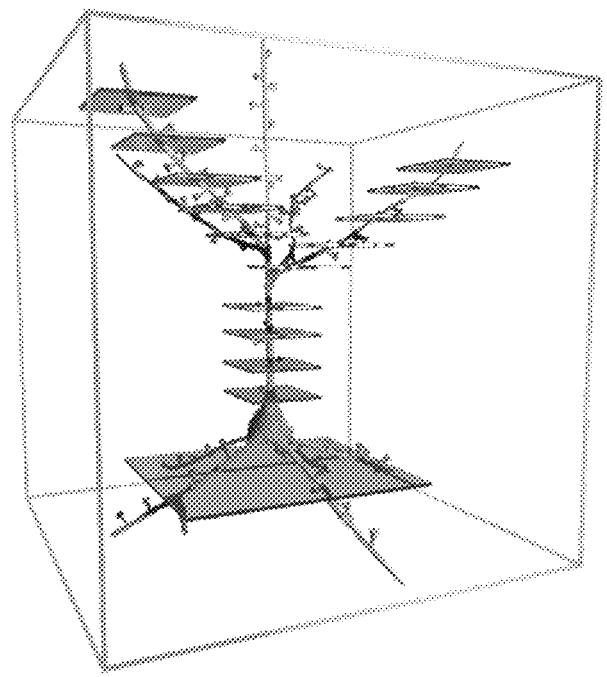
FIG. 4F is a schematic perspective view of multi-frame scanning.
Figure 4G:
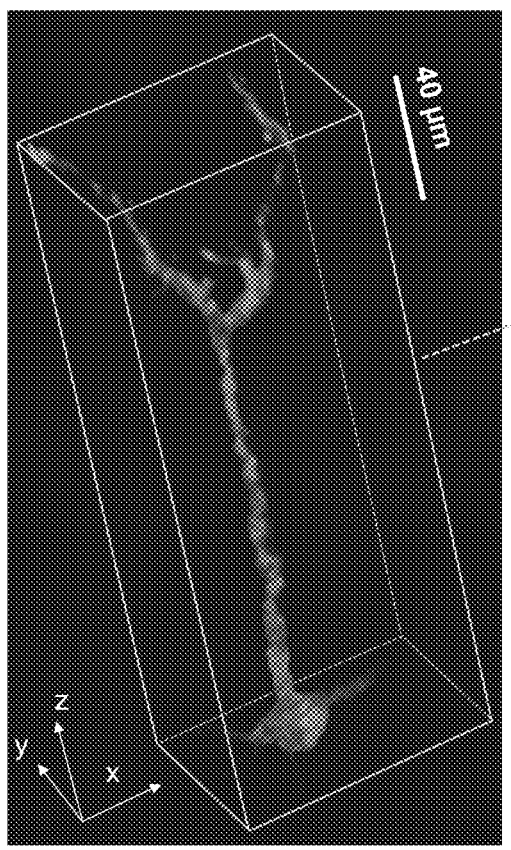
FIG. 4G is a dendritic image of a selected GCaMP6f-labelled layer V pyramidal neuron selected from a sparsely labelled V1 network.
Figure 4H:
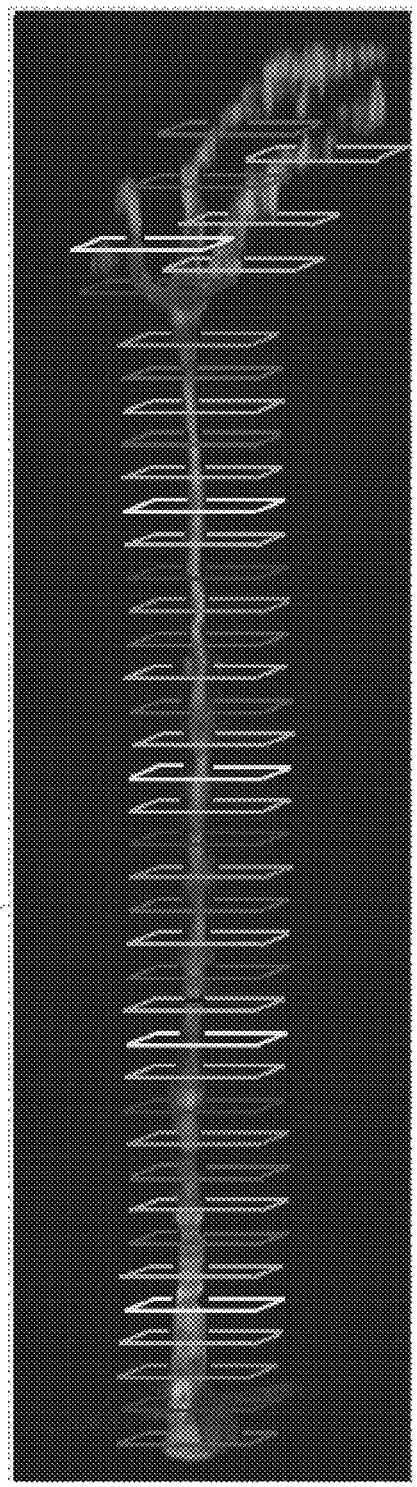
FIG. 4H is the x-z projection of the neuron shown in FIG. 4G, depicts simultaneously imaged dendritic and somatic $Ca^{2+}$ responses.
Figure 4I:
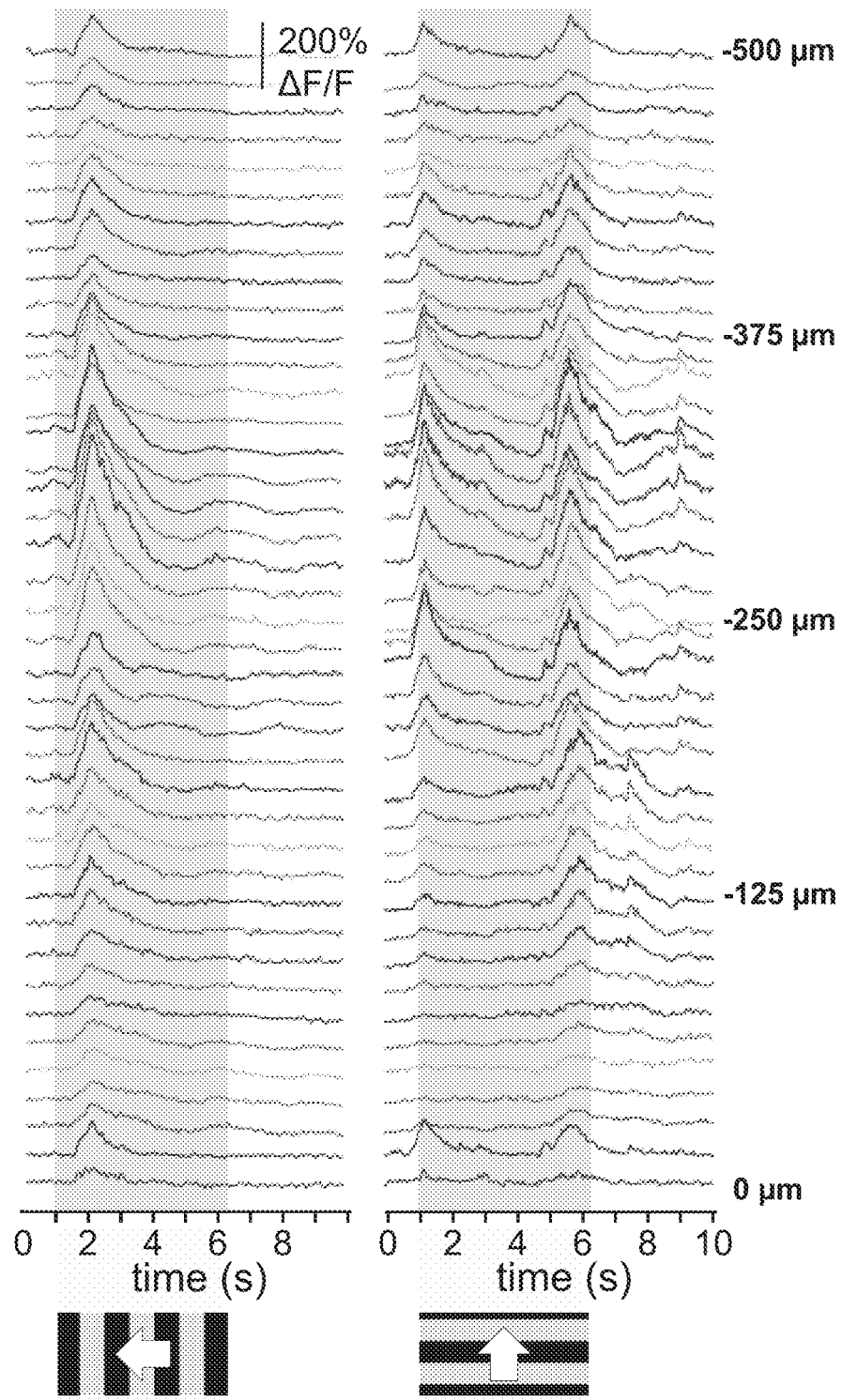
FIG. 4I is a derived $Ca^{2+}$ transients for each ROI.

Multi-layer, multi-frame scanning can also be used to measure neuronal processes (FIG. 4F). FIG. 4F shows the schematic of the measurement. Multiple frames in different size and at any position in the scanning volume can be used to capture activities. Because the total z-scanning range with GECIs was extended to over 650 µm, we can, for example, simultaneously image apical and basal dendritic arbors of layer II/III or V neurons, or follow the activity of dendritic trees in this z-scanning range. To demonstrate the large dendritic imaging range, we selected a GCaMP6f-labelled layer V neuron from a sparsely labelled V1 network (FIG. 4G). FIG. 4H shows the x-z projection of the neuron shown in FIG. 4G. Visual stimulation-induced dendritic and somatic $Ca^{2+}$ responses were simultaneously imaged at 30 Hz in multiple frames situated at 41 different depth levels in over a 500 µm z range in an awake animal (FIG. 4H). The frames indicated in FIG. 4H shows the position of the simultaneously imaged squares. Motion artifacts were eliminated from frames as above by subtracting the time-dependent net displacement vector providing a motion correction with subpixel resolution. Finally, we derived the $Ca^{2+}$ transients for each ROI (see FIG. 4I). Transients were induced by moving gratings stimulation in time periods shown in gray.

Figure 5A:
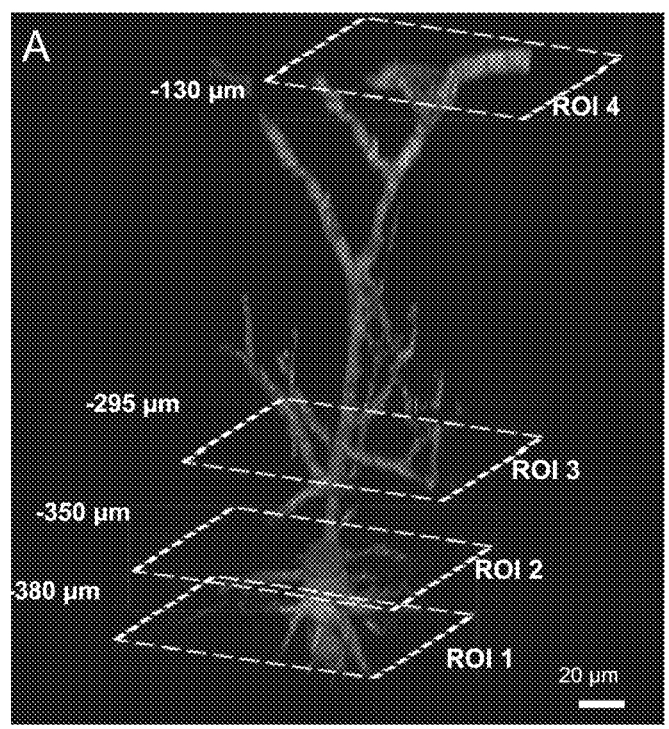
FIG. 5A is a 3D view of a layer II/III neuron labelled with the GCamP6f sensor, where rectangles indicate four simultaneously imaged layers.
Figure 5C:
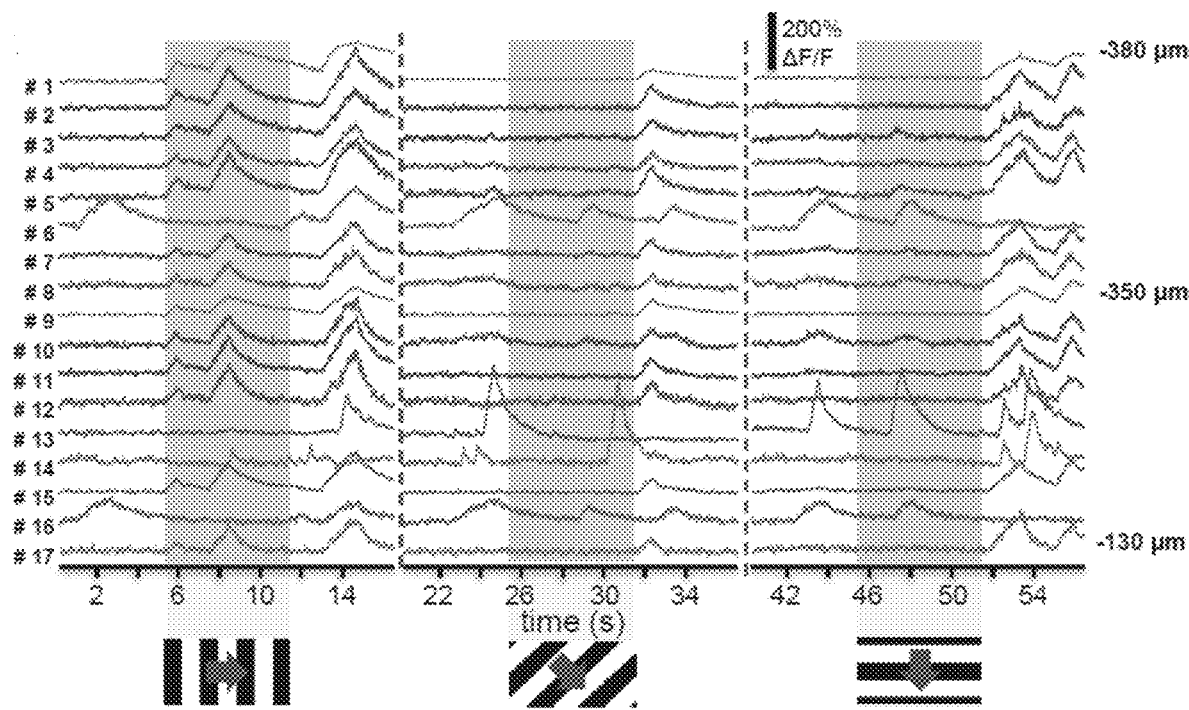
FIG. 5C shows somatic $Ca^{2+}$ responses derived from the numbered yellow sub-regions shown in FIG. 5B following motion artifact elimination.
Figure 5B:
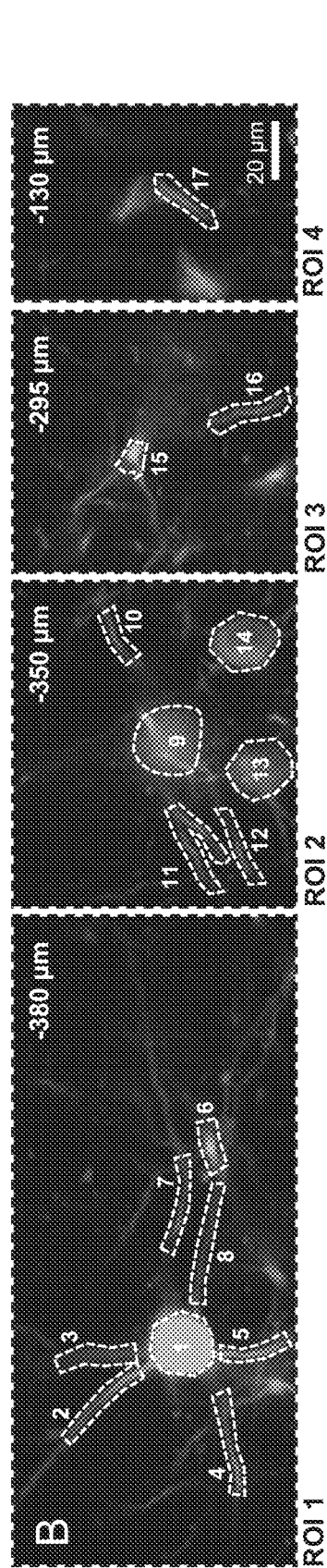
FIG. 5B shows average baseline fluorescence in the four simultaneously measured layers shown in FIG. 5A.
Figure 5D:
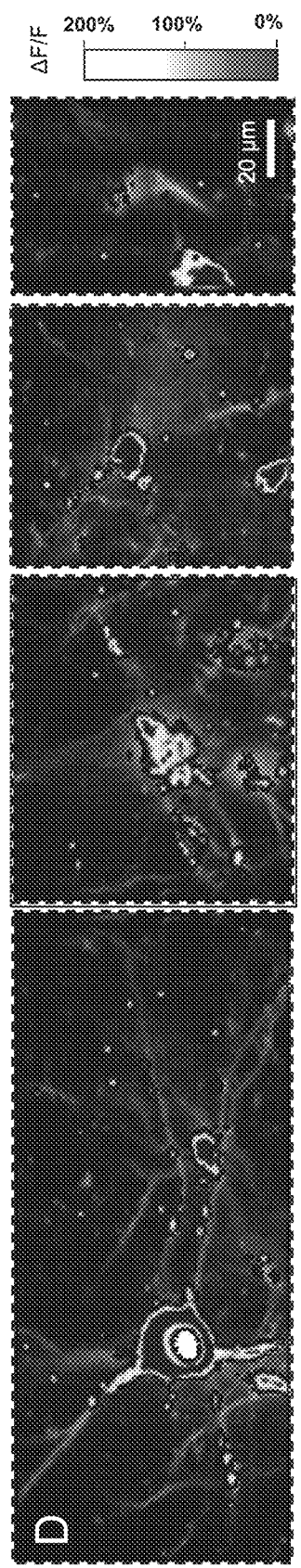
FIG. 5D shows averaged baseline fluorescence images from FIG. 5B.

Naturally, the multi-layer, multi-frame scanning method is not limited to a single dendrite of a single neuron, but rather we can simultaneously image many neurons with their dendritic (or axonal) arbor. FIG. 5A shows a 3D view of a layer II/III neuron labelled with the GCaMP6f sensor. Rectangles indicate four simultaneously imaged layers (ROI 1-4). Numbers indicate distances from the pia matter. Neurons were labelled in the V1 region using sparse labelling. Somata and neuronal processes of the three other GCamP6f labelled neurons situated in the same scanning volume were removed from the z-stack for clarity. We selected four layers of neuropil using a nonspecific AAV vector and recorded activity with 101 Hz simultaneously in four layers. FIG. 5B shows average baseline fluorescence in the four simultaneously measured layers shown in FIG. 5A. Numbers in the upper right corner indicates imaging depth from the pia matter. In FIG. 5C, representative $Ca^{2+}$ transients were derived from the numbered sub-regions shown in FIG. 5B following motion artifact elimination. Responses were induced by moving grating stimulation into three different directions at the temporal intervals indicated with gray shadows. In FIG. 5D the averaged baseline fluorescence images from FIG. 5B are shown on gray scale and were overlaid with the grayscale-coded relative $Ca^{2+}$ changes ($\Delta F/F$). To show an alternative quantitative analysis, we also calculated $Ca^{2+}$ transients (FIG. 5C) from some exemplified somatic and dendritic ROIs (FIG. 5B).

Volume Scanning with Multi-Cube and Snake Scanning

Figure 6A:
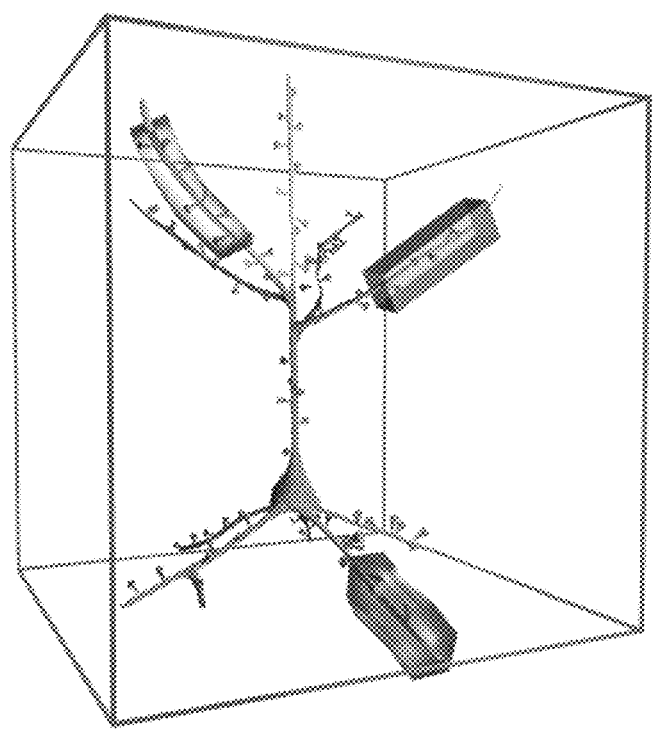
FIG. 6A shows a schematic perspective illustration of snake scanning.
Figure 6B:
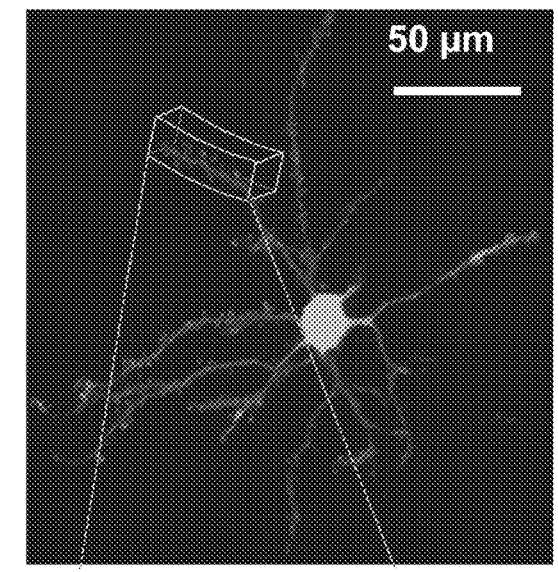
FIG. 6B is a z projection of a pyramidal neuron in V1 region labelled with GCaMP6f sensor using sparse labeling and shows selected dendritic segment at an enlarged scale.
Figure 6B:
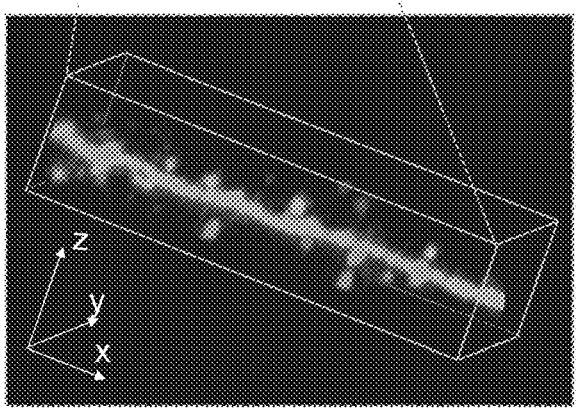
Figure 6C:
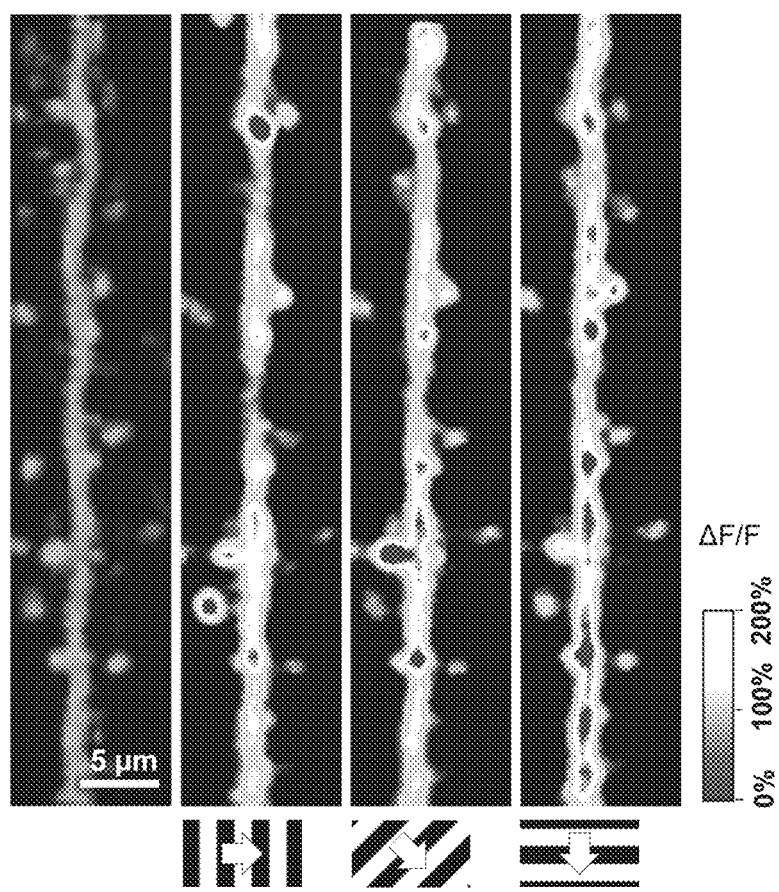
FIG. 6C shows the results of fast snake scanning performed at 10 Hz in the selected dendritic region shown in FIG. 6B.
Figure 6D:
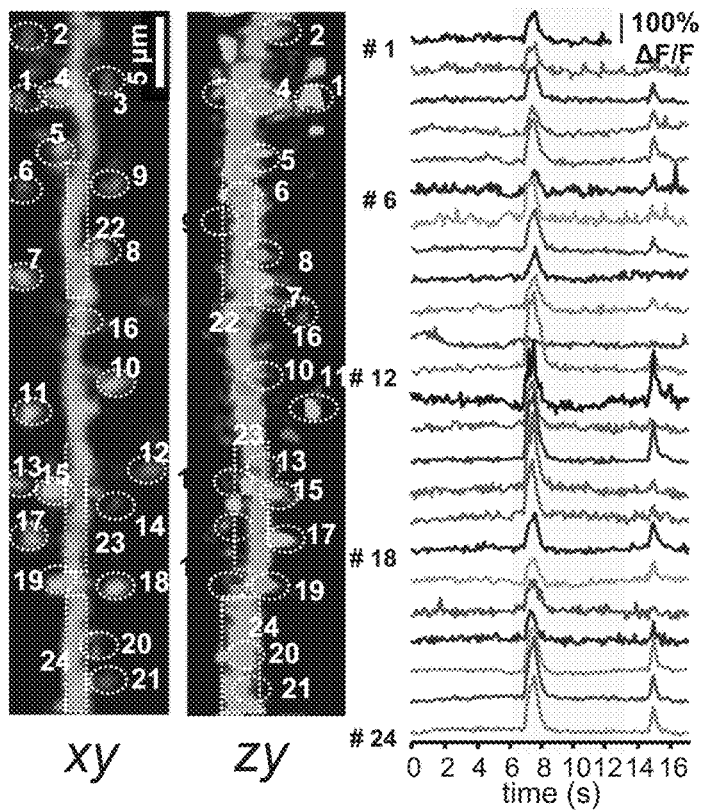
FIG. 6D is the same dendritic segment as in FIG. 6C, but the 3D volume is shown as x-y and z-y plane projections.

Our data demonstrated that, even though the brain moves along all three spatial dimensions, we could still preserve fluorescence information and effectively eliminate motion artifacts by scanning at reduced dimensions, along surface elements, in 3D. However, under some circumstances, for example in larger animals or depending on the surgery or behavioral protocols, the amplitude of motion can be larger and the missing third scanning dimension cannot be compensated for. To sufficiently preserve fluorescence information even in these cases, we can take back the missing scanning dimension by extending the surface elements to volume elements by providing a plurality of auxiliary surface elements substantially parallel to the original surface elements using an automatic algorithm until we reach the required noise elimination efficiency for measurements. To demonstrate this in two examples, we extended 3D ribbons to folded cuboids (called "snake scanning", FIG. 6A) and multi-frames to multi-cuboids. FIG. 6A shows schematic of the 3D measurement. 3D ribbons selected for 3D scanning can be extended to 3D volume elements (3D "snakes") to completely involve dendritic spines, parent dendrites, and the neighbouring background volume to fully preserve fluorescence information during brain movement in awake, behaving animals. FIG. 6B is a z projection of a spiny dendritic segment of a GCaMP6f-labelled layer II/III neuron selected from a sparsely labelled V1 region of the cortex for snake scanning (FIG. 6B). Selected dendritic segment is shown at an enlarged scale. According to the z-stack taken at the beginning, we selected guiding points, interpolated a 3D trajectory, and generated a 3D ribbon which covered the whole segment as described above. Then we extended the ribbon to a volume, and performed 3D snake scanning from the selected folded cuboid (FIGS. 6A-D). In FIG. 6C three dimensional $Ca^{2+}$ responses were induced by moving grating stimulation and were projected into 2D as a function of distances along the dendrite and along one of the perpendicular directions. Fast snake scanning was performed at 10 Hz in the selected dendritic region shown in FIG. 6B. Fluorescence data were projected as a function of the distance along the longitudinal and the transverse directions, and then data were maximal-intensity-projected along the second (and orthogonal) perpendicular axis to show average responses for three moving directions separately and, together, following motion correction. Alternatively, we could avoid maximal intensity projection to a single plane by transforming the folded snake form into a regular cuboid and projecting the 3-dimensional scanning data of the folded snake to this cuboid. In this way we obtain a 3-dimensional movie the successive 3-dimensional frames of which are the successive cuboides to which the temporal scanning data of the folded snake is projected for every measurement. FIG. 6D shows the same dendritic segment as in FIG. 6C, but the 3D volume (cuboid) is shown as x-y and x-z plane projections. Representative spontaneous $Ca^{2+}$ responses were derived from the number coded sub-volume elements which correspond to dendritic spines and two dendritic regions (FIG. 6D). Transients were derived from the sub-volume elements following 3D motion correction at subpixel resolution. In this representation, $Ca^{2+}$ transients could be calculated from different sub-volumes (FIG. 6D). Note that, due to the preserved good spatial resolution, we can clearly separate each spine from each other and from the mother dendrite in moving animals. Therefore, we can simultaneously record and separate transients from spines even when they are located in the hidden and overlapping positions which are required to precisely understand dendritic computation.

Figure 6E:
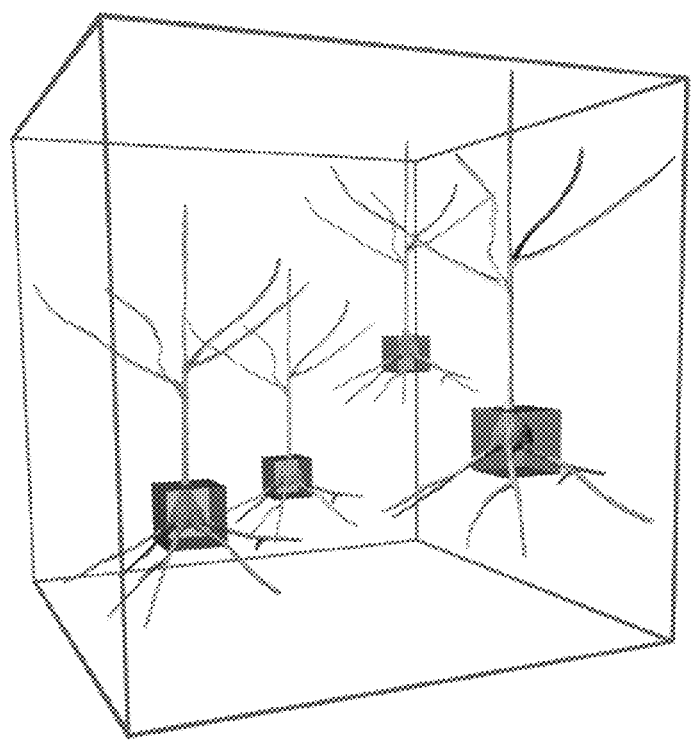
FIG. 6E shows a schematic perspective illustration of 3D multi-cube scanning.
Figure 6F:
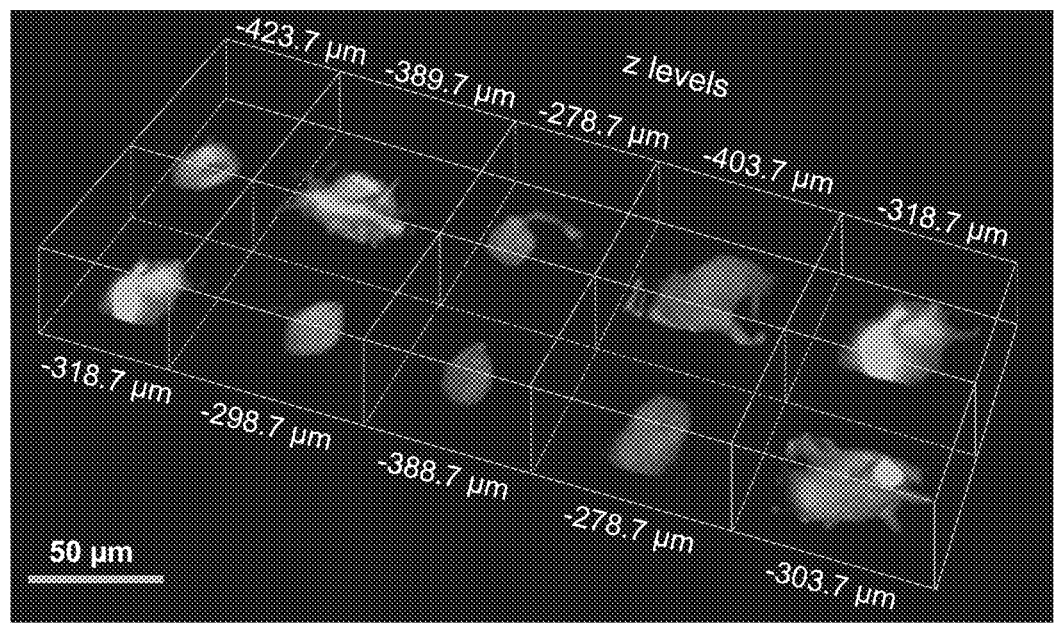
FIG. 6F shows volume-rendered image of 10 representative cubes selecting individual neuronal somata for simultaneous 3D volume imaging.
Figure 6G:
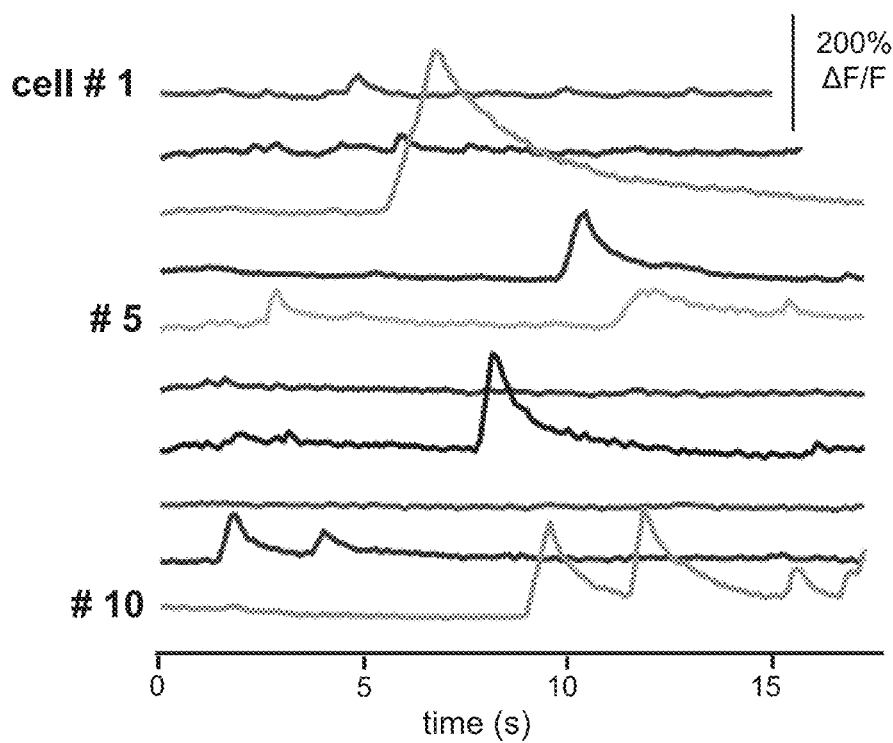
FIG. 6G shows $Ca^{2+}$ transients derived from the 10 cubes shown in FIG. 6F following 3D motion correction.

FIG. 6E shows a schematic perspective illustration of the 3D multi-cube scanning. To demonstrate the multi-cube imaging, we simply extended frames to small cuboides and added a slightly larger z dimension than the sum of the z diameter of somata and the peak z movement to preserve all somatic fluorescent points during motion. FIG. 6F shows volume-rendered image of 10 representative cuboides selecting individual neuronal somata for simultaneous 3D volume imaging. Simultaneous measurements of the ten GCaMP6f-labelled somata were performed from 8.2 Hz up to 25.2 Hz using relatively large cuboides, the size of which was aligned to the diameter of the somata (each cuboid was in the range from 46×14×15 voxels to 46×32×20 voxels, where one voxel was 1.5 µm×3 µm×4 µm and 1.5 µm×1.5 µm×4 µm). This spatial and temporal resolution made it possible to resolve the sub-cellular $Ca^{2+}$ dynamic. We can further increase the scanning speed or the number of recorded cells inversely with the number of 3D drifts used to generate the cubes. For example, 50 somata can be recorded with 50 Hz when using cubes made of 50×10×5 voxels. Similarly to multi-frame recordings, ROIs can be ordered next to each other for visualization (FIG. 6F). In FIG. 6G $Ca^{2+}$ transients were derived from the 10 cuboides shown in FIG. 6F. As above, here we calculated the net displacement vector and corrected sub-volume positions at each time point during calculation of the $Ca^{2+}$ transient in order to eliminate motion. We found that the use of volume scanning reduced the amplitude of motion artifacts in $Ca^{2+}$ transient by 19.28±4.19-fold during large-amplitude movements in behaving animals. These data demonstrated that multi-cube and snake scanning can effectively be used for the 3D measurement of neuronal networks and spiny dendritic segments in multiple sub-volumes distributed over the whole scanning volume. Moreover, these methods are capable of completely eliminating large-amplitude motion artifacts.

Multi-3D Line Scanning

Figure 7A:
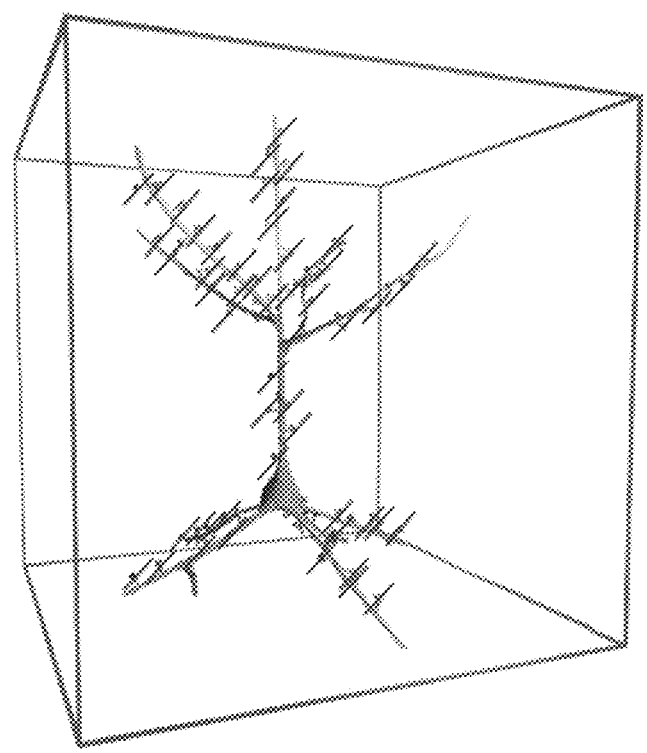
FIG. 7A shows a schematic perspective illustration of multi-3D line scanning.
Figure 7B:
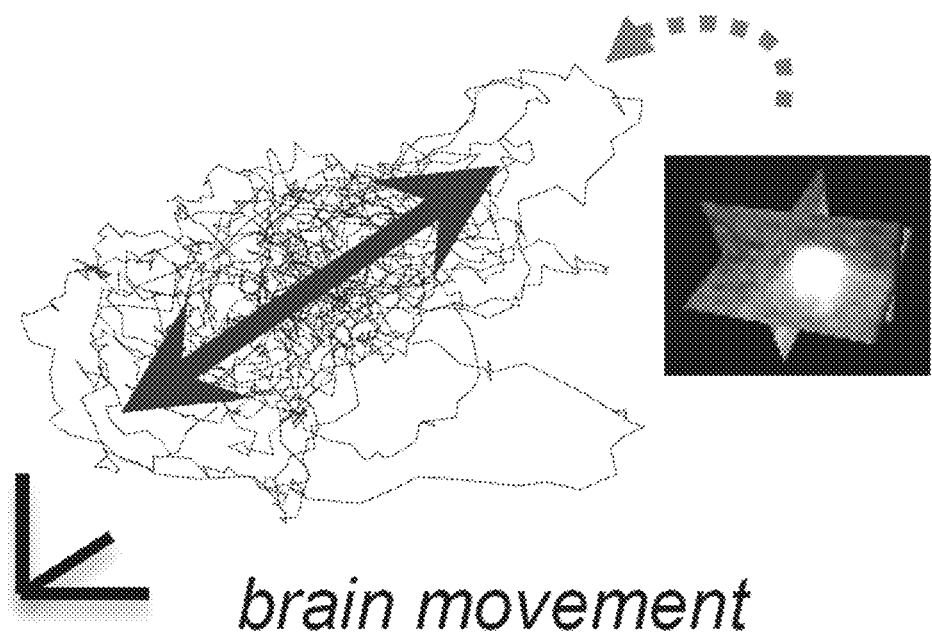
FIG. 7B shows amplitude of brain motion, average motion direction is shown by arrow.
Figure 7C:
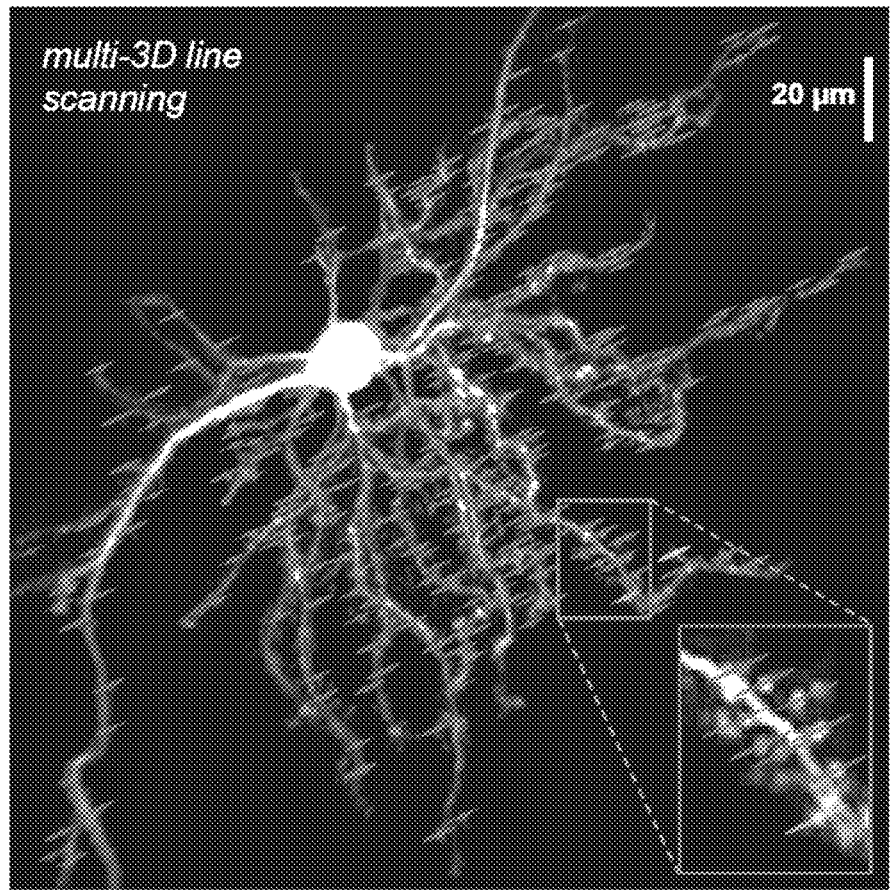
FIG. 7C is a z projection of a layer 2/3 pyramidal cell, labelled with GCaMP6f, white lines indicate the scanning line running through 164 pre-selected spines.
Figure 7D:
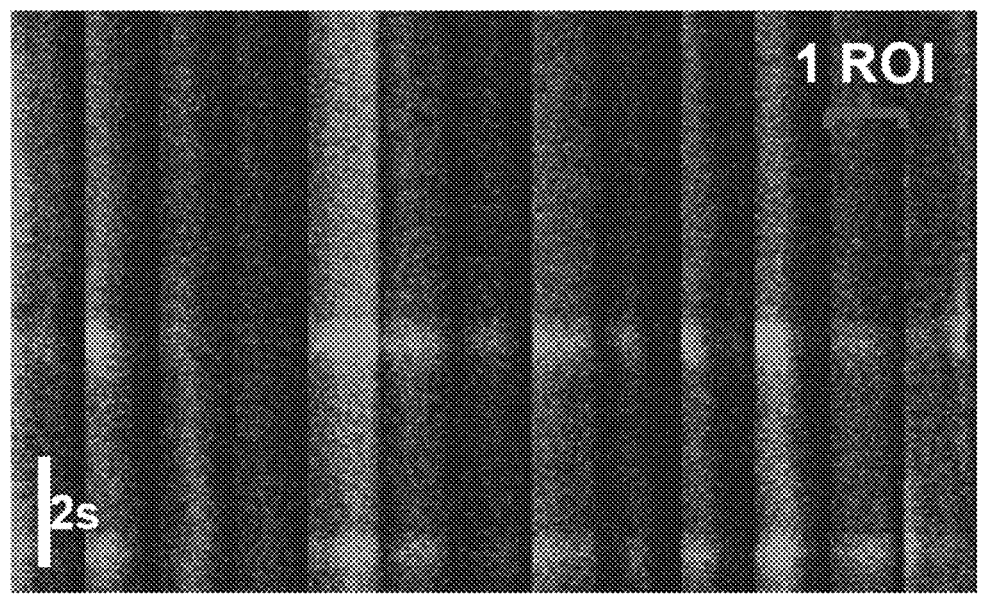
FIG. 7D shows single raw $Ca^{2+}$ response recorded along 14 spines using multi-3D line scanning.
Figure 7E:
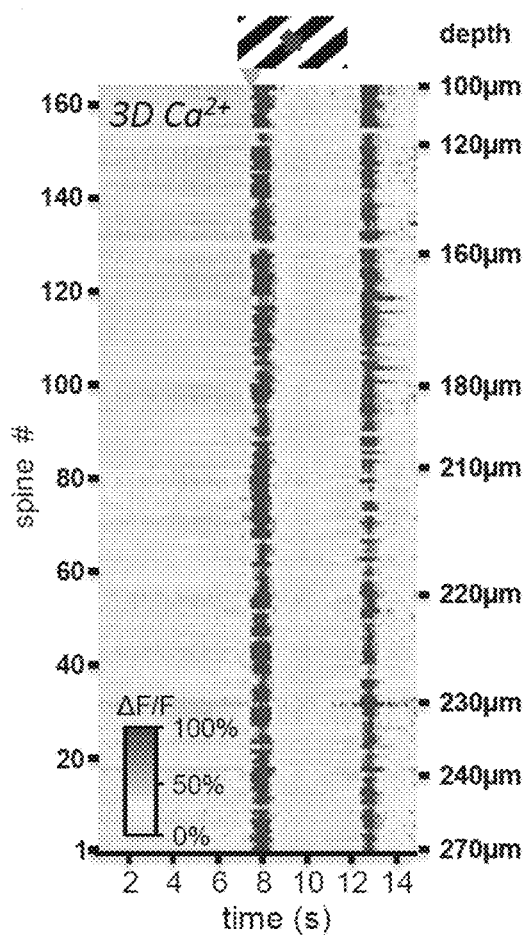
FIG. 7E shows exemplified spine $Ca^{2+}$ transients induced by moving grating stimulation in four different directions.

In the previous section, we extended one-dimensional scanning points to two- or three-dimensional objects. In this section, we extend scanning points along only one dimension to perform measurements at a higher speed. We found that, in many experiments, sample movement is small, and brain motion can be approximated with a movement along a single 3D trajectory (FIG. 7B). FIG. 7A shows a schematic perspective illustration of multi-3D line scanning. Each scanning line is associated with one spine. In this case, we can extend each point of 3D random-access point scanning to only multiple short 3D lines instead of multiple surface and volume elements (FIG. 7A). In the first step we selected points from the z-stack. In the second step, we recorded brain motion by imaging a bright fluorescent object to calculate the average trajectory of motion. In FIG. 7B amplitude of brain motion was recorded in 3D using three perpendicular imaging planes and a bright fluorescence object as in FIG. 2A. Average motion direction is shown in the z projection image of the motion trajectory. In the third step, we generated short (less than 20 µm long) 3D scanning lines with 3D drift AO scanning to each pre-selected point in such a way that the centre of the lines coincided with the pre-selected points, and the scanning lines were set to be parallel to the average trajectory of motion (FIGS. 7B and 7C). FIG. 7C shows z projection of a layer 2/3 pyramidal cell, labelled with GCaMP6f. We simultaneously detected the activity of 169 spines along the 3D scanning lines (FIGS. 7C and E). Parallel gray lines indicate the scanning lines running through the 164 pre-selected spines. All scanning lines were set to be parallel to the average motion shown in FIG. 7B. The corresponding 3D $Ca^{2+}$ responses were recorded simultaneously along the 164 spines. In FIG. 7D a single raw $Ca^{2+}$ response is recorded along 13 spines using multi-3D line scanning. Note the movement artifacts in the raw fluorescence.

Figure 7F:
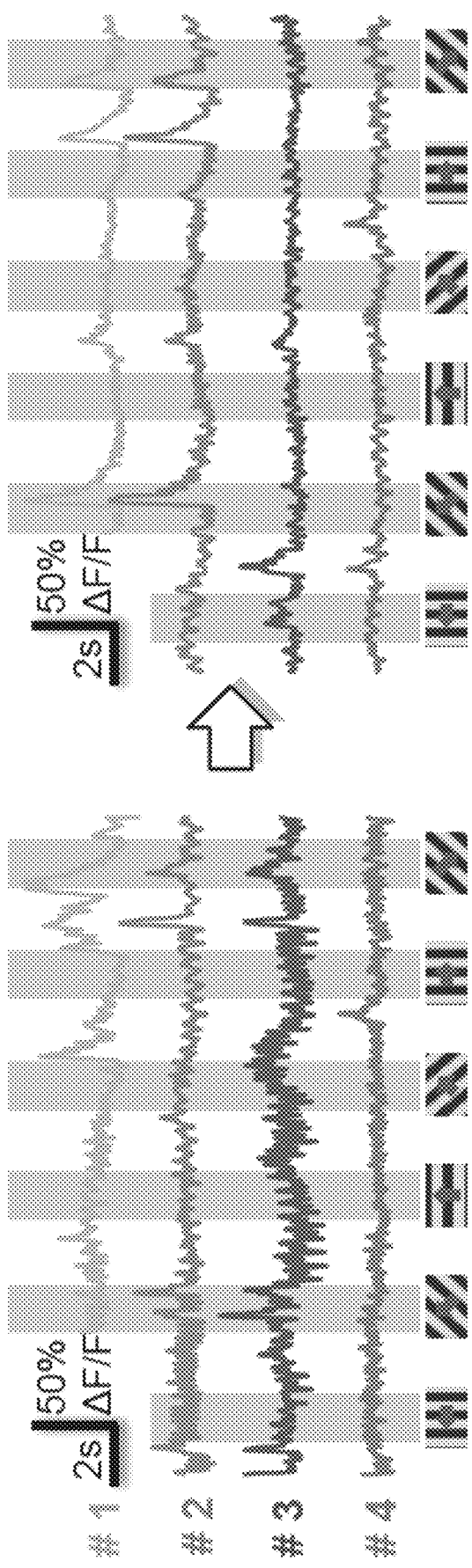
FIG. 7F shows selected $Ca^{2+}$ transients measured using point scanning (left) and multi-3D line scanning (right).

FIG. 7F shows four exemplified spine $Ca^{2+}$ transients induced by moving grating stimulation in six different directions indicated at the bottom which were recorded using point-by-point scanning (left) and multi-3D line scanning (right). It can be well observed that when we switched back from the multi-3D line scanning mode to the classical 3D point-by-point scanning mode, oscillations induced by heartbeat, breathing, and physical motion appeared immediately in transients (FIG. 7F). These data showed an improvement in the signal-to-noise ratio when multi-3D line scanning was used. In cases when the amplitude of the movement is small and mostly restricted to a 3D trajectory, we can effectively use multi-3D line scanning to rapidly record over 160 dendritic spines in behaving animals.

Advantage of the Different Scanning Modes

Figure 8:
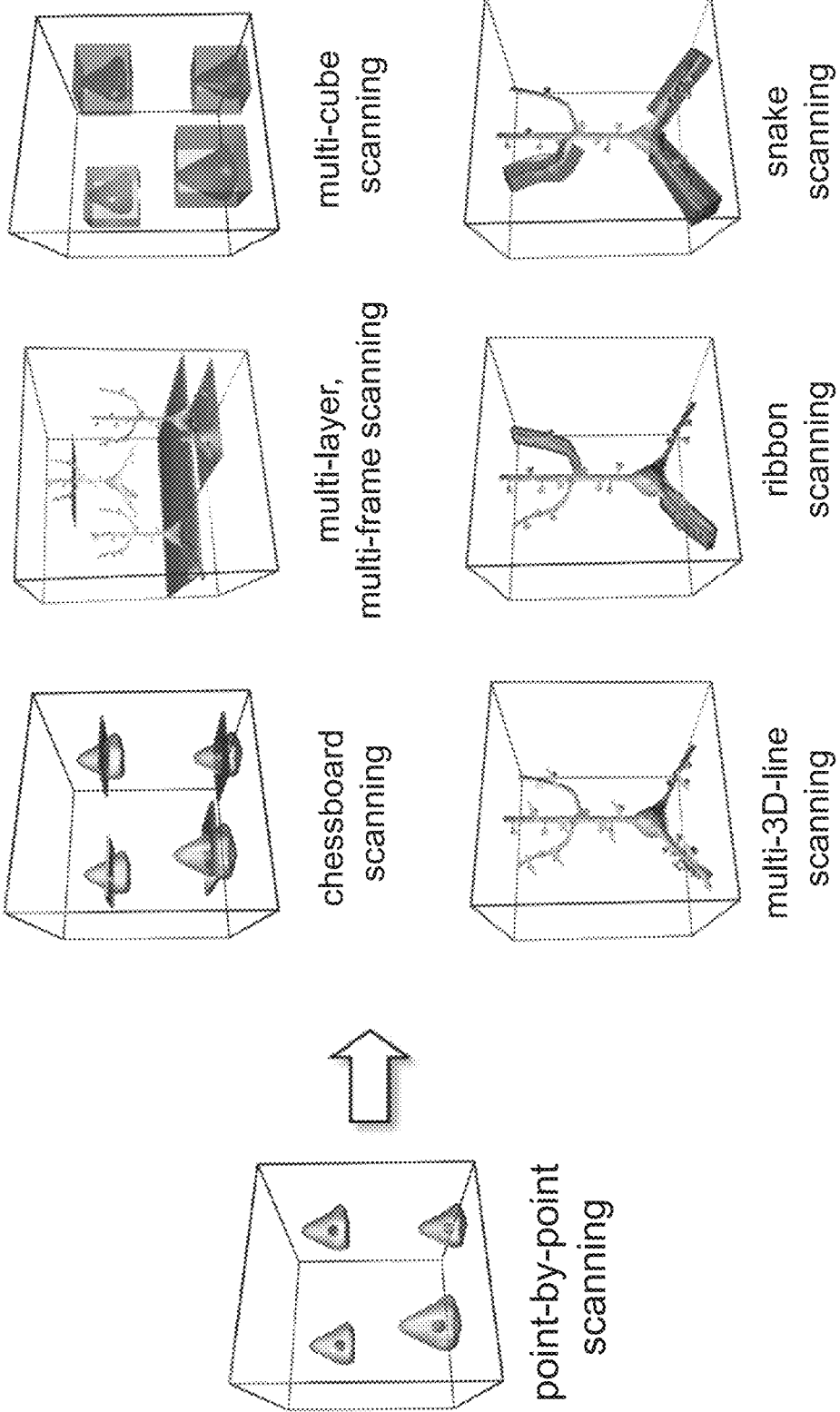
FIG. 8 shows a schematic perspective illustration of the fast different 3D scanning methods according to the present invention.

Above we presented a novel two-photon microscope technique, 3D drift AO scanning, with which we have generated six novel scanning methods: 3D ribbon scanning; chessboard scanning; multi-layer, multi-frame imaging; snake scanning; multi-cube scanning; and multi-3D line scanning as shown in FIG. 8. Points, lines, surface and volume elements illustrate the ROIs selected for measurements.

Each of these scanning methods is optimal for a different neurobiological aim and can be used alone or in any combination for the 3D imaging of moving samples in large scanning volumes. Our method allows, for the first time, high-resolution 3D measurements of neuronal networks at the level of tiny neuronal processes, such as spiny dendritic segments, in awake, behaving animals, even under conditions when large-amplitude motion artifacts in the range of µm are generated by physical movement.

The above described novel laser scanning methods for 3D imaging using drift AO scanning methods have different application fields based on how they are suited to different brain structures and measurement speed. The fastest method is multi-3D line scanning, which is as fast as random access point-by-point scanning (up to 1000 ROIs with 53 kHz per ROI) and can be used to measure spines or somata (FIG. 8).

In the second group multi-layer, multi-frame imaging, chessboard scanning, and 3D ribbon scanning can measure up to 500 ROIs with 5.3 kHz per ROI along long neuronal processes and somata. Finally, the two volume scanning methods, multi-cube scanning and snake scanning, allow measurement of up to 50-100 volume elements up to about 1.3 kHz per volume element, and are ideal for measuring somata and spiny dendritic segments, respectively. The two volume scanning methods provide the best noise elimination capability because fluorescence information can be maximally preserved. Finally, we quantified how the improved signal-to-noise ratio of the new scanning strategies improves single AP resolution from individual $Ca^{2+}$ transients when a large number of neurons was simultaneously recorded in the moving brain of behaving animals. Chessboard scanning, multi-cube scanning, or multi-layer, multi-frame imaging in behaving animals improved the standard deviation of the $Ca^{2+}$ responses with a factor of 14.89±1.73, 14.38±1.67, and 5.55±0.65, respectively, (n=20) as compared to 3D random-access point scanning. Therefore the standard deviation of the motion artifact corrected $Ca^{2+}$ responses became smaller than the average amplitude of single APs, which made single action potential detection available in neuronal network measurements in behaving animals. This was not possible with 3D random-access AO microscopy, because the standard deviation of $Ca^{2+}$ responses was 4.85±0.11-fold higher than the amplitude of single APs when the animal was running.

Experimental Procedure

Surgical Procedure

All experimental protocols for the above described methods were carried out on mice. The surgical process was similar to that described previously (Katona et al. "Fast two-photon in vivo imaging with three-dimensional random-access scanning in large tissue volumes", Nature methods 9:201-208; 2012); Fast two-photon in vivo imaging with three-dimensional random-access scanning in large tissue volumes. Nature methods 9:201-208) with some minor modifications, briefly: mice were anesthetized with a mixture of midazolam, fentanyl, and medetomidine (5 mg, 0.05 mg and 0.5 mg/kg body weight, respectively); the V1 region of the visual cortex was localized by intrinsic imaging (on average 0.5 mm anterior and 1.5 mm lateral to the lambda structure); a round craniotomy was made over the V1 using a dental drill, and was fully covered with a double cover glass, as described previously (see Goldey G J, Roumis D K, Glickfeld L L, Kerlin A M, Reid R C, Bonin V, Schafer D P, Andermann M L (2014); Removable cranial windows for long-term imaging in awake mice. Nature protocols 9:2515-2538). For two-photon recordings, mice were awakened from the fentanyl anesthesia with a mixture of nexodal, revetor, and flumazenil (1.2 mg, 2.5 mg, and 2.5 mg/kg body weight, respectively) and kept under calm and temperature-controlled conditions for 2-12 minutes before the experiment. Before the imaging sessions, the mice were kept head-restrained in dark under the 3D microscope for at least 1 hour to accommodate to the setup. In some of the animals, a second or third imaging session was carried out after 24 or 48 hours, respectively.

AAV Labeling

The V1 region was localized with intrinsic imaging, briefly: the skin was opened and the skull over the right hemisphere of the cortex was cleared. The intrinsic signal was recorded using the same visual stimulation protocol we used later during the two-photon imaging session. The injection procedure was performed as described previously (Chen T W, Wardill T J, Sun Y, Pulver S R, Renninger S L, Baohan A, Schreiter E R, Kerr R A, Orger M B, Jayaraman V, Looger L L, Svoboda K, Kim D S (2013); Ultrasensitive fluorescent proteins for imaging neuronal activity. Nature 499:295-300) with some modifications. A 0.5 mm hole was opened in the skull with the tip of a dental drill over the V1 cortical region (centered 1.5 mm lateral and 1.5 mm posterior to the bregma). The glass micro-pipette (tip diameter ≈10 µm) used for the injections was back-filled with 0.5 ml vector solution (≈6×10$^{13}$ particles/ml) then injected slowly (20 nl/s for first 50 nl, and with 2 nl/s for the remaining quantity) into the cortex, at a depth of 400 µm under the pia. For population imaging we used AAV9.Syn.GCaMP6s.WPRE.SV40 or AAV9.Syn.Flex.GCaMP6f.WPRE.SV40 (in the case of Thy-1-Cre and VIP-Cre animals); both viruses were from Penn Vector Core, Philadelphia, PA. For sparse labeling we injected the 1:1 mixture of AAV9.Syn.Flex.GCaMP6f.WPRE.SV40 and AAV1.hSyn.Cre.WPRE.hGH diluted 10,000 times. The cranial window was implanted 2 weeks after the injection over the injection site, as described in the surgical procedure section.

Discussion

There are a number of benefits of the new 3D drift AO scanning methods in neuroscience: i) it enables a scanning volume, with GECIs more than two orders of magnitude larger than previous realizations, while the spatial resolution remains preserved; ii) it offers a method of fast 3D scanning in any direction, with an arbitrary velocity, without any sampling rate limitation; iii) it makes it possible to add surface and volume elements while keeping the high speed of the recording; iv) it compensates fast motion artifacts in 3D to preserve high spatial resolution, characteristic to two-photon microscopy, during 3D surface scanning and volume imaging even in behaving animals; and v) it enables generalization of the low-power temporal oversampling (LOTOS) strategy of 2D raster scanning in fast 3D AO measurements to reduce phototoxicity.

These technical achievements enabled the realization of the following fast 3D measurements and analysis methods in behaving, moving animals: i) simultaneous functional recording of over 150 spines; ii) fast parallel imaging of activity of over 12 spiny dendritic segments; iii) precise separation of fast signals in space and time from each individual spine (and dendritic segment) from the recorded volume, which signals overlap with the currently available methods; iv) simultaneous imaging of large parts of the dendritic arbor and neuronal networks in a z scanning range of over 650 µm; v) imaging a large network of over 100 neurons with subcellular resolution in a scanning volume of up to 500 µm×500 µm×650 µm with the signal-to-noise ratio more than an order of magnitude larger than for 3D random-access point scanning; and vi) decoding APs with over 10-fold better single AP resolution in neuronal network measurements.

The limits of understanding of neural processes lie now at the fast dendritic and neuronal activity patterns occurring in living tissue in 3D, and their integration over larger network volumes. Until now, these aspects of neural circuit function have not been measured in awake, behaving animals. Our new 3D scanning methods, with preserved high spatial and temporal resolution, provide the missing tool for these activity measurements. Among other advantages, we will be able to use these methods to investigate spike-timing-dependent plasticity and the underlying mechanisms, the origin of dendritic regenerative activities, the propagation of dendritic spikes, receptive field structures, dendritic computation between multiple spiny and aspiny dendritic segments, spatiotemporal clustering of different input assemblies, associative learning, multisensory integration, the spatial and temporal structure of the activity of spine, dendritic and somatic assemblies, and function and interaction of sparsely distributed neuronal populations, such as parvalbumin-, somatostatin-, and vasoactive intestinal polypeptide-expressing neurons. These 3D scanning methods may also provide the key to understanding synchronization processes mediated by neuronal circuitry locally and on a larger scale: these are thought to be important in the integrative functions of the nervous system or in different diseases. Importantly, these complex functional questions can be addressed with our methods at the cellular and sub-cellular level, and simultaneously at multiple spiny (or aspiny) dendritic segments, and at the neuronal network level in behaving animals.

Imaging Brain Activity During Motion

Two-dimensional in vivo recording of spine $Ca^{2+}$ responses have already been realized in anaesthetized animals and even in running animals, but in these papers only a few spines were recorded with a relatively low signal-to-nose ratio. However, fast 2D and 3D imaging of large spine assemblies and spiny dendritic segments in awake, running, and behaving animals has remained a challenge. Yet this need is made clear by recent work showing that the neuronal firing rate more than doubles in most neurons during locomotion, suggesting a completely altered neuronal function in moving, behaving animals. Moreover, the majority of neuronal computation occurs in distant apical and basal dendritic segments which form complex 3D arbors in the brain. However, none of the previous 2D and 3D imaging methods have been able to provide access to these complex and thin (spiny) dendritic segments during running periods, or in different behavioral experiments, despite the fact that complex behavioral experiments are rapidly spreading in the field of neuroscience. One reason is that, in a typical behavioral experiment, motion-induced transients have similar amplitude and kinetic as behavior-related $Ca^{2+}$ transients. Moreover, these transients typically appear at the same time during the tasks, making their separation difficult. Therefore, the 3D scanning methods demonstrated here, alone or in different combinations, will add new tools that have long been missing from the toolkit of neurophotonics for recording dendritic activity in behaving animals.

Compensation of Movement of the Brain

Although closed-loop motion artifact compensation, with three degrees of freedom, has already been developed at low speed (≈10 Hz), the efficiency of the method has not been demonstrated in awake animals, or in dendritic spine measurements, or at higher speeds than those characteristic of motion artefacts. Moreover, due to the complex arachnoidal suspension of the brain, and due to the fact that blood vessels generate spatially inhomogeneous pulsation in their local environment, the brain also exhibits significant deformation, not merely translational movements and, therefore, the amplitude of displacement could be different in each and every sub-region imaged. This is crucial when we measure small-amplitude somatic responses (for example single or a few AP-associated responses) or when we want to measure small structures such as dendritic spines. Fortunately, our 3D imaging and the corresponding analysis methods also allow compensation with variable amplitude and direction in each sub-region imaged, meaning that inhomogeneous displacement distributions can therefore be measured and effectively compensated in 3D.

The efficiency of our 3D scanning and motion artifact compensation methods is also validated by the fact that the standard deviation of individual somatic $Ca^{2+}$ transients was largely reduced (up to 14-fold), and became smaller than the amplitude of a single AP, especially when multi-cube or chessboard scanning was used. This allows single AP resolution in the moving brain of behaving animals using the currently favored GECI, GCaMP6f. The importance of providing single AP resolution for neuronal network imaging has also been validated by recent works which demonstrated that in many systems neuronal populations code information with single APs instead of bursts.

Simultaneous 3D Imaging of Apical and Basal Dendritic Arbor

Recent data have demonstrated that the apical dendritic tuft of cortical pyramidal neurons is the main target of feedback inputs, where they are amplified by local NMDA spikes to reach the distal dendritic $Ca^{2+}$ and, finally, the somatic sodium integration points where they meet basal inputs also amplified by local NMDA spikes. Therefore, the majority of top-down and bottom-up input integration occurs simultaneously at local integrative computational subunits separated by distances of several hundred micrometers, which demands the simultaneous 3D imaging of neuronal processes in a several hundred micrometer z-range. The maximal, over 1000 μm z scanning range of AO microscopy, which is limited during in vivo measurements with GECIs to about 650 μm by the maximal available power of the currently available lasers, already permitted simultaneous measurement of apical and basal dendritic segments of layer II/III neurons and dendritic segments of a layer V neurons in an over 500 μm range.

Although 2D imaging in anesthetized animals can capture long neuronal processes, the location of horizontally oriented long segments is almost exclusively restricted to a few layers (for example to layer I), and in all other regions we typically see only the cross-section or short segments of obliquely or orthogonally oriented dendrites. Moreover, even in cases when we luckily capture multiple short segments with a single focal plane, it is impossible to move the imaged regions along dendrites and branch points to understand the complexity of spatiotemporal integration. The main advantage of the multi-3D ribbon and snake scanning methods is that any ROI can be flexibly selected, shifted, tilted, and aligned to the ROIs without any constraints; therefore, complex dendritic integration processes can be recorded in a spatially and temporally precise manner.

Deep Scanning

Although several great technologies have been developed for fast 3D recordings, imaging deep layer neurons is possible only by either causing mechanical injury or using single-point two-photon or three-photon excitation which allows fluorescence photons scattered from the depth to be collected. Using adaptive optics and regenerative amplifiers can improve resolution and signal-to-noise ratio at depth. Moreover, using GaAsP photomultipliers installed directly in the objective arms can itself extend the in vivo scanning range to over 800 μm. One of the main perspectives of the 3D scanning methods demonstrated here is that the main limitation to reach the maximal scanning ranges of over 1.6 mm is the relatively low laser intensity of the currently available lasers which cannot compensate for the inherent losses in the four AO deflectors. Supporting this over a 3 mm z-scanning range has already been demonstrated with 3D AO imaging in transparent samples where intensity and tissue scattering is not limiting. Therefore in the future novel, high-power lasers in combination with fast adaptive optics and new red shifted sensors may allow a much larger 3D scanning range to be utilized which will, for example, permit the measurement of the entire arbor of deep-layer neurons or 3D hippocampal imaging, without removing any parts from the cortex.

Although there are several different arrangements of passive optical elements and the four AO deflectors with which we can realize microscopes for fast 3D scanning, all of these microscopes use drift compensation with counterpropagating AO waves at the second group of deflectors, and therefore the scanning methods demonstrated here can be easily implemented in all 3D AO microscope. Moreover, at the expense of a reduced scanning volume, 3D AO microscopes could be simplified and used as an upgrade in any two-photon systems. Hence we anticipate that our new methods will open new horizons in high-resolution in vivo imaging in behaving animals.

3D Drift AO Scanning

In the following, we briefly describe how to derive a one-to-one relationship between the focal spot coordinates and speed, and the chirp parameters of the four AO deflectors to move the focal spot along any 3D line, starting at any point in the scanning volume.

In order to determine the relationship between the driver frequencies of the four AO deflectors and the x, y and z coordinates of the focal spot, we need the simplified transfer matrix model of the 3D microscope. Our 3D AO system is symmetric along the x and y coordinates, because it is based on two x and two y cylindrical lenses, which are symmetrically arranged in the x-z and y-z planes. We therefore need to calculate the transfer matrix for one plane, for example for the x-z plane. The first and second x deflectors of our 3D scanner are in a conjugated focal plane, as they are coupled with an afocal projection lens consisting of two achromatic lenses. For the simplicity, therefore, we can use them in juxtaposition during the optical calculations.

Figure 9:
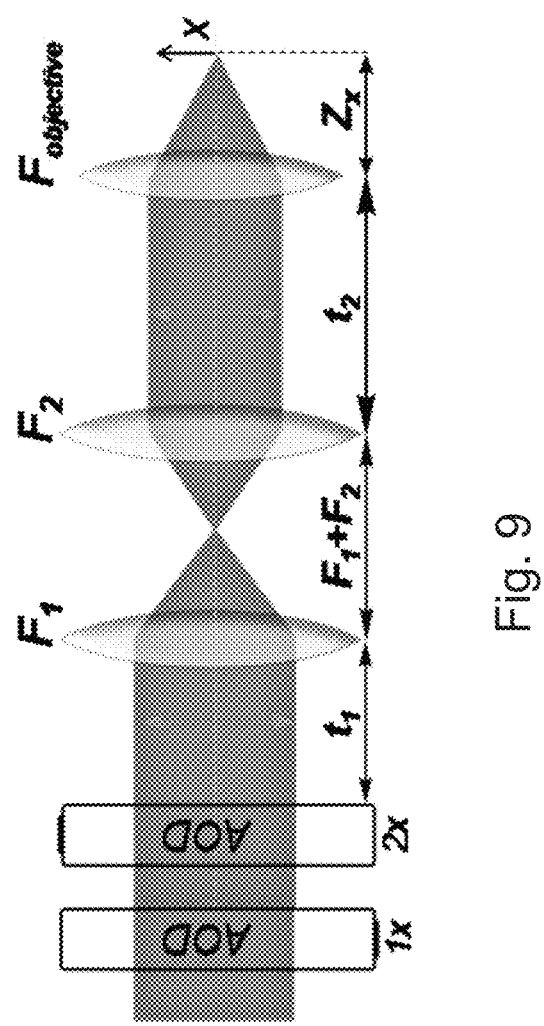
FIG. 9 shows a schematic illustration of the optical geometry of a 3D scanner and focusing system.

As shown in FIG. 9, in our paraxial model we use two lenses with $F_1$ and $F_2$ focal distances at a distance of $F_1+F_2$ (afocal projection) to image the two AO deflectors (AOD $x_1$ and AOD $x_2$) to the objective. $F_{objective}$ is the focal length of the objective, $z_x$ defines the distance of the focal spot from the objective lens along the z-axis, and $t_1$ and $t_2$ are distances between the AO deflector and the first lens of the afocal projection, and between the second lens and the objective, respectively.

The geometrical optical description of the optical system can be performed by the ABCD matrix technique. The angle $(\alpha_0)$ and position $(x_0)$ of the output laser beam of any optical system can be calculated from the angle $(\alpha)$ and position $(x)$ of the incoming laser beam using the ABCD matrix of the system (Equation S1):

$$\begin{pmatrix} x_0 \\ \alpha_0 \end{pmatrix} = A * \begin{pmatrix} x \\ \alpha \end{pmatrix} \qquad \text{[Equation 1]}$$

The deflectors deflecting along x and y directions are also linked by optical systems that can be also modelled paraxially using the ABCD matrix system. To make difference from the optical system between scanner and sample we can denote it by small letters (a b c d). In this way we can determine for each ray passing at a coordinate $x_1$ in the first crystal (deflecting along the x axis) the coordinate $x_2$ and angle $\alpha_2$ taken in the second crystal:

$$\begin{pmatrix} x_2 \\ \alpha_2 \end{pmatrix} = \begin{pmatrix} a & b \\ c & d \end{pmatrix} * \begin{pmatrix} x_1 \\ \alpha_1 \end{pmatrix} \quad \text{[Equation 2]}$$

The link between the second deflector and the sample plane is given by:

$$\begin{pmatrix} x_0 \\ \alpha_0 \end{pmatrix} = \begin{pmatrix} A & B \\ C & D \end{pmatrix} * \begin{pmatrix} x_2 \\ \alpha_{2'} \end{pmatrix} \quad \text{[Equation 3]}$$

Here the $\alpha_2{'}$ is the angle of the ray leaving the crystal after deflection. The relation between $\alpha_2$ and $\alpha_2{'}$ is determined by the deflection rule of the second deflector. The simplest approximation simply gives:

$$\alpha_2{'} = \alpha_2 + K*f_2 \quad \text{[Equation 4]}$$

where K is a proportionality factor between a relative angle deflection ($\alpha$) following the acousto-optic deflector and the local acoustic frequency (f), according to the following equation:

$$\alpha = K*f$$

If the acousto-optic deflectors are the same, then K is the same for all four deflectors, if different deflectors are used then the deflectors are characterized by different K proportionality factors and equations for any given deflector should be calculated using the K proportionality factor of the given deflector. In the following equations same acousto-optic deflectors are considered resulting in uniform K proportionality factors, however a skilled person can readily use different K proportionality factors if the applied deflectors are different.

Applying the second matrix transform we get:

$$x_0(t)=A*x_2+B*\alpha_2{'}(x_2,t)=A*x_2+B*(\alpha_2(x_2,t)+K*f_2(x_2,t)) \quad \text{[Equation 5]}$$

Applying the first matrix transfer, that between the two deflectors:

$$x_0(t)=A*(a*x_1+b*\alpha_1(x_1,t))+B*(c*x_1+d*\alpha_1(x_1,t)+K*f_2(x_2,t)) \quad \text{[Equation 6]}$$

Applying the deflection rule of deflector 1:

$$\alpha_1(x_1,t)=K*f_1(x_1,t) \quad \text{[Equation 7]}$$

we get for the targeted sample coordinates:

$$x_0(t)=A*(a*x_1+b*K*f_1(x_1,t))+B*(c*x_1+d*K*f_1(x_1,t)+K*f_2(x_2,t)) \quad \text{[Equation 8]}$$

In the last step we eliminate $x_2$ from the equation:

$$x_0(t)=A*(a*x_1+b*K*f_1(x_1,t))+B*(c*x_1+d*K*f_1(x_1,t)+K*f_2(a*x_1+b*K*f_1(x_1,t),t)) \quad \text{[Equation 9]}$$

The x and t dependence of the frequencies in the two deflectors can be described by the equations:

$$f_1(x,t) = f_1(0,0) + a_{x1}(t) * \left(t - \frac{D}{2*v_a} - \frac{x_1}{v_a}\right) \quad \text{[Equation 10]}$$

$$f_2(x,t) = f_2(0,0) + a_{x2}(t) * \left(t - \frac{D}{2*v_a} - \frac{x_2}{v_a}\right) \quad \text{[Equation 11]}$$

With these the $x_0$ coordinate:

$$x_0(t)=(A*a+B*c)*x_1+(A*b*K+B*d*K)*f_1(x_1,t))+B*(K*f_2(a*x_1+b*K*f_1(x_1,t),t)) \quad \text{[Equation 12]}$$

When substituting the frequencies:

$$x_0(t) = (A*a+B*c)*x_1 + (A*b*K+B*d*K)*\left(f_1(0,0) + a_{x1}(t)*\left(t - \frac{D}{2*v_a} - \frac{x_1}{v_a}\right)\right) + \\ B*\left(K*\left(f_2(0,0) + a_{x2}(t)*\left(t - \frac{D}{2*v_a} - \frac{(a*x_1 + b*K*(f_1(0,0) + a_{x1}(t)*(t - \frac{D}{2*v_a} - \frac{x_1}{v_a})))}{(v_a)}\right)\right)\right) \quad \text{[Equation 13]}$$

we get the form of the equation that depends only on $x_1$ and t.

Now we can collect the expressions of the coefficients of the $x_1$ containing terms:

The linear $x_1$ term coefficient:

$$A*a+B*c - \frac{A*K*b*a_{x1}(t) + K*B*\frac{a*a_{x2}(t) + K*B*a_{x1}(t)*d}{v_a}}{v_a} + \frac{a_{x1}(t)*a_{x2}(t)*b*B*K^2}{v_a^2} \quad \text{[Equation 14]}$$

This can be made zero quite simply if the coefficients $a_{x1}$ and $a_{x2}$ do not depend on t. In this case we have a simple linear frequency sweep in both deflectors, and a drifting focal spot with constant velocity, when the parameters $a_{x1}$ and $a_{x2}$ fulfill the condition put by the equation:

$$A*a+B*c - \frac{A*K*b*a_{x1}(t) + K*B*\frac{a*a_{x2}(t) + K*B*a_{x1}(t)*d}{v_a}}{v_a} + \frac{a_{x1}(t)*a_{x2}(t)*b*B*K^2}{v_a^2} = 0 \quad \text{[Equation 15]}$$

The $x_0$ coordinate will have the temporal change:

$$x_0(t)=x_0(0)+v_x*t \quad \text{[Equation 16]}$$

with:

$$v_x = A*K*b*a_{x1} + K*B*a_{x2} + K*B*a_{x1}*d - \frac{B*K^2*a_{x1}*a_{x2}*b}{v_a} \quad \text{[Equation 17]}$$

and $$x0(0) = B*K*f2(0,0) + A*K*b*f1(0,0) + \\ B*K*d*f1(0,0) - B*D*K*\frac{a_{x2}}{2*v_a} - \\ \frac{B*K^2*a_{x2}*b*f1(0,0)}{v_a} - \frac{A*D*K*a_{x1}*b}{2*v_a} - \\ \frac{B*D*K*a_{x1}*d}{2*v_a} + \frac{B*D*K^2*a_{x1}*a_{x2}*b}{2*v_a^2}$$

[Equation 18]

It is possible to determine the parameters by inverting the above equations, starting from the desired $v_x$ and $x_0(0)$ values. It is however more complicated, when one wants to move the spot along curves that implies not only constant linear velocity but also acceleration. To achieve this, the $a_{x1}$ and $a_{x2}$ parameters must depend on t in this case. The most simple dependence is linear:

$$a_{x1}(t) = c_{x1} + b_{x1} * \left(t - \frac{D}{2*v_a} - \frac{x_1}{v_a}\right)$$

[Equation 19]

and for the second deflector:

$$a_{x2}(t) = c_{x2} + b_{x2} * \left(t - \frac{D}{2*v_a} - \frac{x_2}{v_a}\right)$$

[Equation 20]

Again using the relation between $x_2$ and $x_1$:

$$a_{x2}(t) = c_{x2} + b_{x2} * \left(t - \frac{D}{2*v_a} - \frac{a*x_1 + b*K*f_1(x_1,t)}{v_a}\right)$$

[Equation 21]

Substituting this into the equation of $x_0$, we get:

$$x_0(t) = (A*a + B*c)*x_1 + (A*b*K + B*d*K)*\left(f_1(0,0) + \left(c_{x1} + b_{x1}*\left(t - \frac{D}{2*v_a} - \frac{x_1}{v_a}\right)\right)*\left(t - \frac{D}{2*v_a} - \frac{x_1}{v_a}\right)\right) +$$

[Equation 22]

$$B*\left(K*\left(f_2(0,0) + \left(c_{x2} + b_{x2}*\left(t - \frac{D}{2*v_a} - \frac{a*x_1 + b*K*\left(f_1(0,0) + \left(c_{x1} + b_{x1}*\left(t - \frac{D}{2*v_a} - \frac{x_1}{v_a}\right)\right)*\left(t - \frac{D}{2*v_a} - \frac{x_2}{v_a}\right)\right)}{v_a}\right)\right)\right.\right.$$

$$\left.\left.*\left(t - \frac{D}{2*v_a} - \frac{a*x_1 + b*K*\left(f_1(0,0) + \left(c_{x1} + b_{x1}*\left(t - \frac{D}{2*v_a} - \frac{x_1}{v_a}\right)\right)*\left(t - \frac{D}{2*v_a} - \frac{x_2}{v_a}\right)\right)}{v_a}\right)\right)\right)$$

Here $x_0$ depends only on $x_1$ and t. To obtain the compact focal spot all $x_1$ dependent terms have to vanish. There are four terms, that have linear, quadratic, cubic and fourth power dependence, and all are depending on t, in the general case. We have to select special cases to find solutions that can be described analytically, since the general case is too complicated.

The general equation 22 can be applied to different optical setups using the particular applicable variables for the matrix elements.

In an exemplary embodiment all deflectors are optically linked by telescopes composed by different focal length lenses.

The general matrix for a telescope linking two deflectors 1 and 2, composed of two lenses—lens 1 and 2—with focal lengths $f_1$ and $f_2$ placed at distance t from each other, lens 1 placed at distance $d_1$ from deflector 1 and lens 2 placed at distance $d_2$ from deflector 2:

$$\begin{pmatrix} a & b \\ c & d \end{pmatrix} = \begin{pmatrix} 1 - \frac{d_2}{f_2} - \frac{d_2 + t*\left(1 - \frac{d_2}{f_2}\right)}{f_1} & d_1 + t + d_2 - \frac{d_2*t}{f_2} - \frac{d_2*d_1}{t_2} - \frac{d_2*d_1}{f_1} - \frac{t*d_1}{f_1} + \frac{d_2*d_1*t}{f_1*f_2} \\ -\frac{f_1 + f_2*t}{f_1*f_2} & \frac{-d_1*f_1 + f_2*f_1 - t*f_1 - f_2*d_1 + d_1*t}{f_2*f_1} \end{pmatrix}$$

Equation 23

If in ideal case of a telescope the lenses are placed at a distance $f_1+f_2$ from each other for optical imaging, the matrix reduces to:

$$\begin{pmatrix} a & b \\ c & d \end{pmatrix} = \begin{pmatrix} -\frac{f_2}{f_1} & f_2 - \frac{d_1 * f_2}{f_1} - \frac{(d_2-f_2)*f_1}{f_2} \\ 0 & \frac{-f_1}{f_2} \end{pmatrix} \quad \text{Equation 24}$$

In the system of the mentioned reference the deflectors are all put at conjugate image planes of the intermediate telescopes. Most efficient imaging with a telescope is performed between the first focal plane of the first lens—meaning $f_1=d_1$ and the second focal plane of the second lens, $f_2=d_2$.

In this case the matrix reduces to:

$$\begin{pmatrix} a & b \\ c & d \end{pmatrix} = \begin{pmatrix} -\frac{f_1}{f_2} & 0 \\ 0 & -\frac{f_1}{f_2} \end{pmatrix} \quad \text{Equation 25}$$

If the two focal lengths are equal we get the simplest relation:

$$\begin{pmatrix} a & b \\ c & d \end{pmatrix} = \begin{pmatrix} -1 & 0 \\ 0 & -1 \end{pmatrix} \quad \text{Equation 26}$$

Between each deflector of the analyzed system either of the matrices from Equations 23-26 can be applied to get the appropriate matrix elements to describe equation 22. If the deflectors deflecting along the x and y axis are positioned alternately, e.g. one x is followed by one y, the telescopes linking the two x direction ($x_1$ and $x_2$) and y direction ($y_1$ and $y_2$) deflectors are described by the multiplication of the matrices describing the $x_1$ and $x_2$ and $y_1$ and $y_2$ deflectors respectively. Here we neglect the propagation through the defectors (of negligible length compared to the distances $d_1$, $f_1$ etc.) and consider that the y deflectors do not modify the propagation angles in the x-z plane and vice versa x directing deflectors have not influence in the y-z plane. Hence using e.g. equation 24 we get for the telescopes formed by lenses of focal lengths $f_1$ and $f_2$ linking the $x_1$ and $y_1$ deflectors and lenses of focal lengths $f_3$ and $f_4$ linking the $y_1$ and $x_2$ deflectors:

$$\begin{pmatrix} a & b \\ c & d \end{pmatrix} = \quad \text{Equation 27}$$

$$\begin{pmatrix} \frac{f_2}{f_1}*\frac{f_4}{f_3} & \frac{\begin{matrix} d_1*f_2^2*f_3^2 + d_2*f_1^2*f_3^2 + d_3*f_2^2*f_4^2 + \\ d_4*f_2^2*f_3^2 - f_1*f_2^2*f_3^2 - f_2*f_1^2*f_3^2 - \\ f_3*f_2^2*f_4^2 - f_4*f_2^2*f_3^2 \end{matrix}}{F_1*f_2*f_3*f_4} \\ 0 & \frac{f_2}{f_1}*\frac{f_4}{f_3} \end{pmatrix}$$

If the focal lengths $f_1=f_2$ and $f_3=f_4$, we get the simplest matrix:

$$\begin{pmatrix} a & b \\ c & d \end{pmatrix} = \begin{pmatrix} 1 & 0 \\ 0 & 1 \end{pmatrix} \quad \text{Equation 28}$$

The optical transfer between the last deflector and the targeted sample plane will be different for the deflectors deflecting along x and y. The optical system linking the last x deflector to the sample plane contains also the telescope between $x_2$ and $y_2$ deflectors made of the lenses with focal lengths $f_3'$ and $f_4'$, the distance between deflector $x_2$ and lens $f_3'$ being $d_3'$, that between lenses $f_3'$ and $f_4'$ being $f_3'+f_4'$, and that between $f_4'$ and deflector $y_2$ being $d_4'$. The optical system between deflector $y_2$ and the targeted sample plane consists of three lenses with focal lengths $F_1$, $F_2$ and $F_{obj}$, the distances between the elements being respectively: $t_1$, $F_1+F_2$, $t_2$, $z_x=z_y$, starting from deflector $y_2$. Hence the complete transfer between $x_2$ and the sample plane is described by:

$$\begin{pmatrix} A_x & B_x \\ C_x & D_x \end{pmatrix} = \begin{pmatrix} 1 & z_x \\ 0 & 1 \end{pmatrix} \begin{pmatrix} 1 & 0 \\ \frac{-1}{F_{obj}} & 1 \end{pmatrix} \begin{pmatrix} 1 & t_2 \\ 0 & 1 \end{pmatrix} \quad \text{Equation 29}$$

$$\begin{pmatrix} 1 & 0 \\ \frac{-1}{F_2} & 1 \end{pmatrix} \begin{pmatrix} 1 & F_1+F_2 \\ 0 & 1 \end{pmatrix} \begin{pmatrix} 1 & 0 \\ \frac{-1}{F_1} & 1 \end{pmatrix} \begin{pmatrix} 1 & t_1 \\ 0 & 1 \end{pmatrix} \begin{pmatrix} 1 & d_4' \\ 0 & 1 \end{pmatrix}$$

$$\begin{pmatrix} 1 & 0 \\ \frac{1}{f_4'} & 1 \end{pmatrix} \begin{pmatrix} 1 & f_3'+f_4' \\ 0 & 1 \end{pmatrix} * \begin{pmatrix} 1 & 0 \\ \frac{-1}{f_3'} & 1 \end{pmatrix} \begin{pmatrix} 1 & d_3' \\ 0 & 1 \end{pmatrix}$$

and that between $y_2$ and sample plane is:

$$\begin{pmatrix} A_y & B_y \\ C_y & D_y \end{pmatrix} = \begin{pmatrix} 1 & z_y \\ 0 & 1 \end{pmatrix} \begin{pmatrix} 1 & 0 \\ \frac{-1}{F_{obj}} & 1 \end{pmatrix} \begin{pmatrix} 1 & t_2 \\ 0 & 1 \end{pmatrix} \quad \text{Equation 30}$$

$$\begin{pmatrix} 1 & 0 \\ \frac{-1}{F_2} & 1 \end{pmatrix} \begin{pmatrix} 1 & F_1+F_2 \\ 0 & 1 \end{pmatrix} \begin{pmatrix} 1 & 0 \\ \frac{-1}{F_1} & 1 \end{pmatrix} \begin{pmatrix} 1 & t_1 \\ 0 & 1 \end{pmatrix}$$

The latter can be written in closed form:

$$\begin{pmatrix} A_y & B_y \\ C_y & D_y \end{pmatrix} = \begin{pmatrix} -\dfrac{F_2}{F_{obj}F_1}(F_{obj} - z_y), & F_1 + F_2 - (F_1 + F_2)\dfrac{z_y}{F_{obj}} - \dfrac{F_2 t_1}{F_1} - \dfrac{F_1 t_2}{F_2} - \dfrac{F_1 z_y}{F_2} + \dfrac{z_y}{F_{obj}}\left(\dfrac{F_2 t_1}{F_1} + \dfrac{F_1 t_2}{F_2}\right) \\ \dfrac{F_2}{F_1 F_{obj}}, & \dfrac{F_2 t_1}{F_1 F_{obj}} - \dfrac{F_1}{F_2 F_{obj}}(F_2 + F_{obj} - t_2) - \dfrac{F_2}{F_{obj}} \end{pmatrix}$$

Equation 31

The values a, b, c, d and A, B, C, D of the matrices can be used in equations like Equation 22 to determine temporal variations of the $x_0$ and $y_0$ coordinates of the focal.

In another embodiment, the deflectors are placed in the order $x_1$-$x_2$-$y_1$-$y_2$, without intermediate telescopes or lenses. The distances between the deflectors are $d_1$, $d_2$ and $d_3$ respectively, starting form deflector $x_1$. Here the thicknesses of the deflectors cannot be neglected relative to the distances between them, their optical thicknesses (refractive index times physical thickness) are denoted by $tx_1$, $tx_2$, $ty_1$, $ty_2$, respectively. The optical transfer matrix linking the deflectors $x_1$ and $x_2$ is:

$$\begin{pmatrix} a_x & b_x \\ c_x & d_x \end{pmatrix} =$$

Equation 32

$$\begin{pmatrix} 1 & \dfrac{tx_2}{2} \\ 0 & 1 \end{pmatrix}\begin{pmatrix} 1 & d1 \\ 0 & 1 \end{pmatrix}\begin{pmatrix} 1 & \dfrac{tx_1}{2} \\ 0 & 1 \end{pmatrix} = \begin{pmatrix} 1 & d_1 + \dfrac{tx_1}{2} + \dfrac{tx_2}{2} \\ 0 & 1 \end{pmatrix}$$

and that between $y_1$ and $y_2$:

$$\begin{pmatrix} a_y & b_y \\ c_y & d_y \end{pmatrix} =$$

Equation 33

$$\begin{pmatrix} 1 & \dfrac{ty_2}{2} \\ 0 & 1 \end{pmatrix}\begin{pmatrix} 1 & d3 \\ 0 & 1 \end{pmatrix}\begin{pmatrix} 1 & \dfrac{ty_1}{2} \\ 0 & 1 \end{pmatrix} = \begin{pmatrix} 1 & d_3 + \dfrac{ty_1}{2} + \dfrac{ty_2}{2} \\ 0 & 1 \end{pmatrix}$$

The optical system between the deflector $y_2$ and the sample plane is the same as in the previously analyzed microscope, formed by three lenses of focal lengths $F_1$, $F_2$ and $F_{obj}$, placed at the same distances as before.

Therefore the ABCD matrix in the y-z plane is the multiplication of that given in Equation 31, and propagation thorough the half of deflector $y_2$:

$$\begin{pmatrix} A_y & B_y \\ C_y & D_y \end{pmatrix} = \begin{pmatrix} -\dfrac{F_2}{F_{obj}F_1}(F_{obj} - z_y), & F_1 + F_2 - (F_1 + F_2)\dfrac{z_y}{F_{obj}} - \dfrac{F_2 t_1}{F_1} - \dfrac{F_1 t_2}{F_2} - \dfrac{F_1 z_y}{F_2} + \dfrac{z_y}{F_{obj}}\left(\dfrac{F_2 t_1}{F_1} + \dfrac{F_1 t_2}{F_2}\right) \\ \dfrac{F_2}{F_1 F_{obj}}, & \dfrac{F_2 t_1}{F_1 F_{obj}} - \dfrac{F_1}{F_2 F_{obj}}(F_2 + F_{obj} - t_2) - \dfrac{F_2}{F_{obj}} \end{pmatrix} * \begin{pmatrix} 1 & \dfrac{ty_2}{2} \\ 0 & 1 \end{pmatrix}$$

Equation 34 but the multiplicative matrix can usually be neglected, since $ty_2$ is usually much smaller than $F_1$, $F_2$, etc.

The ABCD matrix in the x-z plane must take into account the propagation through the deflectors $y_1$ and $y_2$ and the distances between them.

$$\begin{pmatrix} A_x & B_x \\ C_x & D_x \end{pmatrix} = \begin{pmatrix} 1 & z_x \\ 0 & 1 \end{pmatrix}\begin{pmatrix} 1 & 0 \\ -\dfrac{1}{F_{obj}} & 1 \end{pmatrix}\begin{pmatrix} 1 & t_2 \\ 0 & 1 \end{pmatrix}$$

Equation 35

-continued $$\begin{pmatrix} 1 & 0 \\ -\dfrac{1}{F_2} & 1 \end{pmatrix}\begin{pmatrix} 1 & F_1 + F_2 \\ 0 & 1 \end{pmatrix}\begin{pmatrix} 1 & 0 \\ -\dfrac{1}{F_1} & 1 \end{pmatrix}\begin{pmatrix} 1 & t_1 \\ 0 & 1 \end{pmatrix}$$

$$\begin{pmatrix} 1 & \dfrac{ty_2}{2} \\ 0 & 1 \end{pmatrix}\begin{pmatrix} 1 & d_3 \\ 0 & 1 \end{pmatrix}\begin{pmatrix} 1 & \dfrac{ty_1}{2} \\ 0 & 1 \end{pmatrix}\begin{pmatrix} 1 & d_2 \\ 0 & 1 \end{pmatrix}\begin{pmatrix} 1 & \dfrac{tx_2}{2} \\ 0 & 1 \end{pmatrix}$$

These matrix elements will be asymmetric in the x-z and y-z planes, hence the parameters determining the $x_0$ and $y_0$ coordinates of the focal spot must be computed separately.

We realized a system—Katona et al. —that contains less elements than the microscope of Reddy et al., but uses telescope between deflectors $x_1$, $y_1$ and $x_2$, $y_2$, to avoid asymmetry appearing in the system of Tomas et al. expressed by Equations 34 and 35. The telescope between the two deflector pairs is formed by two lenses of equal focal length, placed at twice of the focal length from each other. The telescope performs perfect imaging between deflectors $x_1$ and $x_2$ and deflectors $y_1$ and $y_2$, respectively.

The thicknesses of the deflectors can be neglected compared to the focal lengths of the intermediate telescope lens and compared to the focal lengths $F_1$, $F_2$ and distances $t_1$, $t_2$.

With these approximations, assuming ideal imaging we get for the (a b c d) matrix for both deflector pairs:

$$\begin{pmatrix} a & b \\ c & d \end{pmatrix} = \begin{pmatrix} -1 & 0 \\ 0 & -1 \end{pmatrix}$$

[Equation 36]

The ABCD transfer matrix of the system part shown in FIG. 9 that transfers the rays from the output plane of the second deflector to the focal plane of the objective can be calculated according to Equation 31, since the optical system is the same:

$$\begin{pmatrix} A & B \\ C & D \end{pmatrix} = \begin{pmatrix} 1 & z_x \\ 0 & 1 \end{pmatrix}\begin{pmatrix} 1 & 0 \\ -\dfrac{1}{F_{obj}} & 1 \end{pmatrix}\begin{pmatrix} 1 & t_2 \\ 0 & 1 \end{pmatrix}$$

[Equation 37]

$$\begin{pmatrix} 1 & 0 \\ -\dfrac{1}{F_2} & 1 \end{pmatrix}\begin{pmatrix} 1 & F_1 + F_2 \\ 0 & 1 \end{pmatrix}\begin{pmatrix} 1 & 0 \\ -\dfrac{1}{F_1} & 1 \end{pmatrix}\begin{pmatrix} 1 & t_1 \\ 0 & 1 \end{pmatrix}$$

The product of the matrixes is quite complicated in its general form, it is the same as in Equation 31, but the same for both x and y coordinates, with $z_x = z_y$ $$\begin{pmatrix} A & B \\ C & D \end{pmatrix} = \begin{pmatrix} -\frac{F_2}{F_{obj}F_1}(F_{obj} - z_x), & F_1 + F_2 - (F_1 + F_2)\frac{z_x}{F_{obj}} - \frac{F_2 t_1}{F_1} - \frac{F_1 t_2}{F_2} - \frac{F_1 z_x}{F_2} + \frac{z_x}{F_{obj}}\left(\frac{F_2 t_1}{F_1} + \frac{F_1 t_2}{F_2}\right) \\ \frac{F_2}{F_1 F_{obj}}, & \frac{F_2 t_1}{F_1 F_{obj}} - \frac{F_1}{F_2 F_{obj}}(F_2 + F_{obj} - t_2) - \frac{F_2}{F_{obj}} \end{pmatrix}$$ [Equation 38]

However, we can use the simplification below, considering that the afocal optical system produces the image of the deflector output plane on the aperture of the objective lens, with the ideal telescope imaging. In this case, $t_1 = F_1$ and $t_2 = F_2$. With this simplification we get:

$$\begin{pmatrix} A & B \\ C & D \end{pmatrix} = \begin{pmatrix} -\frac{F_2}{F_{obj}F_1}(F_{obj} - z_x), & -\frac{F_1 z_x}{F_2} \\ \frac{F_2}{F_1 F_{obj}}, & -\frac{F_1}{F_2} \end{pmatrix}$$ [Equation 39]

Using this matrices in Equation 36 and 39 we can calculate the angle ($\alpha_0$) and coordinate ($x_0$) of any output ray in the x-z plane at a given z distance ($z_x$) from the objective from the angle ($\alpha$) and position (x) taken in the plane of the last AO deflector. The same calculation can be used for the y-z plane. The $x_0$ coordinate is given in general form by Equation 22, where we now insert the (abcd) matrix elements from Equation 36, and replace $x_1$ by x, representing the x coordinate in the first deflector:

$$x_0(t) = (-A) * x - (B * K) * \Big(f_1(0, 0) +$$ [Equation 40]
$$\left(c_{x1} + b_{x1} * \left(t - \frac{D}{2 * v_a} - \frac{x}{v_a}\right)\right) * \left(t - \frac{D}{2 * v_a} - \frac{x}{v_a}\right)\Big) +$$
$$B * \Big(K * \Big(f_2(0, 0) + \left(c_{x2} + b_{x2} * \left(t - \frac{D}{2 * v_a} + \frac{x}{v_a}\right)\right) *$$
$$\left(t - \frac{D}{2 * v_a} + \frac{x}{v_a}\right)\Big)\Big)$$

We replace the matrix elements A and B also, from Equation 39:

$$x_0(t) = \left(\frac{F_2}{F_{obj}F_1}(F_{obj} - z_x)\right) * x + \left(\frac{F_1 z_x}{F_2} * K\right) * \Big(f_1(0, 0) +$$ [Equation 41]
$$\left(c_{x1} + b_{x1} * \left(t - \frac{D}{2 * v_a} - \frac{x}{v_a}\right)\right) * \left(t - \frac{D}{2 * v_a} - \frac{x}{v_a}\right)\Big) -$$
$$\frac{F_1 z_x}{F_2} * \Big(K * \Big(f_2(0, 0) + \left(c_{x2} + b_{x2} * \left(t - \frac{D}{2 * v_a} + \frac{x}{v_a}\right)\right) *$$
$$\left(t - \frac{D}{2 * v_a} + \frac{x}{v_a}\right)\Big)\Big)$$

After same transformations and simplifications we get:

$$x_0(t) =$$ [Equation 42]
$$-\frac{F_2}{F_{obj}F_1}(F_{obj} - z_x) * x - \frac{F_1 z_x}{F_2} * K * \Big(f_1(0, 0) - f_2(0, 0) +$$
$$b_{x1} * \left(t - \frac{D}{2v_a} - \frac{x}{v_a}\right)^2 - b_{x2} * \left(t - \frac{D}{2v_a} + \frac{x}{v_a}\right)^2 +$$

-continued
$$c_{x1} * \left(t - \frac{D}{2v_a} - \frac{x}{v_a}\right) - c_{x2} * \left(t - \frac{D}{2v_a} + \frac{x}{v_a}\right)\Big)$$

Expanding the terms in brackets, we get separate x- and t-dependent parts:

$$x_0(t) = -\frac{F_1 z_x}{F_2} * K * (b_{x1} - b_{x2}) * \left(t - \frac{D}{2v_a}\right)^2 -$$ [Equation 43]
$$\frac{F_1 z_x}{F_2} * K * (b_{x1} - b_{x2}) * \left(\frac{x}{v_a}\right)^2 +$$
$$\left(-\frac{F_2}{F_{obj}F_1}(F_{obj} - z_x) - \frac{F_1 z_x}{F_2} * K * \Big[-2 * (b_{x1} + b_{x2}) *$$
$$\left(t - \frac{D}{2v_a}\right) * \frac{1}{v_a} - (c_{x1} + c_{x2}) * \frac{1}{v_a}\Big]\right) * x +$$
$$\frac{F_1 z_x}{F_2} * K * \left(f_1(0, 0) - f_2(, 0) + (c_{x1} - c_{x2}) * \left(t - \frac{D}{2v_a}\right)\right)$$

To provide ideal focusing, in a first assumption, the time-dependent and -independent terms in the x-dependent part of the $x_0$ coordinate should vanish separately for all t values. To have the beam focused, the terms containing $x^2$ and x must vanish for any x value. This implies two equations instead of only one:

$$-\frac{F_2}{F_{obj}F_1}(F_{obj} - z_x) + K\frac{F_1 z_x}{F_2}\frac{c_{x1} + c_{x2}}{v_a} +$$ [Equation 44]
$$2 * K\frac{F_1 z_x}{F_2}\frac{b_{x1} + b_{x2}}{v_a} * \left(t - \frac{D}{2v_a}\right) = 0$$

and:

$$K\frac{F_1 z_x}{F_2}\frac{b_{x1} - b_{x2}}{v_a^2} = 0$$ [Equation 45]

The second implies that $b_{x1} = b_{x2} = b_x$. This also implies that the first term on the right side in Equation 43, the single that contains the term depending on $t^2$, vanishes. Hence we have an $x_0$ coordinate moving with constant velocity. If this happens at constant z, which is not time dependent, and $b_{x1} = b_{x2} = 0$, we get back to the simple linear temporal slope of the acoustic frequencies.

From Equation 44 we can express the time-dependence of the z coordinate:

$$z_x(t) = \frac{\frac{F_2}{F_1}}{\frac{F_2}{F_{obj}F_1} + K\frac{F_1 c_{x1} + c_{x2}}{v_a} + 4 * K\frac{F_1 b_x}{F_2 v_a} * \left(t - \frac{D}{2v_a}\right)}$$ [Equation 46]

We will treat separately the cases when the $z_x$ coordinate is constant, hence the focal spot drifts within the horizontal x-y plane (see below example I); and when the spot moves along arbitrary 3D lines possibly following the axis of the structures that are measured—e.g. axons, dendrites, etc. (example II).

EXAMPLE I

The $z_x$ Coordinate Does Not Depend on Time

In this case, $b_{x1}=b_{x2}=0$ as we can see from Equations 45 and 46. (above).

From Equation 46, we also see that the focal plane is constant:

$$z_x = \frac{\frac{F_2}{F_1}}{\frac{F_2}{F_{obj}F_1} + K\frac{F_1 c_{x1} + c_{x2}}{F_2\, v_a}} \quad \text{[Equation 47]}$$

If we set a desired $z_x$ plane, we get for the following relationship between the required $c_{x1}$ and $c_{x2}$ parameters:

$$c_{x1} + c_{x2} = v_a \frac{F_2^2}{K*z_x*F_{obj}F_1^2}(F_{obj} - z_x) \quad \text{[Equation 48]}$$

The temporal variation of the $x_0$ coordinate in this case is given by:

$$x_0(t) = \quad \text{[Equation 49]}$$
$$-\frac{F_1 z_x}{F_2} * K * \left(f_1(0,0) - f_2(0,0) + (c_{x1} - c_{x2})*\left(t - \frac{D}{2 v_a}\right)\right)$$

If we replace $z_x$ with its expression from Equation 47, we get for the $x_0$ coordinate:

$$x_0(t) = -\frac{F_1}{F_2} * \frac{\frac{F_2}{F_1}}{\frac{F_2}{F_{obj}F_1} + K\frac{F_1 c_{x1} + c_{x2}}{F_2\, v_a}} * K * \quad \text{[Equation 50]}$$
$$\left(f_1(0,0) - f_2(0,0) + (c_{x1} - c_{x2})*\left(t - \frac{D}{2 v_a}\right)\right)$$

after simplification to:

$$x_0(t) = -\frac{K}{\frac{F_2}{F_{obj}F_1} + K\frac{F_2 c_{x1} + c_{x2}}{F_2\, v_a}} * \quad \text{[Equation 51]}$$
$$\left(f_1(0,0) - f_2(0,0) + (c_{x1} - c_{x2})*\left(t - \frac{D}{2 v_a}\right)\right)$$

We express the initial velocity and acceleration of the focal spot along the $x_0$ coordinate:

$$v_{x0} = -\frac{K}{\frac{F_2}{F_{ovbj}F_1} + K\frac{F_1 c_{x1} + c_{x2}}{F_2\, v_a}} * ((c_{x1} - c_{x2})) \quad \text{[Equation 52]}$$

further simplified:

$$v_{x0} = -\frac{K*z_x*F_1}{F_2} * ((c_{x1} - c_{x2})) \quad \text{[Equation 53]}$$

and:

$$a_{x0} = -\frac{4K}{\frac{F_2}{F_{obj}F_1} + K\frac{F_1 c_{x1} + c_{x2}}{F_2\, v_a}} * (b_{x1}) = 0 \quad \text{[Equation 54]}$$

The last equation shows that in the x-z plane the focal spot cannot be accelerated; it drifts with constant velocity $v_{x0}$, which is the same for the duration of the frequency chirp's. When we want to calculate the values of the required frequency slopes to get a moving focal point characterized by the following parameters: starting x coordinate $x_0$, distance from the objective $z_x$, velocity along the x axis $v_{x0}$, we need to use the expression for $c_{x1}+c_{x2}$ (Equation 48) and $c_{x1}-c_{x2}$ (Equation 53).

For $c_{x1}$ and $c_{x2}$ we get:

$$c_{x1} - c_{x2} = \frac{-F_2}{K*F_1*F_2}(v_{x0}) \quad \text{[Equation 55]}$$

$$c_{x1} + c_{x2} = v_a \frac{F_2^2}{K*z_x*F_{obj}*F_1^2}(F_{obj} - z_x) \quad \text{[Equation 56]}$$

Adding and subtracting the above two equations, we get the results:

$$c_{x1} = \frac{-F_2}{2*K*F_1*z_x} * \left(v_{x0} - \frac{v_a*F_2}{F_1*F_{obj}}(F_{obj} - z_x)\right) \quad \text{[Equation 57]}$$

$$c_{x2} = \frac{f_2}{2*K*F_1*z_x} * \left(v_{x0} + \frac{v_a*F_2}{F_1*F_{obj}}(F_{obj} - z_x)\right) \quad \text{[Equation 58]}$$

In summary, we can say that it is possible to drift the focal spot at a constant velocity along lines lying in horizontal planes (perpendicular to the objective axis); the focal distance $z_x$ can be set by the acoustic frequency chirps in the AO deflectors. The ranges of $z_x$ and $v_{x0}$ available cannot be deduced from this analysis, they are limited by the frequency bandwidths of the AO devices that limit the temporal length of the chirp sequences of a given slope.

EXAMPLE II

The $z_x$ Coordinate Depends on Time

If we want to drift the spot in the sample space along the z axis within one AO switching time period, we have to allow for temporal change of the $z_x$ coordinate. The formula:

$$z_x(t) = \frac{\frac{F_2}{F_1}}{\frac{F_2}{F_{obj}F_1} + \frac{F_1 c_{x1} + c_{x2}}{F_2\, v_a} + 2K\frac{F_1 b_{x1} + b_{x2}}{F_2\, v_a}*\left(t - \frac{D}{2 v_a}\right)} \quad \text{[Equation 59]}$$

comes from the constraint to focus all rays emerging from the AO cells onto a single focal spot after the objective (see Equation 47 for the time-independent $z_x$).

From Equation 59 we get:

$$-\frac{F_2}{F_{obj}F_1}(F_{obj} - z_x) + K\frac{F_1 z_x}{F_2}\frac{c_{x1} + c_{x2}}{v_a} + 2*K\frac{F_1 z_x}{F_2}\frac{b_{x1} + b_{x2}}{v_a}*\left(t - \frac{D}{2v_a}\right) = 0 \quad \text{[Equation 60]}$$

hence:

$$z_x(t) = \frac{\frac{F_2}{F_1}}{\frac{F_2}{F_{obj}F_1} + K\frac{F_1 c_{x1} + c_{x2}}{F_2\; v_a} + 2*K\frac{F_1 b_{x1} + b_{x2}}{F_2\; v_a}*\left(t - \frac{D}{2v_a}\right)} \quad \text{[Equation 61]}$$

This equation has, however, a non-linear temporal dependence. Therefore, we need its Taylor series to simplify further calculations:

$$z_x(t) = \frac{\frac{F_2}{F_1}}{\frac{F_2}{F_{obj}F_1} + K\frac{F_1}{F_2}*\frac{c_{x1}+c_{x2}}{v_a} - 2*K\frac{F_1}{F_2}\frac{b_{x1}+b_{x2}}{v_a}*\left(\frac{D}{2v_a}\right)} + \frac{-2K\frac{b_{x1}+b_{x2}}{v_a}}{\left(\frac{F_2}{F_{obj}F_1} + K\frac{F_1}{F_2}*\frac{c_{x1}+c_{x2}}{v_a} - 2*K\frac{F_1}{F_2}\frac{b_{x1}+b_{x2}}{v_a}*\left(\frac{D}{2v_a}\right)\right)^2}*t + \frac{\left(2K\frac{b_{x1}+b_{x2}}{v_a}\right)^2*\frac{F_1}{F_2}}{\left(\frac{F_2}{F_{obj}F_1} + K\frac{F_1}{F_2}*\frac{c_{x1}+c_{x2}}{v_a} - 2*K\frac{F_1}{F_2}\frac{b_{x1}+b_{x2}}{v_a}*\left(\frac{D}{2v_a}\right)\right)^3}*t^2 + \cdots \quad \text{[Equation 62]}$$

To have a nearly constant velocity, the second and higher order terms in the Taylor series should be small, or nearly vanish: this imposes constraints on the $b_{x1}$, $b_{x2}$, $c_{x1}$, and $c_{x2}$ values. Our simplest presumption is that the linear part will dominate time dependence over the quadratic part, which means that the ratio of their coefficients should be small:

$$\frac{\left(K\frac{b_{x1}+b_{x2}}{v_a}\right)*\frac{F_1}{F_2}}{\left(\frac{F_2}{F_{obj}F_1} + K\frac{F_1}{F_2}*\frac{c_{x1}+c_{x2}}{v_a} - 2*K\frac{F_1}{F_2}\frac{b_{x1}+b_{x2}}{v_a}*\left(\frac{D}{2v_a}\right)\right)} \ll 1 \quad \text{[Equation 63]}$$

However, the second member in the sum, the velocity along the z axis in the z-x plane ($v_{zx}$), is also similarly expressed:

$$v_{zx} = \frac{\left(-2K\frac{(b_{x1}+b_{x2})}{(v_a)}\right)}{\left(\frac{F_2}{F_{obj}F_1} + K\frac{F_1}{F_2}*\frac{c_{x1}+c_{x2}}{v_a} - 2*K\frac{F_1}{F_2}\frac{b_{x1}+b_{x2}}{v_a}*\left(\frac{D}{2v_a}\right)\right)^2} \quad \text{[Equation 64]}$$

From Equation 35 we have $b_{x1} = b_{x2} = b_x$, and this is not zero in this case. We need other constraints to express $b_x$, and further constants.

The formula for the $x_0$ coordinate (from Equation 43) is:

$$x_0(t) = -\frac{F_2}{F_{obj}F_1}(F_{obj} - z_x(t))*x - \frac{F_1 z_x(t)}{F_2}*\alpha(x,t) = -\frac{F_2}{F_{obj}F_1}\left(F_{obj} - \frac{\frac{F_2}{F_1}}{\frac{F_2}{F_{obj}F_1} + K\frac{F_1}{F_2}\frac{c_{x1}+c_{x2}}{v_a} + 2*K\frac{F_1}{F_2}\frac{b_{x1}+b_{x2}}{v_a}*\left(t-\frac{D}{2v_a}\right)}\right)*x - \frac{\frac{F_2}{F_1}}{\frac{F_2}{F_{obj}F_1} + K\frac{F_1}{F_2}\frac{c_{x1}+c_{x2}}{v_a} + 2*K\frac{F_1}{F_2}\frac{b_{x1}+b_{x2}}{v_a}*\left(t-\frac{D}{2v_a}\right)}*\frac{F_1}{F_2}*K* \left(f_{x1}(0,0) - f_{x2}(0,0) + (b_{x1})*\left(t-\frac{D}{2v_a}-\frac{x}{v_a}\right)^2 - (b_{x2})*\left(t-\frac{D}{2v_a}+\frac{x}{v_a}\right)^2 + (c_{x1})*\left(t-\frac{D}{2v_a}-\frac{x}{v_a}\right) - c_{x2}*\left(t-\frac{D}{2v_a}+\frac{x}{v_a}\right)\right) = -\frac{1}{\frac{F_2}{F_{obj}F_1} + K\frac{F_1}{F_2}\frac{c_{x1}+c_{x2}}{v_a} + 2*K\frac{F_1}{F_2}\frac{b_{x1}+b_{x2}}{v_a}*\left(t-\frac{D}{2v_a}\right)}*K*\left[f_{x1}(0,0) - f_{x2}(0,0) + \left(t-\frac{D}{2v_a}\right)*(c_{x1}-c_{x2})\right] \quad \text{[Equation 65]}$$

To find the drift velocity along the x axis we should differentiate the above function with respect to t:

$$v_x(t) = \frac{dx_0(t)}{dt} = + \frac{\left(2*K\frac{F_1}{F_2}\frac{b_{x1}+b_{x2}}{v_a}\right)}{\left(\frac{F_2}{F_{obj}F_1} + K\frac{F_1}{F_2}\frac{c_{x1}+c_{x2}}{v_a} + 2*K\frac{F_1}{F_2}\frac{b_{x1}+b_{x2}}{v_a}*\left(t-\frac{D}{2v_a}\right)\right)^2} *$$

$$K*\left[f_{x1}(0,0) - f_{x2}(0,0) + \left(t - \frac{D}{2v_a}\right)*(c_{x1}-c_{x2})\right] -$$

$$\frac{1}{\frac{F_2}{F_{obj}F_1} + K\frac{F_1}{F_2}\frac{c_{x1}+c_{x2}}{v_a} + 2*K\frac{F_1}{F_2}\frac{b_{x1}+b_{x2}}{v_a}*\left(t-\frac{D}{2v_a}\right)} * K*[(c_{x1}-c_{x2})]$$

[Equation 66]

Taken at t=0, we can determinate the initial value $v_{x0}$ of the drift velocity component along the x axis:

$$v_{x0} = + \frac{2*K\frac{F_1}{F_2}\frac{b_{x1}+b_{x2}}{v_a}}{\left(\frac{F_2}{F_{obj}F_1} + K\frac{F_1}{F_2}\frac{c_{x1}+c_{x2}}{v_a} + 2*K\frac{F_1}{F_2}\frac{b_{x1}+b_{x2}}{v_a}*\left(t-\frac{D}{2v_a}\right)\right)^2} *$$

$$K*\left[f_{x1}(0,0) - f_{x2}(0,0) + \left(t - \frac{D}{2v_a}\right)*(c_{x1}-c_{x2})\right] -$$

$$\frac{1}{\frac{F_2}{F_{obj}F_1} + K\frac{F_1}{F_2}\frac{c_{x1}+c_{x2}}{v_a} + 2*K\frac{F_1}{F_2}\frac{b_{x1}+b_{x2}}{v_a}*\left(-\frac{D}{2v_a}\right)} * K*[(c_{x1}-c_{x2})]$$

[Equation 67]

If we take $b_x$ from the expression of $v_{zx}$ (Equation 64), and introduce it into Equation 67 we will have an equation (Equation 68) that gives a constraint for the choice of $c_{x1}$ and $c_{x2}$. This constraint relates $c_{x1}$ and $c_{x2}$ to $v_{x0}$ and $v_{zx}$:

$$K*(v_x - r*\Delta f_{0x}*v_{zx})*\left(1 - \frac{v_{zx}*D}{v_a*F_{obj}}\right)*q =$$

$$\frac{F_2}{F_{obj}F_1}*(v_x - r*\Delta f_{0x}*v_{zx})^2 +$$

$$\frac{v_{zx}*D*r^2}{v_a^2}*(v_x - r*\Delta f_{0x}*v_{zx})*p*q +$$

$$\frac{r}{v_a}*(v_x - r*\Delta f_{0x}*v_{zx})^2*p +$$

$$\frac{v_{zx}^2*D^2*r^3}{4*v_a^3}*p*q^2 + \frac{v_{zx}^2*D^2*r*K}{4*v_a^2*F_{obj}}, *q^2$$

[Equation 68]

Here we introduced the following notations:

$$r := K\frac{F_1}{F_2}$$ [Equation 69]

$$\Delta f_0 := f_{1x}(0,0) - f_{2x}(0,0)$$ [Equation 70]

-continued $$q := c_{x1} - c_{x2}$$ [Equation 71]

$$p := c_{x1} + c_{x2}$$ [Equation 72]

We can express p from Equation 68, resulting in a relationship between p and q:

$$p = \frac{\left(1 - \frac{D*v_{zx}}{v_a*F_{obj}}\right)*K*H*q - \frac{v_{zx}^2*D^2*\frac{F_2}{F_1*F_{obj}}*H^2 - \frac{r*K}{4*v_a^2*F_{obj}}*q^2}{\frac{r}{v_a}*\left(\frac{v_{zx}*D*r*q}{2*v_a} + H\right)^2}}{}$$

[Equation 73]

where we introduced the notation:

$$H := v_x - r*\Delta f_{0x}*v_{zx}$$ [Equation 74]

These are general equations that apply to all possible trajectories. Practically, we can analyze the motion of the spot along different trajectories separately.

Motion in Space Along 3D Lines

A practically important possibility would be to set a linear trajectory for the drifting spot, following e.g. the axis of a measured dendrite or axon. This is a general 3D line, with arbitrary angles relative to the axis. The projections of this 3D line onto the x-z and y-z planes are also lines that can be treated separately. We are dealing now with the projection on the x-z plane. The projection on the y-z plane can be handled similarly; they are however not completely independent, as will be shown later. If the spot is accelerated on the trajectory, the acceleration and initial velocity are also projected on the x-z and y-z planes. We name the two orthogonal components of the initial velocity in the x-z plane as $v_{x0}$ and $v_{zx0}$ which are parallel to the x and z axis, respectively. Therefore, in the x-z plane we have for the projection of the line trajectory:

$$z(t) = \frac{v_{zx0}}{v_{x0}}*x_0(t) + n$$ [Equation 75]

To calculate the chirp parameters we must insert the temporal dependence of the z(t) and $x_0(t)$ functions, expressed in the Equations 62 and 65, respectively.

We introduce the following notations:

$$\tilde{u} := \frac{F_2}{F_{obj}F_1} + K\frac{F_1}{F_2}\frac{c_{x1}+c_{x2}}{v_a}$$ [Equation 76]

$$B = -2*K\frac{F_1}{F_2}\frac{b_{x1}+b_{x2}}{v_a}$$ [Equation 77]

$$t' = t - \frac{D}{2v_a}$$ [Equation 78]

$$M = \frac{F_2}{F_1}$$ [Equation 79]

Introducing these notations and the temporal dependences from Equations 62 and 65 into Equation 75, we get the projection of the 3D line:

$$\frac{M}{\tilde{u} - B*t'} = -\frac{v_{zx0}}{v_{x0}} * \frac{K}{\tilde{u} - B*t'}(q*t' + \Delta f_{0x}) + n \quad \text{[Equation 80]}$$

After some simplification we get:

$$M = -\frac{v_{zx0}}{v_{x0}} * K * \Delta f_{0x} + n*\tilde{u} - \left(\frac{v_{zx0}}{v_{x0}} * K * q + n*B\right)*t' \quad \text{[Equation 81]}$$

This equation must be fulfilled for each time point t'. To be valid for each t', we must impose the following:

$$M + \frac{v_{zx0}}{v_{x0}} * K * \Delta f_{0x} - n*\tilde{u} = 0 \text{ and:} \quad \text{[Equation 82]}$$

$$\frac{v_{zx0}}{v_{x0}} * K * q + n*B = 0 \quad \text{[Equation 83]}$$

The first equation (Equation 82) gives:

$$\tilde{u} = \frac{M + \frac{v_{zx0}}{v_{x0}} * K * \Delta f_{0x}}{n} \quad \text{[Equation 84]}$$

Introducing u from Equation 76:

$$\frac{F_2}{F_{obj}F_1} + K\frac{F_1}{F_2}\frac{c_{x1}+c_{x2}}{v_a} = \frac{M + \frac{v_{zx0}}{v_{x0}} * K * \Delta f_{0x}}{n} \quad \text{[Equation 85]}$$

From this equation we can express p (defined by Equation 72) as follows:

$$p = c_{x1} + c_{x2} = \frac{v_a * M}{K} * \left(\frac{M + \frac{v_{zx0}}{v_{x0}} *K*\Delta f_{0x}}{n} - \frac{M}{F_{obj}}\right) \quad \text{[Equation 86]}$$

To express $b_{x1}=b_{x2}=b$ and $q=c_{x1}-c_{x2}$, we need another constraint, that can be set from the desired value of the initial velocity $v_{zx0}$.

We take the derivative of z(t) (Equation 62) at t=0, to find the initial velocity value, using the notations in Equations 76 and 77:

$$v_{zx0} := v_{zx}(0) = -\frac{B*M}{\tilde{u}^2} \quad \text{[Equation 87]}$$

Expressing B from Equation S58:

$$B = -\frac{v_{zxo}}{M} * \left(\frac{M + \frac{v_{zx0}}{v_{x0}} * K * \Delta f_{0x}}{n}\right)^2 \quad \text{[Equation 88]}$$

Introducing the expression of B from Equation 77, we can yield the parameter b:

$$b = \frac{v_{zx0}*v_a}{4*K} * \left(\frac{M + \frac{v_{zx0}}{v_{x0}} * K * \Delta f_{0x}}{n}\right)^2 \quad \text{[Equation 89]}$$

To express q (defined by Equation 71) we use Equations 83 and 88:

$$q = c_{x1} - c_{x2} = n*\frac{v_{x0}}{M*K} * \left(\frac{M + \frac{v_{zx0}}{v_{x0}} * K * \Delta f_{0x}}{n}\right)^2 \quad \text{[Equation 90]}$$

Finally, we can express $c_{x1}$ and $c_{x2}$ by adding and subtracting q and p (Equations 86 and 90):

$$c_{x1} = \frac{M*v_a}{2*K} * \left(\frac{M + \frac{v_{zx0}}{v_{x0}} * K*\Delta f_{0x}}{n} - \frac{M}{F_{obj}}\right) +$$

$$\frac{v_{x0}*n}{2*K*M} * \left(\frac{M + \frac{v_{zx0}}{v_{x0}} * K * \Delta f_{0x}}{n}\right)^2 \text{ and:} \quad \text{[Equation 91]}$$

$$c_{x2} = \frac{M*v_a}{2*K} * \left(\frac{M + \frac{v_{zx0}}{v_{x0}} * K*\Delta f_{0x}}{n} - \frac{M}{F_{obj}}\right) -$$

$$\frac{v_{x0}*n}{2*K*M} * \left(\frac{M + \frac{v_{zx0}}{v_{x0}} * K * \Delta f_{0x}}{n}\right)^2 \quad \text{[Equation 92]}$$

The crucial parameter $\Delta f_{0x}$ can be calculated from the initially set $x_0(0)$ at t'=0. We then have:

$$\Delta f_{0x} = \frac{x_0(0)*F_2}{K*F_{obj}*F_1} \quad \text{[Equation 93]}$$

In a preferred embodiment the characteristic parameters of the AO devices are: K=0.002 rad/MHz, v=650*10⁶ μm/s, the magnification M=1 of the lens system following the acousto-optic deflectors, the initial frequency difference Δf=10 MHz, and the movement parameters: m=2, $v_{z0}$=1 μm/μs, n=fobjective–4 μm. For these values, the $c_{x1}$ value results in 3 kHz/μs, whereas $c_{x2}$=17 kHz/s.

The acceleration $a_{zx}$ in the z direction is approximately 0.1 m/s² with these parameters.

Finally, we summarize our results. Here we demonstrate how it is possible to calculate the parameters for the non-linear chirped driver function, in order to move the focal spot from a given point with a given initial speed along a line path in the x-z plane. The parameters of the line path are selected according to the general formula, in 3D:

$$x_0 = x_0(0) + s*v_{x0}$$

$$y_0 = y_0(0) + s*v_{y0} \quad \text{[Equation 94]}$$

$$z_0 = z_0(0) + s*v_{z0}$$

Since the deflectors are deflecting in the x-z and y-z planes, transforming Equation S65 into the equations describe the line projections on these planes:

$$z_0 = m * x_0 + n = z_0(0) + \frac{v_{zx0}}{v_{x0}} * x_0 - \frac{v_{zx0}}{v_{x0}} * x_0(0) \quad \text{[Equation 95a]}$$

$$z_0 = k * x_0 + 1 = z_0(0) + \frac{v_{zy0}}{v_{y0}} * y_0 - \frac{v_{zy0}}{v_{y0}} * y_0(0) \quad \text{[Equation 95b]}$$

With these, we imply that $v_{zx0} = v z_{y0} = v_{z0}$, and:

$$m = \frac{v_{zx0}}{v_{x0}} \quad \text{[Equation 96]}$$

$$k = \frac{v_{zx0}}{v_{y0}} \quad \text{[Equation 97]}$$

$$n = z_0(0) - \frac{v_{zx0}}{v_{x0}} * x_0(0) \quad \text{[Equation 98]}$$

$$l = z_0(0) - \frac{v_{zx0}}{v_{y0}} * y_0(0) \quad \text{[Equation 99]}$$

To steer the deflectors, we need to determine the $\Delta f_{0x}$, $b_{x1}$, $b_{x2}$, $c_{x1}$, and $c_{x2}$ parameters in the x-z plane as a function of the selected $x_0(0)$, $z_0(0)$, $v_{x0}$, and $v_{zx0}$ parameters of the trajectory and drift. The same is valid for the y-z plane: here we determine $\Delta f_{0y}$, $b_{y1}$, $b_{y2}$, $c_{y1}$, and $c_{y2}$ for the desired $y_0(0)$, $z_0(0)$, $v_{y0}$, and $v_{zy0}$ of the trajectory.

The spot will then keep its shape during the drift, since the corresponding constraint is fulfilled in both planes. The initial velocities $v_{x0}$ and $v_{y0}$ along the x and y coordinates determine the m and k parameters, together with the initial velocity $v_{zx} = v_{zy}$ set for z (Equations 96 and 97) and the acceleration values are also determined by these parameters. The resulting acceleration values are usually low within the practical parameter sets, therefore the velocity of the spot will not change drastically for trajectories which are not too long.

For the optical calculation we use a paraxial approximation of the whole AO microscope applied in two perpendicular planes whose orientations are set by the deflection directions of the AO deflectors (FIG. 9). We need the following three groups of equations: i) the simplified matrix equation of the AO microscope in the x-z (and y-z) planes (Equations 2-3); ii) the basic equation of the AO deflectors (Equation 7); and iii) temporally non-linear chirps for the acoustic frequencies in the deflectors deflecting in the x-z (and y-z) plane (f):

$$f_i(x, t) = \quad \text{[Equation 100]}$$

$$f_i(0, 0) + \left(b_{xi} * \left(t - \frac{D}{2 * v_a} \pm \frac{x}{v_a}\right) + c_{xi}\right) * \left(t - \frac{D}{2 * v_a} \pm \frac{x}{v_a}\right)$$

(where i=1 or i=2, indicates the first and second x axis deflector; D the diameter of the AO deflector; and $v_a$ is the propagation speed of the acoustic wave within the deflector)

This equation was derived from Equations 10, 11, 19 and 20. In this paragraph we calculate everything in the x-z plane, the x axis being the deflection direction of one AO deflector pair (y being that of the other) and z is the optical axis coinciding with the symmetry axis of the cylindrical objective. The same calculation should be applied in the y-z plane, too (see the detailed calculation above). From these three groups of equations (i-iii) we can calculate the $x_0$ coordinate of the focal spot (Equations 22, 65). To have all rays focused in the focal point of the objective, the x and $x^2$-dependent parts of the $x_0$ coordinate must vanish (all rays starting at any x coordinate in the deflector aperture must pass through the same $x_0$ coordinate in the focal plane), which implies two equations (Equations 44, 45), from which we can express the t dependence of the z coordinate (Equation 61).

Equation 61 has, however, a non-linear temporal dependence. Therefore, we need its Taylor series to simplify further calculations. Our simplest presumption was that for the linear part time dependence will dominate over the quadratic part; therefore, the velocity along the z axis in the z-x plane is nearly constant ($v_{zx}$) and, using Equation 64, the velocity along the x axis ($v_x$) can be determined (see Equation 66).

In the last step we want to analyze the motion of the focal spot along different 3D trajectories. For simplicity, we calculate the drift along a general 3D line with an arbitrary velocity and an arbitrary angle relative to the axis. The x-z and y-z planes can be treated separately as above. In the x-z plane we can express the projection of the 3D line as:

$$z_x(t) = \frac{v_{zx0}}{v_{x0}} * x_0(t) + z_0 - \frac{v_{zx0}}{v_{x0}} * x_0(0) \quad \text{[Equation 95a]}$$

When we combine the expression $z_x(t)$ with $x_0(t)$, the similarly calculated $z_y(t)$, and $y_0(t)$, and add all the required initial positions ($x_0$, $y_0$, $z_0$) and speed parameter values ($v_{x0}$, $v_{y0}$, $v_{zx0} = v_{zy0}$) of the focal spot, we can explicit all the parameters required to calculate the non-linear chirps according to Equation 100 in the four AO deflectors ($\Delta f_{0x}$, $b_{x1}$, $b_{x2}$, $c_{x1}$, $c_{x2}$ and $\Delta f_{0y}$, $b_{y1}$, $b_{y2}$, $c_{y1}$, $c_{y2}$):

$$\Delta f_{0x} = f_{1x}(0, 0) - f_{2x}(0, 0)) \neq 0$$

$$\Delta f_{0x} = \frac{x_0(0) * F_2}{K * F_{obj} * F_1}$$

$$b_{x1} = \frac{v_{zx0} * v_a}{4 * K} * \left(\frac{M + \frac{v_{zx0}}{v_{x0}} * \frac{x_0(0) * F_2}{F_{obj} * F_1}}{z_0(0) - \frac{v_{zx0}}{v_{x0}} * x_0(0)}\right)^2$$

$$b_{x2} = \frac{v_{zx0} * v_a}{4 * K} * \left(\frac{M + \frac{v_{zx0}}{v_{x0}} * \frac{x_0(0) * F_2}{F_{obj} * F_1}}{z_0(0) - \frac{v_{zx0}}{v_{x0}} * x_0(0)}\right)^2$$

$$c_{x1} = \frac{M * v_a}{2 * K} * \left(\frac{M + \frac{v_{zx0}}{v_{x0}} * \frac{x_0(0) * F_2}{F_{obj} * F_1}}{z_0(0) - \frac{v_{zx0}}{v_{x0}} * x_0(0)} - \frac{M}{F_{obj}}\right) +$$

$$\frac{v_{x0}}{2 * K * M} * \left(z_0(0) - \frac{v_{zx0}}{v_{x0}} * x_0(0)\right) * \left(\frac{M + \frac{v_{zx0}}{v_{x0}} * \frac{x_0(0) * F_2}{F_{obj} * F_1}}{z_0(0) - \frac{v_{zx0}}{v_{x0}} * x_0(0)}\right)^2$$

$$c_{x2} = \frac{M * v_a}{2 * K} * \left(\frac{M + \frac{v_{zx0}}{v_{x0}} * \frac{x_0(0) * F_2}{F_{obj} * F_1}}{z_0(0) - \frac{v_{zx0}}{v_{x0}} * x_0(0)} - \frac{M}{F_{obj}}\right) -$$

-continued $$\frac{v_{x0}*\left(z_0(0) - \frac{v_{zx0}}{v_{x0}}*x_0(0)\right)}{2*K*M}*\left(\frac{M + \frac{v_{zx0}}{v_{x0}}*\frac{x_0(0)*F_2}{F_{obj}*F_1}}{z_0(0) - \frac{v_{zx0}}{v_{x0}}*x_0(0)}\right)^2$$

$$\Delta f_{0y} = f_{1y}(0,0) - f_{2y}(0,0)) \neq 0$$

$$\Delta f_{0y} = \frac{y_0(0)*F_2}{K*F_{obj}*F_1}$$

$$b_{y1} = \frac{v_{zy0}*v_a}{4*K}*\left(\frac{M + \frac{v_{zy0}}{v_{y0}}*\frac{y_0(0)*F_2}{F_{obj}*F_1}}{z_0(0) - \frac{v_{zy0}}{v_{y0}}*y_0(0)}\right)^2$$

$$b_{y2} = \frac{v_{zy0}*v_a}{4*K}*\left(\frac{M + \frac{v_{zy0}}{v_{y0}}*\frac{y_0(0)*F_2}{F_{obj}*F_1}}{z_0(0) - \frac{v_{zy0}}{v_{y0}}*y_0(0)}\right)^2$$

$$c_{y1} = \frac{M*v_a}{2*K}*\left(\frac{M + \frac{v_{zy0}}{v_{y0}}*\frac{y_0(0)*F_2}{F_{obj}*F_1}}{z_0(0) - \frac{v_{zy0}}{v_{y0}}*y_0(0)} - \frac{M}{f_{obj}}\right) +$$

$$\frac{v_{y0}*\left(z_0(0) - \frac{v_{zy0}}{v_{y0}}*y_0(0)\right)}{2*K*M}*\left(\frac{M + \frac{v_{zy0}}{v_{y0}}*\frac{y_0(0)*F_2}{F_{obj}*F_1}}{z_0(0) - \frac{v_{zy0}}{v_{y0}}*y_0(0)}\right)^2$$

$$c_{y2} = \frac{M*v_a}{2*K}*\left(\frac{M + \frac{v_{zy0}}{v_{y0}}*\frac{y_0(0)*F_2}{F_{obj}*F_1}}{z_0(0) - \frac{v_{zy0}}{v_{y0}}*y_0(0)} - \frac{M}{f_{obj}}\right) -$$

$$\frac{v_{y0}*\left(z_0(0) - \frac{v_{zy0}}{v_{y0}}*y_0(0)\right)}{2*K*M}*\left(\frac{M + \frac{v_{zy0}}{v_{y0}}*\frac{y_0(0)*F_2}{F_{obj}*F_1}}{z_0(0) - \frac{v_{zy0}}{v_{y0}}*y_0(0)}\right)^2$$

Note that $\Delta f_{0x}$, and $\Delta f_{0y}$ are not fully determined; here we have an extra freedom to select from frequency ranges of the first ($f_1$) and second ($f_2$) group of AO deflectors to keep them in the middle of the bandwidth during 3D scanning. In summary, we were able to derive a one-to-one relationship between the focal spot coordinates and speed and the chirp parameters of the AO deflectors. Therefore, we can generate fast movement along any 3D line, starting at any point in the scanning volume.

3D Two-Photon Microscope

In the following exemplary embodiment, we improved 3D AO imaging method by using a novel AO signal synthesis card implemented in the electronics system used earlier. The new card uses a high speed DA chip (AD9739A) fed with FPGA (Xilinx Spartan-6). The card at its current state allows the generation of 10-140 MHz signals of varying amplitude with frequency chirps implementing linear and quadratic temporal dependence. Synchronizing and commanding the cards allowed us to arbitrarily place the focal spot and let it drift along any 3D line for every (10-35 µs) AO cycle. We measured the back reflection of the radio frequency (RF) driver signal at each of the AO deflectors directly, and compensated for the RF reflection and loss to distribute RF energy more homogeneously between deflectors. This allowed higher absolute acoustic energy on the crystals, providing higher AO efficiency, and thus higher laser output under the objective and more homogeneous illumination of the scanning volume.

We also implemented the following opto-mechanical modifications to improve spatial resolution, extend field of view, and increase total transmitted light intensity. We removed the DeepSee unit of our Mai Tai eHP femtosecond laser (875-880 nm, SpectraPhysics) and used only a motorized external four-prism compressor to compensate for most of the second- and third-order material dispersion (72,000 fs$^2$ and 40,000 fs$^3$) of the optical path. Coherent back-reflection was eliminated using a Faraday isolator (Electro-Optics Technology). To eliminate optical errors induced by thermal drift we implemented motorized mirrors (AG-M100N, Newport) and quadrant detectors (PDQ80A, Thorlabs) in closed-loop circuits in front of, and also behind, the motorized four-prism sequence. Z focusing and lateral scanning was achieved by two separate pairs of AO deflectors, which were coupled to two achromatic lenses (NT32-886, Edmund Optics). Finally, the light was coupled to an upright two-photon microscope (Femto2D, Femtonics Ltd.) using a telecentric relay consisting of an Edmund Optics (47319, f=200 mm) and a Linos (QIOPTIQ, G32 2246 525, f=180 mm) lens. The excitation laser light was delivered to the sample, and the fluorescence signal was collected, using either a 20× Olympus objective (XLUMPlanFI20×/1.0 lens, 20×, NA 1.0) for population imaging, or a 25× Nikon objective (CFI75 Apochromat 25×W MP, NA 1.1) for spine imaging. The fluorescence was spectrally separated into two spectral bands by filters and dichroic mirrors, and it was then delivered to GaAsP photomultiplier tubes (Hamamatsu) fixed directly on the objective arm, which allows deep imaging in over a 800 µm range with 2D galvano scanning. Because of the optical improvements and increase in the efficiency of the radio frequency drive of the AO deflectors, spatial resolution and scanning volume were increased by about 15% and 36-fold, respectively. New software modules were developed for fast 3D dendritic measurements, and to compensate for sample drift.

Motion Correction in 3D

Data resulting from the 3D ribbon scanning, multi-layer, multi-frame scanning, and chessboard scanning methods are stored in a 3D array as time series of 2D frames. The 2D frames are sectioned to bars matching the AO drifts (the individual scanning lines) to form the basic unit of our motion correction method. We selected the frame with the highest average intensity in the time series as a reference frame. Then we calculated cross correlation between each frame and bar and the corresponding bars of the reference frame to yield a set of displacement vectors in the data space. Displacement vector for each frame and for each bar is transformed to the Cartesian coordinate system of the sample knowing the scanning orientation for each bar. Noise bias is avoided by calculating the displacement vector of a frame as the median of the motion vectors of its bars. This common displacement vector of a single frame is transformed back to the data space. The resulting displacement vector for each bar in every frame is then used to shift the data of the bars using linear interpolation for subpixel precision. Gaps are filled with data from neighbouring bars, whenever possible.

Various modifications to the above disclosed embodiments will be apparent to a person skilled in the art without departing from the scope of protection determined by the attached claims.

REFERENCE NUMERALS

| 10 | microscope |
| 12 | laser source |
| 14 | laser beam |
| 16 | acousto-optic deflector |
| 18 | objective |
| 20 | detector |
| 26 | sample |

The invention claimed is:

1. A method for correcting motion artifacts of in vivo fluorescence measurements of a live specimen using a 3D laser scanning microscope having an optical axis (Z) and X, Y axes that are perpendicular to the optical axis and to each other and having a first pair of acousto-optic deflectors deflecting a laser beam in an x-z plane defined by the X and Z axes and a second pair of acousto-optic deflectors deflecting the laser beam in an y-z plane defined by the Y and Z axes, comprising:
  selecting within the specimen a region of interest which lies in more than one x-y planes perpendicular to the Z axis,
  selecting a plurality of guiding points along the region of interest,
  extending the guiding points to surface elements, wherein each surface element consists of a plurality of scanning lines and the surface elements, together, substantially cover the region of interest,
  performing a measurement by:
    scanning each scanning line by focusing the laser beam at one end of the given scanning line and providing chirp signals for acoustic frequencies in the deflectors for continuously moving a focus spot along the given scanning line, thereby obtaining 3-dimensional scanning data of the surface elements,
    projecting the 3-dimensional scanning data of the surface elements to 2-dimensional rectangular frames,
  repeating the measurement to obtain a 2-dimensional time series from successive frames,
  correcting motion artifacts by shifting the data of the successive frames with respect to each other so as to maximize fluorescence cross correlation between the data of the frames.

2. The method according to claim 1, comprising:
  selecting a fluorescent object on a dark background within the specimen,
  repeatedly scanning a 3-dimensional volume containing the fluorescent object to obtain a time series of the 3-dimensional volume,
  determining a 3-dimensional trajectory of the fluorescent object from the time series of the 3-dimensional volume,
  determining an average motion direction of the fluorescent object from the 3-dimensional trajectory,
  extending the guiding points to surface elements which extend in the average motion direction of the fluorescent object.

3. The method according to claim 1, further comprising:
  fitting a 3-dimensional scanning trajectory on the guiding points,
  wherein the step of extending the guiding points to surface elements is performed by extending the guiding points to scanning lines which are transversal to the 3-dimensional scanning trajectory and which, together, form a plurality of surface elements that define a substantially continuous surface along the 3-dimensional scanning trajectory.

4. The method according to claim 1, further comprising:
  fitting a 3-dimensional scanning trajectory on the guiding points,
  wherein the step of extending the guiding points to surface elements is performed by extending each guiding point to a plurality of scanning lines which are parallel to a portion of the 3-dimensional scanning trajectory containing the given guiding point and which plurality of scanning lines, together, form one of the surface elements, and the plurality of surface elements, together, define a substantially continuous surface along the 3-dimensional scanning trajectory.

5. The method according to claim 1, further comprising:
  extending each surface element to a volume element such that the volume element consists of the given surface element and a plurality of auxiliary surface elements which are substantially parallel with the given surface element and each of which consists of a plurality of auxiliary scanning lines,
  performing an additional measurement by:
  additionally scanning each auxiliary scanning line by focusing the laser beam at one end of the given auxiliary scanning line and providing chirp signals for the acoustic frequencies in the deflectors for continuously moving the focus spot along the given auxiliary scanning line, thereby obtaining 3-dimensional scanning data of the volume elements,
  projecting the 3-dimensional scanning data of the volume elements to 3-dimensional cuboid frames,
  repeating the additional measurement to obtain a 3-dimensional time series from the successive cuboid frames,
  correcting motion artifacts by shifting successive cuboid frames with respect to each other so as to maximize fluorescence cross correlation between the cuboid frames.

6. The method according to claim 1, wherein the frames contain separate rectangular regions corresponding to the 3-dimensional scanning data of the separate surface elements and correcting motion artifacts by shifting the data of each rectangular region of each frame with respect to the data of the corresponding rectangular regions of the other frames so as to maximize fluorescence cross correlation between the data of the corresponding rectangular regions of the frames.

7. The method according to claim 1, comprising maximizing fluorescence cross correlation between the data of a selected reference frame and the data of all other frames.

8. The method according to claim 1, comprising maximizing fluorescence cross correlation between the data of successive frames.

9. The method according to claim 2, wherein the 3-dimensional volume containing the fluorescent object consists of three perpendicular imaging planes that are centered on the fluorescent object and scanning each imaging plane by providing chirp signals for the acoustic frequencies in the deflectors for focusing the laser beam to a focus spot and continuously moving the focus spot along parallel lines lying within the given imaging plane, so as to scan the entire imaging plane.

10. A method for correcting motion artifacts of in vivo fluorescence measurements of a live specimen using a 3D laser scanning microscope having an optical axis (Z) and X, Y axes that are perpendicular to the optical axis and to each other and having a first pair of acousto-optic deflectors deflecting a laser beam in an x-z plane defined by the X and Z axes and a second pair of acousto-optic deflectors deflecting the laser beam in an y-z plane defined by the Y and Z axes, selecting a fluorescent object on a dark background within the sample, providing three perpendicular imaging planes that are centered on the fluorescent object, scanning each imaging plane by providing chirp signals for acoustic frequencies in the deflectors for focusing the laser beam to a focus spot and continuously moving the focus spot along parallel lines lying within the given imaging plane, so as to scan an entire imaging plane, determining a 3-dimensional trajectory of the fluorescent object during a predetermined period of time, determining an average motion direction of the fluorescent object from the 3-dimensional trajectory, selecting within the specimen a plurality of points of interest, extending each point of interest to a scanning line traversing the given point of interest and being parallel to the average motion direction of the fluorescent object, performing a measurement by:
scanning each scanning line by focusing the laser beam at one end of the given scanning line and providing chirp signals for the acoustic frequencies in the deflectors for continuously moving the focus spot along the given scanning line, thereby obtaining scanning data of each scanning line corresponding to one of the plurality of points of interest, projecting the scanning data of each scanning line to 1-dimensional frames, repeating the measurement to obtain a 1-dimensional time series from successive frames for each scanning line corresponding to one of the plurality of points of interest, correcting motion artifacts by shifting the data of the successive frames with respect to each other so as to maximize fluorescence cross correlation between the data of the frames.

11. The method according to claim 1 comprising scanning each scanning line with a given scanning speed by
determining coordinates $x_0(0)$, $y_0(0)$, $z_0(0)$ of one end of the scanning line serving as a starting point, determining scanning speed vector components $v_{x0}$, $v_{y0}$, $v_{zx0}$ ($=v_{zy0}$) such that a magnitude of the scanning speed vector corresponds to the given scanning speed and directions of the scanning speed vector corresponds to direction of the scanning line, providing non-linear chirp signals in the first pair of acousto-optic deflectors and providing non-linear chirp signals in the second pair of acousto-optic deflectors such as to move a focus spot from the starting point at a speed defined by the speed vector components $v_{x0}$, $v_{y0}$, $v_{zx0}$.

12. The method according to claim 11, wherein providing non-linear chirp signals in the x axis deflectors and providing non-linear chirp signals in the y axis deflectors comprises the steps of providing non-linear chirp signals in the x axis deflectors according to the function:

$$f_i(x, t) = f_i(0, 0) + \left(b_{xi} * \left(t - \frac{D}{2*v_a} - \frac{x}{v_a}\right) + c_{xi}\right) * \left(t - \frac{D}{2*v_a} - \frac{x}{v_a}\right)$$

wherein
i=1 or 2 indicates the first and second x axis deflector respectively, D is a diameter of the AO deflector; and $v_a$ is a propagation speed of an acoustic wave within the deflector and $$\Delta f_{0x} = f_{1x}(0,0) - f_{2x}(0,0)) \neq 0$$

and providing non-linear chirp signals in the y axis deflectors according to the function:

$$f_i(y, t) = f_i(0, 0) + \left(b_{yi} * \left(t - \frac{D}{2*v_a} - \frac{y}{v_a}\right) + c_{yi}\right) * \left(t - \frac{D}{2*v_a} - \frac{y}{v_a}\right)$$

wherein
i=1 or 2 indicates the first and second x axis deflector respectively, and $$\Delta f_{0y} = f_{1y}(0,0) - f_{2y}(0,0)) \neq 0$$

wherein $\Delta f_{0x}$, $b_{x1}$, $b_{x2}$, $c_{x1}$, $c_{x2}$, $\Delta f_{0y}$, $b_{y1}$, $b_{y2}$, $c_{y1}$, and $c_{y2}$ are expressed as a function of the initial location ($x_0(0)$, $y_0(0)$, $z_0(0)$) and vector speed ($v_{x0}$, $v_{y0}$, $v_{zx0}=v_{zy0}$) of the focal spot.

13. The method according to claim 12, further comprising arranging a lens system after the two pairs of acousto-optic deflectors consisting of a first lens having a first focal distance, F1, a second lens having a second focal distance, F2, and an objective lens having a third focal distance, $F_{obj}$, and expressing the parameters $\Delta f_{0x}$, $b_{x1}$, $b_{x2}$, $c_{x1}$, $c_{x2}$, $\Delta f_{0y}$, $b_{y1}$, $b_{y2}$, $c_{y1}$, and $c_{y2}$ as $$\Delta f_{0x} = \frac{x_0(0) * F_2}{K * F_{obj} * F_1}$$

$$b_{x1} = \frac{v_{zx0} * v_a}{4 * K} * \left(\frac{M + \frac{v_{zx0}}{v_{x0}} * \frac{x_0(0) * F_2}{F_{obj} * F_1}}{z_0(0) - \frac{v_{zx0}}{v_{x0}} * x_0(0)}\right)^2$$

$$b_{x2} = \frac{v_{zx0} * v_a}{4 * K} * \left(\frac{M + \frac{v_{zx0}}{v_{x0}} * \frac{x_0(0) * F_2}{F_{obj} * F_1}}{z_0(0) - \frac{v_{zx0}}{v_{x0}} * x_0(0)}\right)^2$$

$$c_{x1} = \frac{M * v_a}{2 * K} * \left(\frac{M + \frac{v_{zx0}}{v_{x0}} * \frac{x_0(0) * F_2}{F_{obj} * F_1}}{z_0(0) - \frac{v_{zx0}}{v_{x0}} * x_0(0)} - \frac{M}{F_{obj}}\right) +$$

$$\frac{v_{x0}}{2 * K * M} * \left(z_0(0) - \frac{v_{zx0}}{v_{x0}} * x_0(0)\right) * \left(\frac{M + \frac{v_{zx0}}{v_{x0}} * \frac{x_0(0) * F_2}{F_{obj} * F_1}}{z_0(0) - \frac{v_{zx0}}{v_{x0}} * x_0(0)}\right)^2$$

$$c_{x2} = \frac{M * v_a}{2 * K} * \left(\frac{M + \frac{v_{zx0}}{v_{x0}} * \frac{x_0(0) * F_2}{F_{obj} * F_1}}{z_0(0) - \frac{v_{zx0}}{v_{x0}} * x_0(0)} - \frac{M}{F_{obj}}\right) -$$

$$\frac{v_{x0} * \left(z_0(0) - \frac{v_{zx0}}{v_{x0}} * x_0(0)\right)}{2 * K * M} * \left(\frac{M + \frac{v_{zx0}}{v_{x0}} * \frac{x_0(0) * F_2}{F_{obj} * F_1}}{z_0(0) - \frac{v_{zx0}}{v_{x0}} * x_0(0)}\right)^2$$

$$\Delta f_{0y} = \frac{y_0(0) * F_2}{K * F_{obj} * F_1}$$

-continued $$b_{y1} = \frac{v_{zy0} * v_a}{4 * K} * \left( \frac{M + \frac{v_{zy0}}{v_{y0}} * \frac{y_0(0) * F_2}{F_{obj} * F_1}}{z_0(0) - \frac{v_{zy0}}{v_{y0}} * y_0(0)} \right)^2$$

$$b_{y2} = \frac{v_{zy0} * v_a}{4 * K} * \left( \frac{M + \frac{v_{zy0}}{v_{y0}} * \frac{y_0(0) * F_2}{F_{obj} * F_1}}{z_0(0) - \frac{v_{zy0}}{v_{y0}} * y_0(0)} \right)^2$$

$$c_{y1} = \frac{M * v_a}{2 * K} * \left( \frac{M + \frac{v_{zy0}}{v_{y0}} * \frac{y_0(0) * F_2}{F_{obj} * F_1}}{z_0(0) - \frac{v_{zy0}}{v_{y0}} * y_0(0)} - \frac{M}{f_{obj}} \right) +$$

$$\frac{v_{y0} * \left( z_0(0) - \frac{v_{zy0}}{v_{y0}} * y_0(0) \right)}{2 * K * M} * \left( \frac{M + \frac{v_{zy0}}{v_{y0}} * \frac{y_0(0) * F_2}{F_{obj} * F_1}}{z_0(0) - \frac{v_{zy0}}{v_{y0}} * y_0(0)} \right)^2$$

$$c_{y2} = \frac{M * v_a}{2 * K} * \left( \frac{M + \frac{v_{zy0}}{v_{y0}} * \frac{y_0(0) * F_2}{F_{obj} * F_1}}{z_0(0) - \frac{v_{zy0}}{v_{y0}} * y_0(0)} - \frac{M}{f_{obj}} \right) -$$

$$\frac{v_{y0} * \left( z_0(0) - \frac{v_{zy0}}{v_{y0}} * y_0(0) \right)}{2 * K * M} * \left( \frac{M + \frac{v_{zy0}}{v_{y0}} * \frac{y_0(0) * F_2}{F_{obj} * F_1}}{z_0(0) - \frac{v_{zy0}}{v_{y0}} * y_0(0)} \right)^2$$

wherein M is a magnification of the lens system and K is a proportionality factor between a relative angle deflection ($\alpha$) following a given acousto-optic deflector and a local acoustic frequency (f), according to the following equation:

$\alpha = K * f$.

14. The method according to claim 1, wherein the scanning lines are curved lines or substantially straight lines.

15. The method of claim 10 wherein the scanning lines are curved lines or substantially straight lines.

16. The method according to claim 10, comprising scanning each scanning line with a given scanning speed by
determining coordinates $x_0(0)$, $y_0(0)$, $z_0(0)$ of one end of the scanning line serving as a starting point,
determining scanning speed vector components $v_{x0}$, $v_{y0}$, $v_{zx0}$ ($=v_{zy0}$) such that a magnitude of the scanning speed vector corresponds to the given scanning speed and the directions of the scanning speed vector corresponds to the direction of the scanning line,
providing non-linear chirp signals in the first pair of acousto-optic deflectors and providing non-linear chirp signals in the second pair of acousto-optic deflectors such as to move a focus spot from the starting point at a speed defined by the speed vector components $v_{x0}$, $v_{y0}$, $v_{zx0}$.

17. The method according to claim 16, wherein providing non-linear chirp signals in the x axis deflectors and providing non-linear chirp signals in the y axis deflectors comprises the steps of
Providing the non-linear chirp signals in the x axis deflectors according to the function:

$$f_i(x, t) = f_i(0, 0) + \left( b_{xi} * \left( t - \frac{D}{2 * v_a} - \frac{x}{v_a} \right) + c_{xi} \right) * \left( t - \frac{D}{2 * v_a} - \frac{x}{v_a} \right)$$

Wherein
I=1 or 2 indicates the first and second x axis deflector respectively, D is a diameter of the AO deflector; and $V_a$ is a propagation speed of an acoustic wave within the deflector and $\Delta f_{0x} = f_{1x}(0,0) - f_{2x}(0,0)) \neq 0$ and providing non-linear chirp signals in the y axis deflectors according to the function:

$$f_i(y, t) = f_i(0, 0) + \left( b_{yi} * \left( t - \frac{D}{2 * v_a} - \frac{y}{v_a} \right) + c_{yi} \right) * \left( t - \frac{D}{2 * v_a} - \frac{y}{v_a} \right)$$

wherein
i=1 or 2 indicates the first and second x axis deflector respectively, and $\Delta f_{0y} = f_{1y}(0,0) - f_{2y}(0,0)) \neq 0$ wherein $\Delta f_{0x}$, $b_{x1}$, $b_{x2}$, $c_{x1}$, $c_{x2}$, $\Delta f_{0y}$, $b_{y1}$, $b_{y2}$, $c_{y1}$, and $c_{y2}$ are expressed as a function of the initial location ($x_0(0)$, $y_0(0)$, $z_0(0)$) and vector speed ($v_{x0}$, $v_{y0}$, $v_{zx0} = v_{zy0}$) of the focal spot.

18. The method according to claim 17, further comprising arranging a lens system after the two pairs of acousto-optic deflectors consisting of a first lens having a first focal distance, F1, a second lens having a second focal distance, F2, and an objective lens having a third focal distance, $F_{obj}$, and expressing the parameters $\Delta f_{0x}$, $b_{x1}$, $b_{x2}$, $c_{x1}$, $c_{x2}$, $\Delta f_{0y}$, $b_{y1}$, $b_{y2}$, $c_{y1}$, and $c_{y2}$ as $$\Delta f_{0x} = \frac{x_0(0) * F_2}{K * F_{obj} * F_1}$$

$$b_{x1} = \frac{v_{zx0} * v_a}{4 * K} * \left( \frac{M + \frac{v_{zx0}}{v_{x0}} * \frac{x_0(0) * F_2}{F_{obj} * F_1}}{z_0(0) - \frac{v_{zx0}}{v_{x0}} * x_0(0)} \right)^2$$

$$b_{x2} = \frac{v_{zx0} * v_a}{4 * K} * \left( \frac{M + \frac{v_{zx0}}{v_{x0}} * \frac{x_0(0) * F_2}{F_{obj} * F_1}}{z_0(0) - \frac{v_{zx0}}{v_{x0}} * x_0(0)} \right)^2$$

$$c_{x1} = \frac{M * v_a}{2 * K} * \left( \frac{M + \frac{v_{zx0}}{v_{x0}} * \frac{x_0(0) * F_2}{F_{obj} * F_1}}{z_0(0) - \frac{v_{zx0}}{v_{x0}} * x_0(0)} - \frac{M}{F_{obj}} \right) +$$

$$\frac{v_{x0}}{2 * K * M} * \left( z_0(0) - \frac{v_{zx0}}{v_{x0}} * x_0(0) \right) * \left( \frac{M + \frac{v_{zx0}}{v_{x0}} * \frac{x_0(0) * F_2}{F_{obj} * F_1}}{z_0(0) - \frac{v_{zx0}}{v_{x0}} * x_0(0)} \right)^2$$

$$c_{x2} = \frac{M * v_a}{2 * K} * \left( \frac{M + \frac{v_{zx0}}{v_{x0}} * \frac{x_0(0) * F_2}{F_{obj} * F_1}}{z_0(0) - \frac{v_{zx0}}{v_{x0}} * x_0(0)} - \frac{M}{F_{obj}} \right) -$$

$$\frac{v_{x0} * \left( z_0(0) - \frac{v_{zx0}}{v_{x0}} * x_0(0) \right)}{2 * K * M} * \left( \frac{M + \frac{v_{zx0}}{v_{x0}} * \frac{x_0(0) * F_2}{F_{obj} * F_1}}{z_0(0) - \frac{v_{zx0}}{v_{x0}} * x_0(0)} \right)^2$$

$$\Delta f_{0y} = \frac{y_0(0) * F_2}{K * F_{obj} * F_1}$$

-continued $$b_{y1} = \frac{v_{zy0} * v_a}{4*K} * \left(\frac{M + \frac{v_{zy0}}{v_{y0}} * \frac{y_0(0)*F_2}{F_{obj}*F_1}}{z_0(0) - \frac{v_{zy0}}{v_{y0}} * y_0(0)}\right)^2$$

$$b_{y2} = \frac{v_{zy0} * v_a}{4*K} * \left(\frac{M + \frac{v_{zy0}}{v_{y0}} * \frac{y_0(0)*F_2}{F_{obj}*F_1}}{z_0(0) - \frac{v_{zy0}}{v_{y0}} * y_0(0)}\right)^2$$

$$c_{y1} = \frac{M * v_a}{2*K} * \left(\frac{M + \frac{v_{zy0}}{v_{y0}} * \frac{y_0(0)*F_2}{F_{obj}*F_1}}{z_0(0) - \frac{v_{zy0}}{v_{y0}} * y_0(0)} - \frac{M}{f_{obj}}\right) +$$

$$\frac{v_{y0} * \left(z_0(0) - \frac{v_{zy0}}{v_{y0}} * y_0(0)\right)}{2*K*M} * \left(\frac{M + \frac{v_{zy0}}{v_{y0}} * \frac{y_0(0)*F_2}{F_{obj}*F_1}}{z_0(0) - \frac{v_{zy0}}{v_{y0}} * y_0(0)}\right)^2$$

$$c_{y2} = \frac{M * v_a}{2*K} * \left(\frac{M + \frac{v_{zy0}}{v_{y0}} * \frac{y_0(0)*F_2}{F_{obj}*F_1}}{z_0(0) - \frac{v_{zy0}}{v_{y0}} * y_0(0)} - \frac{M}{f_{obj}}\right) -$$

$$\frac{v_{y0} * \left(z_0(0) - \frac{v_{zy0}}{v_{y0}} * y_0(0)\right)}{2*K*M} * \left(\frac{M + \frac{v_{zy0}}{v_{y0}} * \frac{y_0(0)*F_2}{F_{obj}*F_1}}{z_0(0) - \frac{v_{zy0}}{v_{y0}} * y_0(0)}\right)^2$$

wherein M is a magnification of the lens system and K is a proportionality factor between a relative angle deflection ($\alpha$) following a given acousto-optic deflector and a local acoustic frequency (f), according to the following equation:

$$\alpha = K + f.$$

* * * * *